(12) United States Patent
Ni et al.

(10) Patent No.: US 12,556,453 B2
(45) Date of Patent: *Feb. 17, 2026

(54) SYSTEM AND METHOD FOR IMPLEMENTING PACKET PROCESSING NETWORK FUNCTIONS AS A SERVICE

(71) Applicant: Alef Edge, Inc, New York, NY (US)

(72) Inventors: James Jian Ni, Medford, MA (US); Dean Bogdanovic, Brookline, MA (US); Ritesh Johar, Glen Allen, VA (US); Zidan Lian, San Jose, CA (US); Swapnil More, Pune (IN)

(73) Assignee: ALEF EDGE HOLDINGS I, LLC, New York, NY (US)

( * ) Notice: Subject to any disclaimer, the term of this patent is extended or adjusted under 35 U.S.C. 154(b) by 66 days.

This patent is subject to a terminal disclaimer.

(21) Appl. No.: 18/432,124

(22) Filed: Feb. 5, 2024

(65) Prior Publication Data
US 2024/0195696 A1 Jun. 13, 2024

Related U.S. Application Data

(63) Continuation of application No. 18/079,010, filed on Dec. 12, 2022, now Pat. No. 11,943,111.

(51) Int. Cl.
*H04L 41/0895* (2022.01)
*H04L 41/0806* (2022.01)
(Continued)

(52) U.S. Cl.
CPC ...... *H04L 41/0895* (2022.05); *H04L 41/0806* (2013.01); *H04L 41/0843* (2013.01); *H04L 41/22* (2013.01)

(58) Field of Classification Search
CPC ............. H04L 41/0806; H04L 41/0823; H04L 41/0843; H04L 41/0895; H04L 41/22; H04L 41/5048

See application file for complete search history.

(56) References Cited

U.S. PATENT DOCUMENTS

| 11,943,111 B1* | 3/2024 | Ni ........................... H04L 41/22 |
| 11,962,460 B1* | 4/2024 | Draznin .................. H04L 67/50 |
| 2020/0313983 A1* | 10/2020 | Stammers ............... H04L 41/40 |

FOREIGN PATENT DOCUMENTS

WO WO-2019007713 A1 * 1/2019 ........... G06F 9/5005

OTHER PUBLICATIONS

Bosshart, Pat, et al. "P4: Programming protocol-independent packet processors." ACM SIGCOMM Computer Communication Review 44.3: 87-95. (Year: 2014).*

(Continued)

*Primary Examiner* — John M Macilwinen
(74) *Attorney, Agent, or Firm* — FisherBroyles LLP; Alan D. Minsk

(57) ABSTRACT

A method and a system including a data plane service implementation (DPSI) platform operably accessible via application programming interfaces (APIs), implement packet processing network functions as a service. The APIs allow creation, customization, and configuration of network service-supporting application logics (ALs) and network service packages. The DPSI platform creates a packet processing primitive (PPP) by applying a use-case-specific primitive specification to a corresponding primitive template retrieved from a repository, and stores the PPP in a repository. Each PPP instance is implemented as an independent, self-contained, functional part of a whole data plane packet processing network function. The DPSI platform creates an AL based on a use-case-specific AL specification using one or more PPPs corresponding to the use-case-specific AL specification, and stores the AL in another repository. The DPSI platform creates and stores a network service package including one or more ALs corresponding to a use-case-specific service specification in another repository.

16 Claims, 21 Drawing Sheets

(51) Int. Cl.
  *H04L 41/084* (2022.01)
  *H04L 41/22* (2022.01)

(56) References Cited

OTHER PUBLICATIONS

Gao, Ya, and Zhenling Wang. "A review of P4 programmable data planes for network security." Mobile Information Systems 2021.1 : 1257046. (Year: 2021).*

Kheradmand, Ali. A formal semantics of P4 and applications. Diss. University of Illinois at Urbana-Champaign. (Year: 2018).*

Ibanez, Stephen, et al. "The p4-> netfpga workflow for line-rate packet processing." Proceedings of the 2019 ACM/SIGDA International Symposium on Field-Programmable Gate Arrays. (Year: 2019).*

Kaljic, Enio, et al. "A survey on data plane flexibility and programmability in software-defined networking." IEEE Access 7: 47804-47840. (Year: 2019).*

Michel, Oliver, et al. "The programmable data plane: Abstractions, architectures, algorithms, and applications." ACM Computing Surveys (CSUR) 54.4: 1-36. (Year: 2021).*

Baldi, Mario, and Fulvio Risso. "Using xml for efficient and modular packet processing." GLOBECOM'05. IEEE Global Telecommunications Conference, 2005.. vol. 1. IEEE. (Year: 2005).*

Mekky, Hesham, et al. "Application-aware data plane processing in SDN." Proceedings of the third workshop on Hot topics in software defined networking. (Year: 2014).*

Narayanan, Rajesh, et al. "A framework to rapidly test SDN use-cases and accelerate middlebox applications." 38th Annual IEEE Conference on Local Computer Networks. IEEE. (Year: 2019).*

* cited by examiner

SYSTEM AND METHOD FOR IMPLEMENTING PACKET PROCESSING NETWORK FUNCTIONS AS A SERVICE

CROSS REFERENCE TO RELATED APPLICATIONS

This application is a continuation application of non-provisional patent application Ser. No. 18/079,010, titled "System And Method For Implementing Packet Processing Network Functions As A Service", filed in the United States Patent and Trademark Office on Dec. 12, 2022. The specification of the above referenced patent application is incorporated herein by reference in its entirety.

BACKGROUND

Virtualization and cloudification have proven to be highly reliable, highly scalable, and cost-efficient, making operation and management of resources, applications, and services easy, while providing customer friendly solutions in most computing and networking related products. Virtualization utilizes software to simulate hardware and creates a virtual computer system, thereby allowing a single server to run more than one virtual computer system and multiple operating systems and applications. Virtualization runs a virtual instance of a computer system in a layer abstracted from the hardware. Cloudification refers to a process of migrating or transferring data, computer applications, or programs to web-based cloud services in a cloud computing environment, which provides an on-demand network access to a shared pool of configurable, computing, physical, and logical resources. The cloud computing environment is a processing environment comprising configurable, computing, physical, and logical resources, for example, networks, servers, storage media, virtual machines, applications, services, etc., and data distributed over a network, for example, the internet. Product-as-a-service (PaaS) in all dimensions has become more attractive to both product consumers and product producers. PaaS is a concept of allowing customers to purchase services and outcomes that a product can provide, instead of purchasing the product itself. The PaaS business model increases profitability of products, improves customer engagement, and invokes new lines of business. The PaaS business model provides a computing platform for cloud applications and transforms products into products that may be reused, recycled, repaired, and redistributed.

Ever-increasing networking features and capabilities provide more and more solutions and options to customers but yet are still not capable of satisfying the large and also ever-increasing diversity in customer demands. Decathlon solutions are not feasible nor possible from both a coverage dimension and a life span dimension. There is a need for leveraging software intermediaries, for example, application programming interfaces (APIs), for providing functional modules as a service and allowing customers to build, customize, and configure their respective solutions.

In digital communication networks, packet processing refers to a wide range of algorithms and technologies that perform data identification, inspection, extraction, and manipulation to guide a packet of data through a network. Each packet may carry processing code that network devices, for example, routers, switches, etc., apply to the network when they perform forwarding functions. Packet processing subsystems are incorporated in the network devices for managing traversal of the packet of data in a multi-layered network or protocol stack from the lower, physical and network layers to the uppermost application layer. Software-defined networking comprises separation of a control plane and a data plane. The control plane is a part of the network that controls how packets of data are forwarded. The control plane refers to a signaling function of the network configured to control or manage the network. Data traffic flows through the data plane. The data plane, also referred to as a forwarding plane, is a part of the network that carries user traffic and forwards the packets of data that pass through a network device, for example, a router, a switch, etc., by providing a path for the packets. The data plane examines and forwards an incoming packet to the correct output destination on the network. The data plane needs to provide a high-speed and low latency path for forwarding the packets. Currently, more and more data plane packet processing functions are introduced to satisfy different customer needs, for example, in traffic classification, quality of service (QOS) support, security, availability, and reliability. With a plethora of variable dimensions and different specific requirements from specific customers, it is difficult to foresee and pre-build all solutions in a highly performing integrated manner that satisfies all potential and ever-changing needs of the customers. Moreover, it is difficult to ensure high performance, while implementing these packet processing functions in scattered network elements and integrating these packet processing functions at deployment.

Hence, there is a long-felt need for a system and a method for implementing packet processing network functions as services at a more granular level, allowing customers to create, customize, and configure their specific data plane packet processing network solutions from end to end through APIs manually or programmatically.

SUMMARY OF THE INVENTION

This summary is provided to introduce a selection of concepts in a simplified form that are further disclosed in the detailed description of the invention. This summary is not intended to determine the scope of the claimed subject matter.

The system and the method disclosed herein address the above-recited need for implementing packet processing network functions as services at a more granular level, allowing customers to create, customize, and configure their specific data plane packet processing network solutions from end to end through application programming interfaces (APIs) manually or programmatically. The system and the method disclosed herein provide a highly customizable, data plane service creation solution that leverages APIs for providing functional modules as a service and allowing customers to build, customize, and configure their respective solutions. In an embodiment, the system and the method disclosed herein render three environments, namely, a service creation environment for primitive, application logic, and service creation tasks; a service deployment and management environment for orchestrating and configuring the services; and a service hosting/execution environment for executing the services.

The system disclosed herein comprises multiple APIs and a data plane service implementation (DPSI) platform operably accessible via the APIs. The APIs are implemented to allow creation, customization, and configuration of network service-supporting application logics and network service packages. In an embodiment, the APIs are role-based APIs configured to separate and control access of users with different privileges for facilitating creation, configuration, control, management, monitoring, and reporting actions to be applied to layered resources and layered entities of the system. The layered entities comprise, for example, a network interface and programmable switch physical layer, a processing unit physical layer, a network stack layer, a packet processing primitive implementation layer, an application logic layer, a service creation layer, and a control and application plane. The DPSI platform comprises multiple computing and networking servers, each comprising at least one processor and a memory unit. The memory unit is operably and communicatively coupled to the processor(s) and configured to store the computer program instructions defined by one or more of multiple modules of the DPSI platform. The modules of the DPSI platform comprise a primitive creation module, an application logic creation module, and a service creation module defining computer program instructions executable by the processor(s). The DPSI platform further comprises a primitive repository, an application logic repository, and a service repository.

The primitive creation module defines computer program instructions for creating a packet processing primitive by applying a use-case-specific primitive specification to a corresponding one of multiple primitive templates retrieved from the primitive repository, and for storing the created packet processing primitive in the primitive repository. In an embodiment, the packet processing primitive is configured in a structured format comprising, for example, a name, a type, an identifier, and a specification of an instance of the packet processing primitive. Each instance of the packet processing primitive is implemented as an independent, self-contained, functional part of a whole data plane packet processing network function. The data plane packet processing function comprises, for example, any one or more of traffic parsing, traffic classification, class of service (CoS)/quality of service (QOS), access control list (ACL) or firewall, network access control (NAC), traffic routing, traffic switching, traffic manipulation, traffic shaping and policing, traffic correlation/synchronization, queuing, and scheduling functions. For the creation of the packet processing primitive, the primitive creation module creates multiple primitive templates and stores the created primitive templates in the primitive repository; renders a first user interface for creating the use-case-specific primitive specification; retrieves one of the created primitive templates corresponding to the use-case-specific primitive specification, from the primitive repository; and creates the packet processing primitive by applying the use-case-specific primitive specification to the retrieved primitive template. In an embodiment, the primitive templates are developed as software functional modules and/or configurations of hardware functional modules, including programmable hardware modules, and/or a combination of software functional modules and configurations of hardware functional modules, and stored in the primitive repository. In an embodiment, a user, for example, a developer, develops the use-case-specific primitive specification via the first user interface. In an embodiment, the data plane service implementation (DPSI) platform implements the packet processing primitives on a dedicated packet processor, for example, a programming protocol-independent packet processors (P4), as hardware functions. In another embodiment, the DPSI platform implements the packet processing primitives on one or more processing units, for example, a central processing unit (CPU) and/or a network processing unit (NPU), as software functions. In another embodiment, the DPSI platform implements the packet processing primitives on both the dedicated packet processor as hardware functions and on the CPU and/or the NPU as software functions.

The application logic creation module defines computer program instructions for creating an application logic based on a use-case-specific application logic specification using one or more of multiple packet processing primitives corresponding to the use-case-specific application logic specification, and for storing the created application logic in the application logic repository. The application logic is created as an internal implementation of a whole data plane packet processing network function required by one or more user-specific data plane packet processing services. For the creation of the application logic, the application logic creation module renders a second user interface for creating the use-case-specific application logic specification; retrieves one or more of the packet processing primitives corresponding to the use-case-specific application logic specification, from the primitive repository; and creates the application logic based on the use-case-specific application logic specification using the retrieved packet processing primitive(s). In an embodiment, the packet processing primitives are pre-built packet processing primitives. In another embodiment, the packet processing primitives are created by applying primitive specifications derived from the use-case-specific application logic specification to the primitive templates retrieved from the primitive repository. In an embodiment, a user, for example, a developer or a field engineer, develops the use-case-specific application logic specification via the second user interface. In another embodiment, a user, for example, a field engineer, inputs the use-case-specific application logic specification into the application logic creation module via an API call.

The service creation module defines computer program instructions for creating a network service package comprising one or more application logics corresponding to a use-case-specific service specification, and for storing the created network service package in the service repository. For the creation of the network service package, the service creation module renders a third user interface for creating the use-case-specific service specification containing application logic specifications; retrieves one or more application logics corresponding to the use-case-specific service specification, from the application logic repository; and creates the network service package comprising the retrieved application logic(s). In an embodiment, a user, for example, a developer or a field engineer, develops the use-case-specific service specification via the third user interface. In another embodiment, a user, for example, a field engineer or a customer administrator, inputs the use-case-specific service specification into the service creation module via an API call.

In an embodiment, the system disclosed herein further comprises an API server comprising at least one processor, communicatively coupled to the APIs and operably coupled to the data plane service implementation (DPSI) platform. The API server receives and handles calls to the APIs. The API server interprets each of the use-case-specific primitive specification, the use-case-specific application logic specification, and the use-case-specific service specification inputted into the primitive creation module, the application logic creation module, and the service creation module, respectively, via the calls to one or more of the APIs. The API server derives primitive specifications from the use-case-specific application logic specification and the use-case-specific service specification. The API server triggers the primitive creation module, the application logic creation module, and the service creation module to create the packet processing primitive, the application logic, and the network service package, respectively, based on the use-case-specific primitive specification, the use-case-specific application logic specification, and the use-case-specific service specification, respectively. The API server responds to the calls to the APIs with a status message, for example, a success or fail message.

In an embodiment, the data plane service implementation (DPSI) platform further comprises a service orchestrator operably coupled to the API server. The service orchestrator orchestrates the network service package based on an order received from a customer device via an API call; retrieves the network service package from the service repository; and deploys the retrieved network service package to a service hosting platform. In an embodiment, the DPSI platform further comprises a service configurator operably coupled to the API server. The service configurator receives a configuration for the network service package from a customer device via an API call; in response to a trigger from the API server, configures the network service package based on the received configuration; and applies the configuration to the network service package deployed on the service hosting platform. In an embodiment, the DPSI platform further comprises a service hosting platform configured to execute packet processing network functions of the network service package.

The data plane service implementation (DPSI) platform optimizes implementation of the packet processing primitives based on complexity of logic of the packet processing primitives and the running environment. In an embodiment, the DPSI platform optimizes implementation of the packet processing primitives in programmable hardware. In another embodiment, the DPSI platform optimizes implementation of the packet processing primitives as one or more programming protocol-independent packet processors (P4) modules. In another embodiment, the DPSI platform optimizes implementation of the packet processing primitives in general software to be run on one or more processing units, for example, a CPU and/or an NPU. In another embodiment, the DPSI platform optimizes implementation of the packet processing primitives in programmable hardware, and/or as one or more P4 modules, and/or in general software to be run on the CPU and/or the NPU. The DPSI platform selects one or more of the packet processing primitives as building blocks for a customer use case based on user input. In an embodiment, the DPSI platform flexibly implements logic of the customer use case using a fully integrated packet processing primitive based on the use-case-specific service specification. In another embodiment, the DPSI platform flexibly implements logic of the customer use case using multiple separated packet processing primitives based on the use-case-specific service specification.

In an embodiment, the data plane service implementation (DPSI) platform renders service creation building elements, namely, the packet processing primitives, the network service-supporting application logics, and pre-built services in tiered forms. The tiered forms comprise, for example, a modularized source code form, a modularized binary form, and a customization service form. The modularized source code form is configured to invoke code compiling, linking, and packaging for creation of network service packages. The modularized binary form is configured to render pre-built application logic binaries with linking and service required wrapping, for the creation of the network service packages. The customization service form is configured to render the pre-built services for customization via configuration by customers directly.

In an embodiment, the data plane service implementation (DPSI) platform comprises a set of service creation APIs, for example, representational state transfer (REST) APIs or RESTful APIs, for creating network service packages. In an embodiment, the DPSI platform further comprises a service creation user interface, for example, a graphical user interface (GUI), configured as an overlay of one or more of the APIs, for example, the service creation APIs, for creating network service packages. The service creation user interface is configured to be rendered on user devices for creating the network service packages. The DPSI platform renders the packet processing primitives, the application logics, the network service packages, and logic connectors as interface elements, for example, GUI elements, on the service creation user interface for selection and configuration by users.

In one or more embodiments, related systems comprise circuitry and/or programming for executing the methods disclosed herein. The circuitry and/or programming comprise one or any combination of hardware, software, and/or firmware configured to execute the methods disclosed herein depending upon the design choices of a system designer. In an embodiment, various structural elements are employed depending on the design choices of the system designer.

BRIEF DESCRIPTION OF THE DRAWINGS

The foregoing summary, as well as the following detailed description of the invention, is better understood when read in conjunction with the appended drawings. For illustrating the embodiments herein, exemplary constructions of the embodiments are shown in the drawings. However, the embodiments herein are not limited to the specific components, structures, and methods disclosed herein. The description of a component, or a structure, or a method step referenced by a numeral in a drawing is applicable to the description of that component, or structure, or method step shown by that same numeral in any subsequent drawing herein.

DETAILED DESCRIPTION OF THE INVENTION

Various aspects of the disclosure herein are embodied as a system, a method, or a non-transitory, computer-readable storage medium having one or more computer-readable program codes stored thereon. Accordingly, various embodiments of the disclosure herein take the form of an entirely hardware embodiment, an entirely software embodiment comprising, for example, microcode, firmware, software, etc., or an embodiment combining software and hardware aspects that are referred to herein as a "system", a "module", an "engine", a "circuit", or a "unit".

Figure 1A:
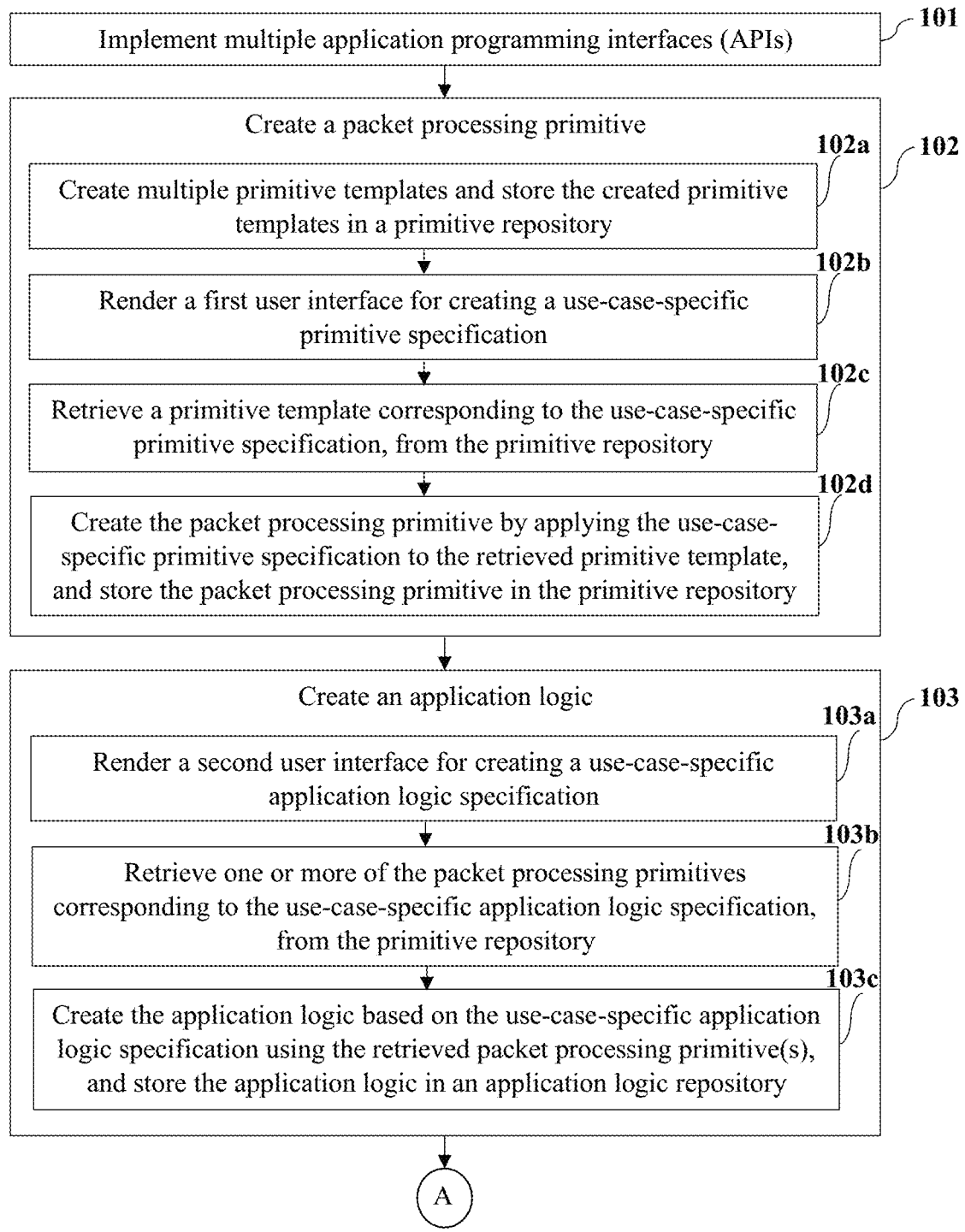
FIGS. 1A-1B illustrate a flowchart of an embodiment of a method for implementing packet processing network functions as a service.
Figure 1B:
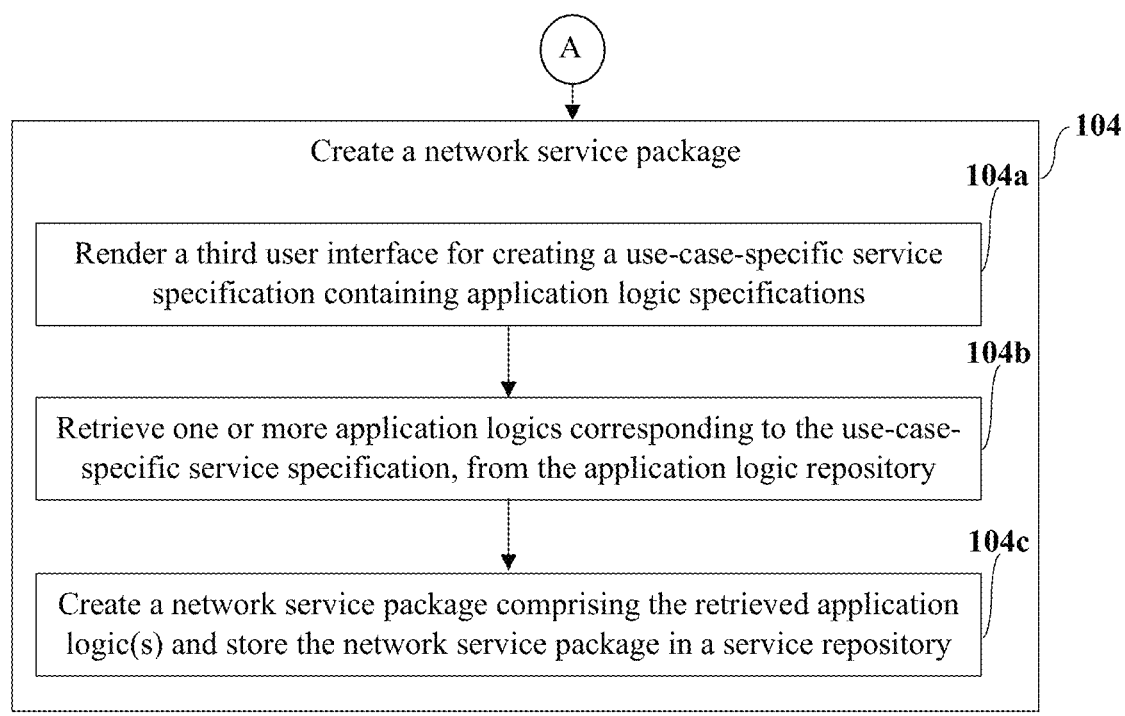

FIGS. 1A-1B illustrate a flowchart of an embodiment of a method for implementing packet processing network functions as a service. The method employs a data plane service implementation (DPSI) platform defining computer program instructions executable by at least one processor core for implementing packet processing network functions as a service. In the method disclosed herein, the data plane service implementation (DPSI) platform is operably accessed via multiple application programming interfaces (APIs). Different users access the DPSI platform and invoke service creation via the APIs. The APIs are implemented 101 to allow creation, customization, and configuration of network service-supporting application logics and network service packages. As used herein, "application logics" refers to logics comprising one or more packet processing primitives in a particular configuration for implementing an application. The packet processing primitives are packet processing modules developed for use as building elements or building blocks of the application logics. As used herein, the term "packet processing primitive" refers to a source code or a computer-executable code implemented to be interpreted or compiled and rendered by the DPSI platform as a data plane packet processing function to a user, for example, a field engineer, for inclusion in application logics. Each packet processing primitive is a self-contained, functional module implemented to serve as a relatively independent part of a whole packet processing network function. The packet processing primitives constitute the basic building blocks of a data plane packet processing network function. Also, as used herein, "network service package" refers to a software package comprising one or more application logics created based on service specifications for a customer use case.

The data plane service implementation (DPSI) platform allows users and customers to create, customize, and configure their specific data plane packet processing network solutions from end to end through the APIs manually or programmatically. In an embodiment, the APIs are role-based APIs configured to separate and control access of users with different privileges for facilitating creation, configuration, control, management, monitoring, and reporting actions to be applied to layered resources and layered entities of the system. The layered entities comprise, for example, a network interface and programmable switch physical layer, a processing unit physical layer, a network stack layer, a packet processing primitive implementation layer, an application logic layer, a service creation layer, and a control and application plane as disclosed in the description of FIG. 4. The APIs are accessible based on roles of the users categorized, for example, as authorized development users such as developers, authorized administrators such as field engineers, authorized operators such as customer administrators, etc. In an example, the APIs comprise application logic creation APIs accessible by field engineers associated with the DPSI platform for creating application logics. In another example, the APIs comprise service creation APIs accessible by the field engineers and the customer administrators for creating offerable network service packages. As used herein, "offerable network service packages" refer to network service packages that are configured to be offered to customers by the DPSI platform based on the customers' service specifications. In an embodiment, an offerable network service package is a package of one or more application logics created and/or selected by a customer. The offerable network service package is an external facing package with specifications understood and specified by the customer. In another example, the APIs comprise service creation, ordering, and configuration APIs accessible by the customers for creating, ordering, and configuring services.

In the method disclosed herein, the data plane service implementation (DPSI) platform creates 102 a packet processing primitive by applying a use-case-specific primitive specification to a corresponding one of multiple primitive templates retrieved from a primitive repository, and stores the created packet processing primitive in the primitive repository. As used herein, "primitive specification" refers to a set of specific values to be applied to a packet processing primitive of a corresponding primitive template. For example, the primitive specification for a classifier primitive comprises classifier criteria, 3-tuple or 5-tuple from a packet header, values and/or ranges of the 3-tuple or 5-tuple parameters, etc. Other packet processing primitives have different primitive specifications. The primitive specifications are structured data input to be provided by users, for example, developers, when users, for example, customers, invoke a service creation API call. Also, as used herein, "use-case-specific primitive specification" refers to a primitive specification defined per use case. A general function can be used to support different use cases. When realizing the general function for a specific use case, a use-case-required specification, also referred to as a "use-case-specific" specification is applied. Also, as used herein, "primitive template" refers to a framework logic implemented to be customized with different primitive specifications to define different implementations of the same type of primitives. In an embodiment, the packet processing primitive is configured in a structured format comprising, for example, a name, a type, an identifier, and a specification of an instance of the packet processing primitive as disclosed in the descriptions of FIGS. 6-7. Each instance of the packet processing primitive is implemented as an independent, self-contained, functional part of a whole data plane packet processing network function of a specific deployment of a specific use case.

The data plane packet processing function comprises, for example, any one or more of traffic parsing, traffic classification, class of service (CoS)/quality of service (QOS), access control list (ACL) or firewall, network access control (NAC), and traffic routing or switching functions. Traffic parsing is a traffic header and payload interpretation process for extracting traffic metadata specified in a primitive specification for a traffic parser. Traffic classification is a classification process configured to categorize network traffic or traffic flows based on multiple parameters referred to as the traffic metadata comprising, for example, source and/or destination internet protocol (IP) addresses, source and/or port number, protocol, etc. CoS/QoS provides a method for managing multiple traffic profiles over a network by prioritizing particular types of network traffic over other types in various priority categories, for example, latency, loss, jitter, etc. CoS marks the network traffic to allow the QoS to use the marking as a means to manipulate the network according to defined policies. While CoS prioritizes network traffic by allocating different levels of priority to different types of network traffic, QoS manages the network traffic by allocating different network resources to different types of network traffic. The ACL or firewall is disposed between a network element, for example, a router, and application servers to provide rule-based and policy-based access control. Network access control (NAC) is used for applying more sophisticated authentication and authorization policies to users and/or devices accessing network resources. Traffic routing or switching is used for appropriately dispatching packets through a network device towards their destination. The data plane packet processing functions further comprise, for example, traffic manipulation, traffic shaping and policing, traffic correlation/synchronization, queuing, and scheduling functions, employed in computer networking. Traffic manipulation comprises, for example, network address translation (NAT), encapsulation, decapsulation, encryption, decryption, replication, multicasting, broadcasting, etc. Traffic shaping and policing is used for regulating user traffic behavior in accordance with a traffic class and a network promise. Traffic correlation/synchronization is used for correlating/synchronizing relevant traffic flows in a specified manner to guarantee use case requirements to all the relevant traffic flows. Traffic queuing is used for queuing the traffic according to predetermined criteria for emitting priority and order. Scheduling provides the way and order in which the traffic queues are served for traffic emission.

For the creation 102 of the packet processing primitive, the data plane service implementation (DPSI) platform creates 102a multiple primitive templates and stores the created primitive templates in the primitive repository; renders 102b a first user interface for creating the use-case-specific primitive specification; retrieves 102c one of the created primitive templates corresponding to the use-case-specific primitive specification, from the primitive repository; and creates 102d the packet processing primitive by applying the use-case-specific primitive specification to the retrieved primitive template. The primitive templates are developed as software functional modules and/or configurations of hardware functional modules, including programmable hardware modules, and/or a combination of software functional modules and configurations of hardware functional modules, and stored in the primitive repository. In an embodiment, the primitive templates are created as software functional modules. In another embodiment, the primitive templates are created as configurations of hardware functional modules. In another embodiment, the primitive templates are created as a combination of software functional modules and configurations of hardware functional modules. In an embodiment, a user, for example, a developer, develops the use-case-specific primitive specification via the first user interface. The DPSI platform stores the created packet processing primitive in the primitive repository. In an embodiment, the DPSI platform derives the use-case-specific primitive specifications from user-specific service creation requests and applies the use-case-specific primitive specifications to the corresponding primitive templates to spawn out the use-case-required primitive instances for a requesting user.

In an embodiment, the data plane service implementation (DPSI) platform implements the packet processing primitives on a dedicated packet processor, for example, a programming protocol-independent packet processors (P4), as hardware functions. P4 refers to an open source, domain-specific programming language for programming the data plane of network devices, for example, switches, network interface controllers (NICs), routers, filters, etc. P4 specifies methods of processing packets of data by the network devices and for controlling packet-forwarding planes in the network devices. In another embodiment, the DPSI platform implements the packet processing primitives on one or more processing units, for example, a central processing unit (CPU) and/or a network processing unit (NPU), as software functions. In another embodiment, the DPSI platform implements the packet processing primitives on both the dedicated packet processor as hardware functions and on the CPU and/or the NPU as software functions. The DPSI platform optimizes implementation of the packet processing primitives based on complexity of logic of the packet processing primitives and running environment. In an embodiment, the DPSI platform optimizes implementation of the packet processing primitives in programmable hardware. In another embodiment, the DPSI platform optimizes implementation of the packet processing primitives as one or more P4 modules. In another embodiment, the DPSI platform optimizes implementation of the packet processing primitives in general software to be run on one or more processing units, for example, a CPU and/or an NPU. In another embodiment, the DPSI platform optimizes implementation of the packet processing primitives in programmable hardware, and/or as one or more P4 modules, and/or in general software to be run on the CPU and/or the NPU as disclosed in the descriptions of FIGS. 9-10. In an embodiment, the DPSI platform selects one or more of the packet processing primitives as building blocks for a customer use case based on user input.

Furthermore, in the method disclosed herein, the data plane service implementation (DPSI) platform creates 103 an application logic based on a use-case-specific application logic specification using one or more of multiple packet processing primitives corresponding to the use-case-specific application logic specification, and stores the created application logic in an application logic repository. The application logic is an end-to-end technical solution to realize a specific customer use case function. Moreover, the application logic is an internal implementation of the technical solution with details independent of the customer. Furthermore, the application logic is composed of various relevant packet processing primitives logically connected via appropriate connectors and orders. As used herein, "use-case-specific application logic specification" refers to an application logic specification comprising the packet processing primitives required and their logical connections as defined per use case. The application logic is created as an internal implementation of a whole data plane packet processing network function required by one or more user-specific data plane packet processing services as disclosed in the descriptions of FIGS. 2-3.

For the creation 103 of the application logic, the data plane service implementation (DPSI) platform renders 103*a* a second user interface for creating the use-case-specific application logic specification; retrieves 103*b* one or more of the packet processing primitives corresponding to the use-case-specific application logic specification, from the primitive repository; and creates 103*c* the application logic based on the use-case-specific application logic specification using the retrieved packet processing primitive(s). In an embodiment, the packet processing primitives are pre-built packet processing primitives. In another embodiment, the packet processing primitives are created by applying primitive specifications derived from the use-case-specific application logic specification to the primitive templates retrieved from the primitive repository. In an embodiment, a user, for example, a developer or a field engineer, develops the use-case-specific application logic specification via the second user interface. In another embodiment, a user, for example, a field engineer, inputs the use-case-specific application logic specification into the DPSI platform via an API call. In an embodiment, the DPSI platform creates the application logics using pre-built application logics. In another embodiment, the DPSI platform creates the application logics using one or more of the packet processing primitives configured and linked together per the application logic specifications via one or more of the APIs. In another embodiment, the DPSI platform creates the application logics using both the pre-built application logics and one or more APIs. The DPSI platform stores the created application logic(s) in the application logic repository.

The data plane service implementation (DPSI) platform creates 104 a network service package comprising one or more application logics corresponding to a use-case-specific service specification as disclosed in the descriptions of FIGS. 2-3 and FIGS. 15-16. As used herein, "use-case-specific service specification" refers to a service specification defined per use case. The use-case-specific service specification comprises, for example, a set of application logics selected by a customer to serve their function, fields to be enabled or disabled, a field range, a required application logic flow, required packet processing primitives, and the use-case-specific primitive specifications. For the creation 104 of the network service package, the DPSI platform renders 104*a* a third user interface for creating the use-case-specific service specification containing application logic specifications; retrieves 104*b* one or more application logics corresponding to the use-case-specific service specification, from the application logic repository; and creates 104*c* the network service package comprising the retrieved application logic(s). The DPSI platform stores the created network service package in a service repository. In an embodiment, a user, for example, a developer or a field engineer, develops the use-case-specific service specification via the third user interface. In another embodiment, a user, for example, a field engineer or a customer administrator, inputs the use-case-specific service specification into the DPSI platform via an API call.

In an embodiment, for the creation of an offerable network service package, the data plane service implementation (DPSI) platform selects one or more pre-built services stored in the service repository. In another embodiment, for the creation of the network service package, the DPSI platform maps a custom-built service to one or more created application logics, where the custom-built service is developed, for example, by a field engineer, at deployment time using one or more of the APIs. The mapping comprises a determination of a relationship between the service required and the application logic(s) that would render the service. In an embodiment, the mapping is performed by the DPSI platform based on inputs received from a user, for example, a field engineer or a customer administrator. To implement the mapping process, the DPSI platform renders a list of existing application logics retrieved from the application logic repository, on a user interface, based on allowed visibility privileges assigned to the user. In an embodiment, the DPSI platform assigns different visibility privileges to different users, for example, field engineers, customer administrators, etc., thereby allowing different users to view different subsets of the application logics stored in the application logic repository. The user views the rendered list of existing application logics, selects the required application logics, and creates a use-case-specific service specification. The DPSI platform then executes a service creation logic to map the use-case-specific service specification to the application logics and creates a network service package accordingly. In another embodiment, for the creation of the network service package, the DPSI platform maps a customer-built service to one or more created application logics, where the customer-built service is developed by a customer at operation time using one or more of the APIs. In an embodiment, the DPSI platform flexibly implements logic of a customer use case using a fully integrated packet processing primitive based on the use-case-specific service specification as disclosed in the description of FIG. 5A. In another embodiment, the DPSI platform flexibly implements logic of a customer use case using multiple separated packet processing primitives based on the use-case-specific service specification as disclosed in the description of FIG. 5B.

In an embodiment, the data plane service implementation (DPSI) platform stores: (a) primitive templates built at development time in the primitive repository; (b) pre-built application logics and customized application logics built at deployment time in the application logic repository; and (c) pre-built services, custom-built services developed at deployment time and offered to a customer, and customer-built network service packages published by customers in the service repository. The pre-built application logics refer to application logics created by authorized development users, for example, developers, of the DPSI platform using predefined primitive specifications and primitive templates comprising source codes. The customized application logics refer to the application logics created by authorized administrators, for example, field engineers, using application logic creation APIs. The pre-built services are created by the authorized development users, for example, the developers, of the DPSI platform. The custom-built services are created by the authorized administrators, for example, the field engineers, using service creation APIs. The customer-built network service packages are created and published by the authorized operators, for example, the customer administrators, using service creation APIs. In an embodiment, the DPSI platform is operably coupled to an API server. The API server is communicatively coupled to the APIs for receiving and handling calls to the APIs as disclosed in the descriptions of FIGS. 12-13 and FIGS. 14B-14C.

In an embodiment, the data plane service implementation (DPSI) platform implements a tiered service creation capability. In this embodiment, the DPSI platform renders service creation building elements, namely, the packet processing primitives, the application logics, and pre-built services in tiered forms. The tiered forms comprise, for example, a modularized source code form, a modularized binary form, and a customization service form. The modularized source code form is configured to invoke code compiling, linking, and packaging for creation of offerable network service packages. The DPSI platform invokes the modularized source code form for internal development tasks, for example, pre-building services for well-known common use cases, performed by developers. In the modularized source code form, the DPSI platform invokes compiling, linking, and packaging for service creation. The modularized binary form is configured to render pre-built application logic binaries with linking and service required wrapping, for the creation of the offerable network service packages. The DPSI platform invokes the modularized binary form for assisting field engineers in creating customer required services at deployment time. In the modularized binary form, the DPSI platform provides pre-built application logic binaries that are ready for being packaged into offerable services, where only necessary linking and service required wrapping is needed for creating services. The customization service form is configured to render the pre-built services for customization via configuration by customers directly. In the customization service form, only service configuration is required for creating customer required services.

Figure 17:
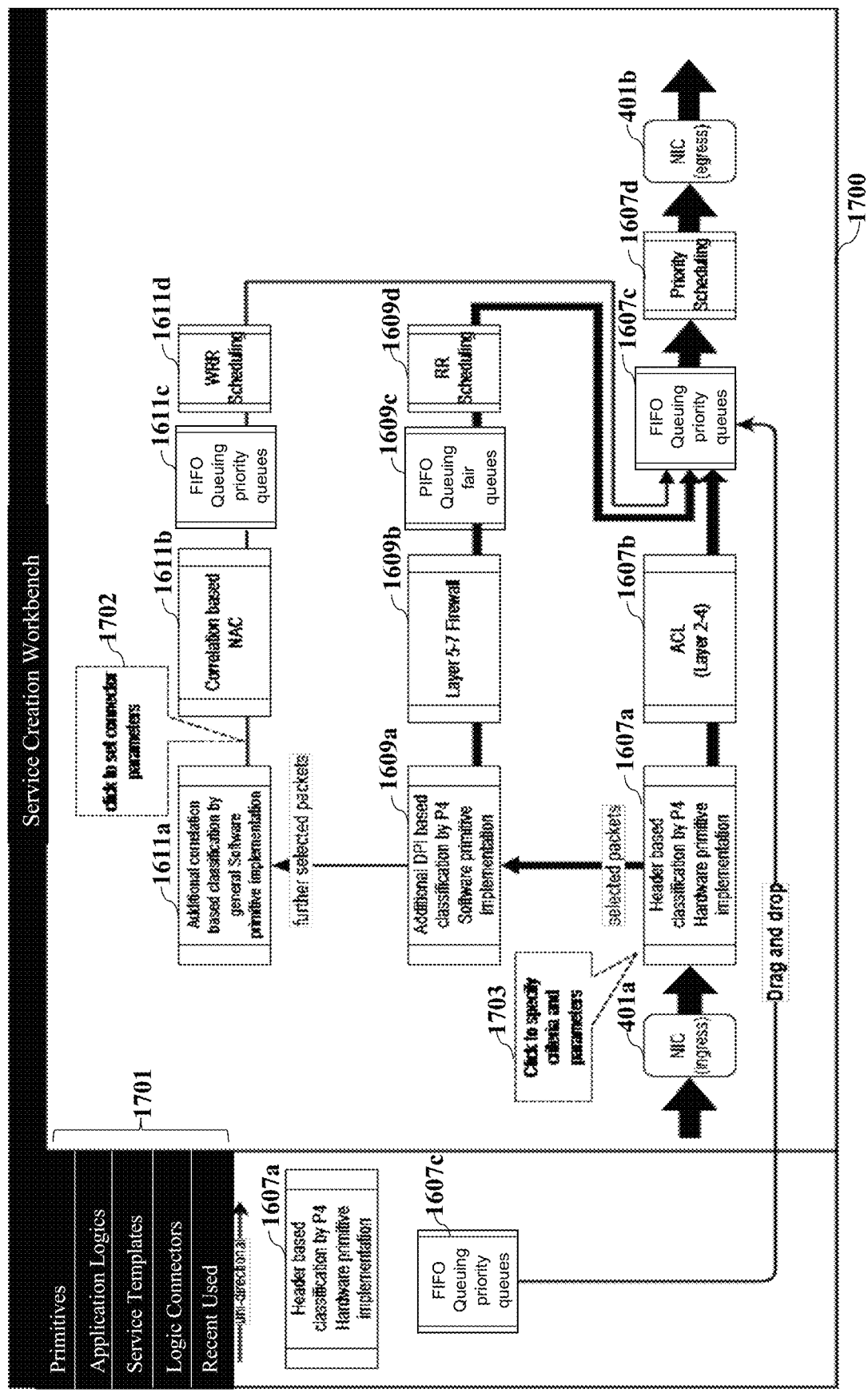
FIG. 17 illustrates an exemplary screenshot of a graphical user interface provided by the DPSI platform for implementing packet processing network functions as a service.

In an embodiment, the data plane service implementation (DPSI) platform comprises a set of service creation APIs, for example, representational state transfer (REST) APIs or RESTful APIs, for creating network service packages. In an embodiment, the DPSI platform further comprises a service creation user interface, for example, a graphical user interface (GUI), configured as an overlay of one or more of the APIs, for example, the service creation APIs, for creating network service packages. The service creation user interface is configured to be rendered on user devices for creating the network service packages as illustrated in FIG. 17. The DPSI platform renders the packet processing primitives, the application logics, the network service packages, and logic connectors as interface elements, for example, GUI elements, on the service creation user interface for selection and configuration by users.

Figure 2:
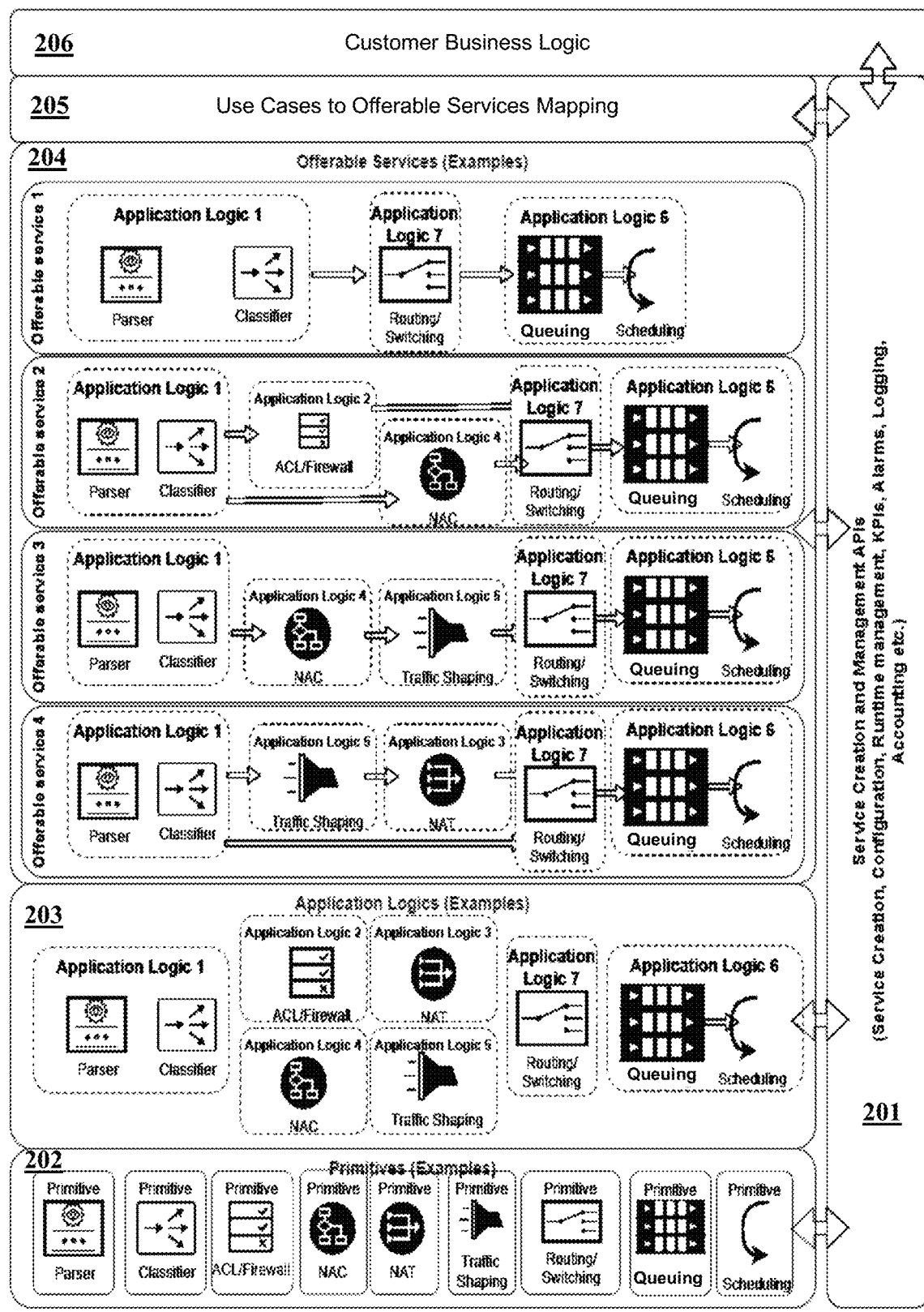
FIG. 2 illustrates an exemplary schematic showing an architectural view of an application programming interface (API)-centric, customizable data plane service implementation (DPSI) solution provided by a DPSI platform.

FIG. 2 illustrates an exemplary schematic showing an architectural view of an application programming interface (API)-centric, customizable data plane service implementation (DPSI) solution provided by the DPSI platform. In an embodiment, the DPSI platform implements fully API-centric service creation in three levels from bottom to the top as illustrated in FIG. 2, where a first level comprises creation of packet processing primitives 202; a second level comprises creation of application logics 203; and a third level comprises creation of offerable services 204. As illustrated in FIG. 2, the first level at the bottom shows a primitive pool, the second level shows an application logic pool on top of the primitive pool, and the third level shows an offerable service pool on top of the application logic pool. In the first level, the DPSI platform allows users, for example, development engineers or developers associated with the DPSI platform, to develop primitive templates as software, or hardware, or software-hardware-combined functional modules and store the primitive templates in the primitive repository. The DPSI platform realizes the packet processing primitives 202 by applying use-case-specific primitive specifications to corresponding primitive templates pulled from the primitive repository.

In the second level, the data plane service implementation (DPSI) platform creates an application logic 203 as an internal implementation of a whole data plane packet processing network function required by one or more user-specific data plane packet processing services. The DPSI platform builds the application logics 203 from various required packet processing primitives 202 that were created by applying the use-case-specific primitive specifications to the corresponding primitive templates pulled from the primitive repository. The DPSI platform executes application creation logic for deriving the use-case-specific primitive specifications from user-specific service creation requests. In an embodiment, the DPSI platform allows users, for example, development engineers, to create the application logics 203 by direct software development. In another embodiment, the DPSI platform allows users, for example, field engineers, to create the application logics 203 via application logic creation APIs. The DPSI platform stores the created application logics 203 in the application logic repository for further offerable service creation.

In the third level, the data plane service implementation (DPSI) platform creates offerable services 204 as customer-friendly packages of internal packet processing application logics to be offered to end customers. For example, offerable service 1 in the offerable service pool shown in the third level is a quality of service (QOS)/class of service (CoS)-based routing/switching service. In another example, offerable service 2 in the offerable service pool is a service to execute an access control list (ACL) function on qualified traffic, to execute a network access control (NAC) function on other qualified traffic, and then to perform appropriate routing/switching of the traffic through queuing and scheduling. In another example, offerable service 3 in the offerable service pool is a service to apply NAC rules to incoming traffic, then apply appropriate traffic shaping according to the NAC rules, and then perform route/switching of the traffic via queuing and scheduling. In another example, offerable service 4 in the offerable service pool is a service to apply traffic shaping and network address translation (NAT) to qualified traffic while allowing other traffic to pass through to routing/switching, queuing, and scheduling.

In an embodiment, the data plane service implementation (DPSI) platform allows users, for example, software engineers or developers, to create offerable services 204 by direct software development. In another embodiment, the DPSI platform allows users, for example, field engineers or customer administrators, to create offerable services 204 via service creation APIs based on use-case-specific service specifications. The use-case-specific service specifications are used to derive a required application logic flow, and the required packet processing primitives and corresponding specifications. The DPSI platform creates and offers services 204 to customers by packaging the created application logics 203 with use-case-specific service specifications. The DPSI platform performs customer use cases to offerable services mapping 205 using the APIs 201. The mapping 205 comprises a determination of what offerable services 204 would match customer business logic 206 and the corresponding customer use case. In an embodiment, the mapping 205 is performed by the DPSI platform based on inputs received from a user, for example, a field engineer or a customer administrator. To implement the mapping process, the DPSI platform renders a list of existing offerable services 204 retrieved from the service repository, on a user interface, based on allowed visibility privileges assigned to the user. In an embodiment, the DPSI platform assigns different visibility privileges to different users, for example, field engineers, customer administrators, etc., thereby allowing different users to view different subsets of the offerable services 204 stored in the service repository. The user views the rendered list of offerable services and selects the required offerable services. The DPSI platform then executes a service creation logic to map the customer user cases to the offerable services 204 based on a use-case-specific service specification.

The service specifications are defined in the customer business logic 206 that is communicated to the data plane service implementation (DPSI) platform via the APIs 201. The customer business logic 206 comprises requirements, for example, separate long-term evolution (LTE) control and user traffic, provide quality of service (QOS) class identifier (QCI) support, provide allocation and retention priority (ARP) support, etc. QCI is a mechanism provided by LTE networks to ensure carrier traffic is allocated appropriate QoS, which indicates overall performance of a service. ARP is an LTE mechanism for indicating a priority level for the allocation and retention of bearers or network resources. A mobile network uses ARP to decide whether to accept a request to establish a bearer, or reject the request when network resources are limited. When performing admission control and the network resources are limited, the mobile network uses the ARP to prioritize establishing or modifying bearers with a higher ARP over bearers with a lower ARP. The APIs 201 comprise, for example, service creation and management APIs, configured to perform service creation, configuration, and runtime management in conjunction with key performance indicators (KPIs), alarms, logging, accounting, etc.

Examples of the packet processing primitives 202 comprise a parser function, a classifier function, an access control list (ACL)/firewall function, a network access control (NAC) function, a network address translation (NAT) function, a traffic shaping function, a routing/switching function, a queuing function, a scheduling function, etc. The DPSI platform builds the application logics 203 using the packet processing primitives 202. For example, the DPSI platform builds application logic 1 using the parser function and the classifier function; application logic 2 using the ACL/firewall function; application logic 3 using the NAT function; application logic 4 using the NAC function; application logic 5 using the traffic shaping function; application logic 6 using the queuing and scheduling function; and application logic 7 using the routing/switching function as illustrated in FIG. 2. In an embodiment, the DPSI platform builds a single application logic comprising any combination of the application logics 1, 2, 3, 4, 5, 6, and 7.

The data plane service implementation (DPSI) platform then proceeds to create offerable network service packages comprising offerable services 204 using one or more of the application logics 203. For example, the DPSI platform creates an offerable service 1 using application logic 1, application logic 7, and application logic 6; an offerable service 2 using application logic 1, application logic 2, application logic 4, application logic 7, and application logic 6; an offerable service 3 using application logic 1, application logic 4, application logic 5, application logic 7, and application logic 6; and offerable service 4 using application logic 1, application logic 5, application logic 3, application logic 7, and application logic 6, as illustrated in FIG. 2. The DPSI platform packages one or more application logics in a user-friendly manner as an offerable service to customers. The DPSI platform creates the sequence of the application logics in each of the offerable services 204 using the customer business logic 206. The DPSI platform performs the customer user cases to offerable services mapping 205 to create the offerable network service packages. The DPSI platform stores the offerable services 204 in the service repository for future deployment. Customer administrators can then retrieve the created services from the service repository and deploy the retrieved services through service orchestration logic typically executed in computing and computer networking arts. Furthermore, customer administrators can then configure the deployed services through service configuration logic typically executed in computing and computer networking arts.

Figure 3:
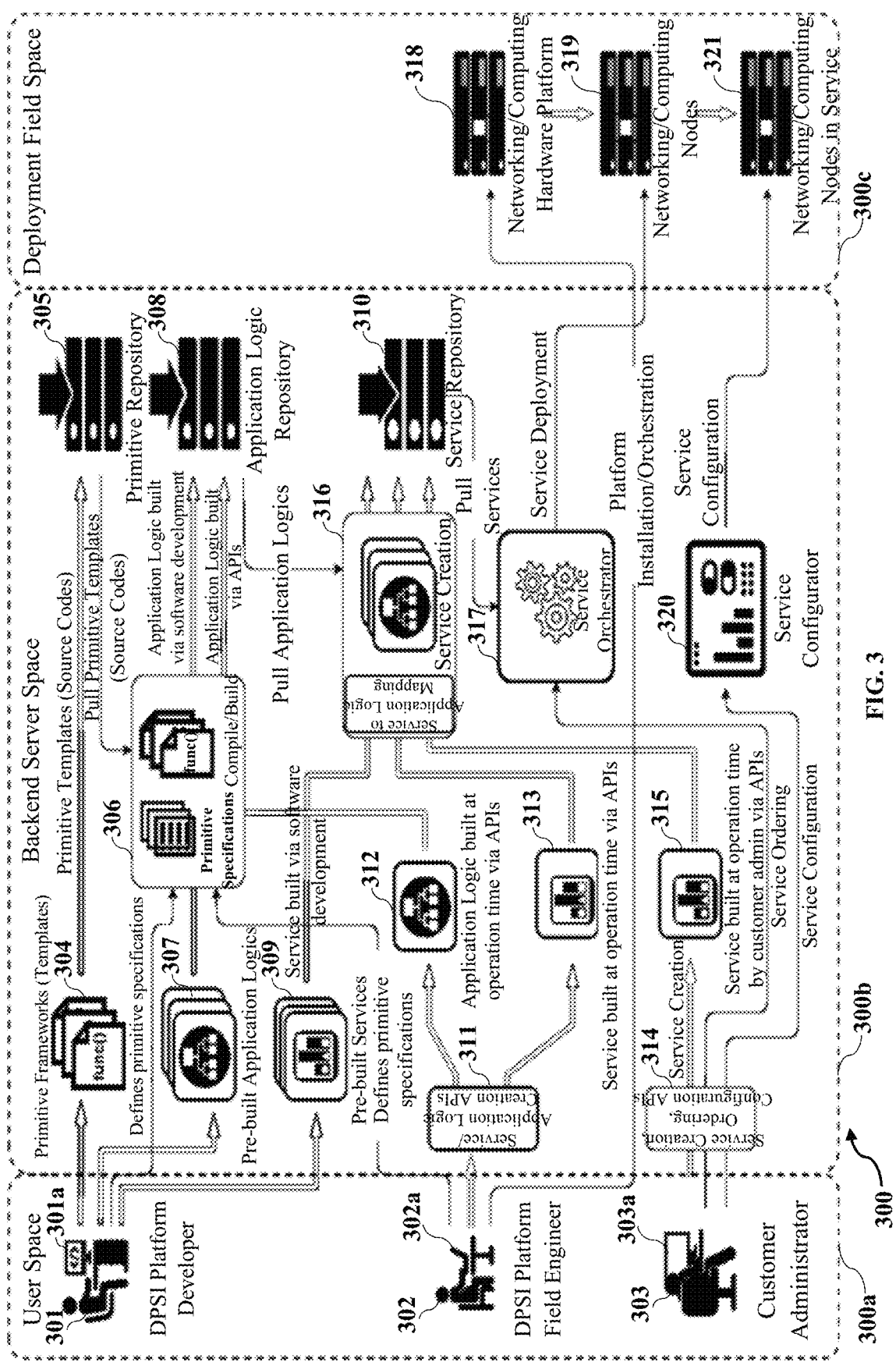
FIG. 3 illustrates an exemplary schematic of an embodiment of a system and operation flows for providing packet processing network functions as a service using the DPSI platform.

FIG. 3 illustrates an exemplary schematic of an embodiment of a system 300 and operation flows for providing packet processing network functions as a service using the data plane service implementation (DPSI) platform. In an embodiment, the DPSI platform of the system 300 is a solution configured to render a user space 300a, a backend server space 300b, and a deployment field space 300c for implementing a role-based service creation capability. The role-based service creation capability of the DPSI platform facilitates creation of offerable network service packages based on roles of different users 301, 302, and 303, for example, authorized development users, authorized administrators, and authorized operators. The DPSI platform allows the authorized development users, for example, developers 301, to create packet processing primitives, application logics, and offerable services; and build and store additional packet processing primitives as needed into the primitive repository 305, for creation of application logics. In an embodiment, the primitive repository 305 is hosted on a code hosting platform, for example, GitHub® of GitHub, Inc. The DPSI platform allows the developers 301 to pre-build and store well-known application logics 307 in the application logic repository 308 for service creation. The DPSI platform also allows the developers 301 to pre-build and store well-known common services 309 in the service repository 310 for retrieval by customers. Moreover, the DPSI platform allows the authorized administrators, for example, field engineers 302, to create application logics and offerable services. The DPSI platform allows the field engineers 302 to build customer-required application logics at deployment time and store the customer-required application logics in the application logic repository 308 for service creation. The DPSI platform also allows the field engineers 302 to build customer-required services at deployment time and store the customer-required services in the service repository 310 for retrieval by customers. Furthermore, the DPSI platform allows the authorized operators, for example, customer administrators 303, to create required services on their own and optionally publish to the service repository 310 as candidates offered to other customers.

As illustrated in FIG. 3, a developer 301, using a developer device 301a in the user space 300a, develops and stores primitive templates 304 in the primitive repository 305. The developer 301 also defines primitive specifications and pulls one or more primitive templates from the primitive repository 305 for creation of packet processing primitives. The data plane service implementation (DPSI) platform comprises a compiler/builder, also referred to as a primitive builder 306, for compiling the primitive specifications with the primitive template(s) for building the packet processing primitives, in the backend server space 300b. The primitive builder 306 stores the created packet processing primitives in the primitive repository 305 in the backend server space 300b. In an embodiment, the DPSI platform allows the developer 301 to create the application logics by direct software development and store the created application logics in the application logic repository 308 in the backend server space 300b. The application logic repository 308 also stores application logics 307 pre-built by the developer 301. The developer 301 also creates and stores pre-built services 309 in the service repository 310.

A field engineer 302, using a field engineer device 302a in the user space 300a, creates application logics 312 via an application logic creation application programming interface (API) 311 at operation time and stores the created application logics 312 in the application logic repository 308 in the backend server space 300b. The field engineer 302 also creates offerable services 313 via a service creation API 311 at operation time and stores the created offerable services 313 in the service repository 310. In an embodiment, the DPSI platform further comprises a service creation module, also referred to as a service builder 316, that performs service to application logic mapping and creates offerable services for storage in the service repository 310, in the backend server space 300b. The service builder 316 retrieves selected application logics from the application logic repository 308 and utilizes services 309 pre-built by the developer 301 and/or offerable services 313 built by the field engineer 302 for creating offerable network service packages. The service builder 316 stores the created offerable network service packages in the service repository 310 in the backend server space 300b. In an embodiment, the DPSI platform also allows the field engineer 302 to perform platform installation/orchestration, as typically performed in the computing and computer networking arts, on a networking/computing hardware platform 318 in the deployment field space 300c. The networking/computing hardware platform 318 illustrated in FIG. 3 indicates the hardware deployed by the field engineer 302. The field engineer 302 then loads the software into the networking/computing hardware platform 318 to execute the packet processing network functions. The networking/computing hardware platform 318 with the loaded software is represented as networking/computing nodes 319 in FIG. 3.

A customer administrator 303, using a customer device 303a in the user space 300a, creates offerable services 315 via a service creation API 314 at operation time and publishes the created offerable services 315 for storage in the service repository 310. In an embodiment, the DPSI platform provides a service ordering API 314 for allowing the customer administrator 303 to perform service ordering, that is, place an order for an offerable service. In an embodiment, during service ordering, the customer administrator 303 defines customer service specifications for service creation. The DPSI platform further comprises a service orchestrator 317 configured to receive a service order from the customer administrator 303 and perform service orchestration as typically performed in the computing and computer networking arts, in the backend server space 300b. The service orchestrator 317 executes operational and functional processes involved in designing, creating, and delivering an end-to-end service. The service orchestrator 317 controls interactions involved in deploying the network service packages on networking/computing nodes 319 in the deployment field space 300c. The service orchestrator 317 provides a robust bridge linking network automation and orchestration tools with the underlying physical and virtual infrastructure. The service orchestrator 317 comprises a set of software interfaces and APIs that allow service deployment on the networking/computing nodes 319 in the deployment field space 300c. In an embodiment, the DPSI platform provides a service configuration API 314 for allowing the customer administrator 303 to perform service configuration. The DPSI platform further comprises a service configurator 320 configured to receive service configuration information from the customer administrator 303 and perform service configuration as typically performed in the computing and computer networking arts, in the backend server space 300b. The service configurator 320 configures the created service, which is represented as the networking/computing nodes 321 in service in the deployment field space 300c. The networking/computing nodes 321 in service illustrated in FIG. 3 represent the deployment of the service with the customer's configuration.

Figure 4:
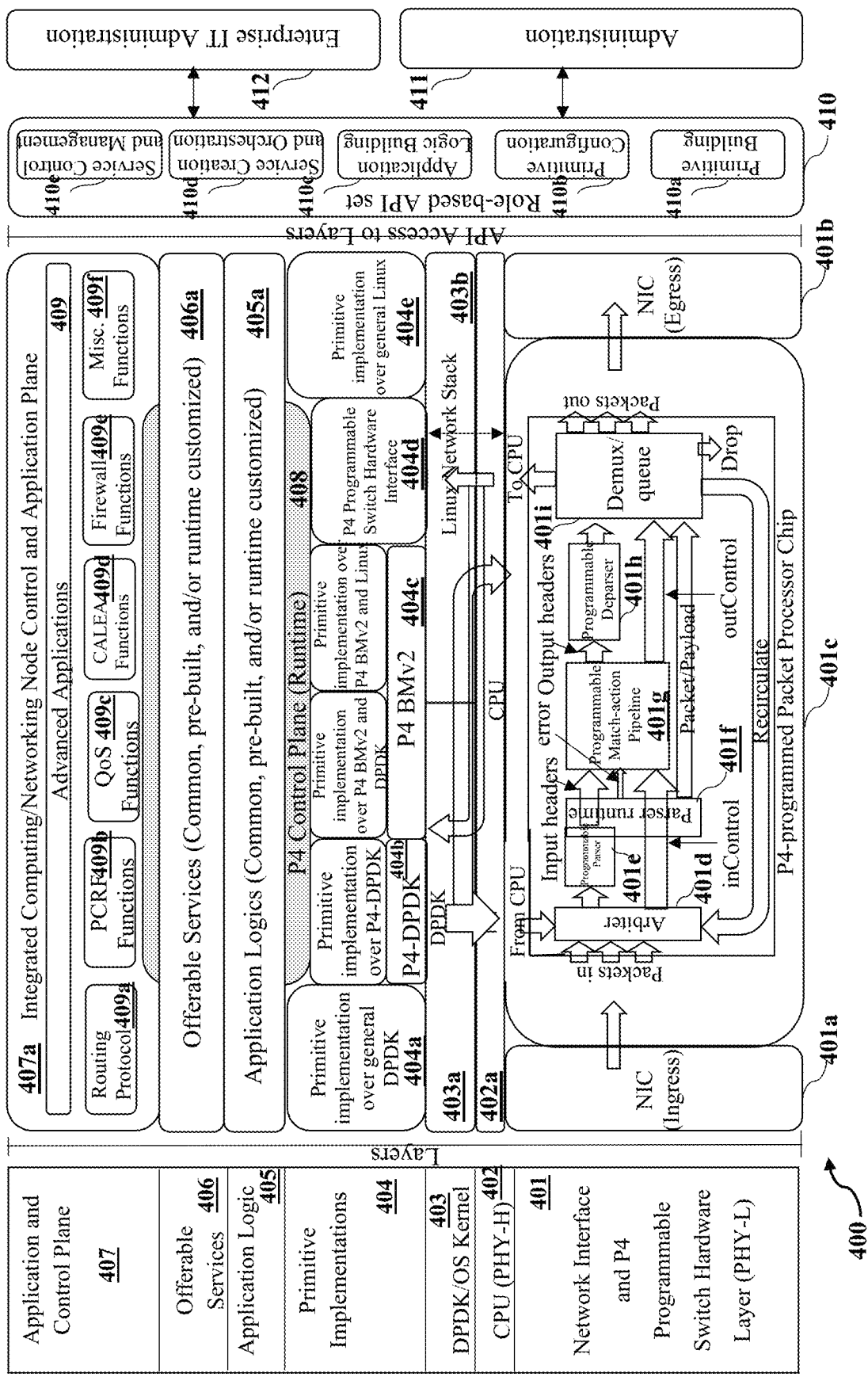
FIG. 4 illustrates an architectural block diagram of an exemplary implementation of the system for implementing packet processing network functions as a service, in a layered form.

FIG. 4 illustrates an architectural block diagram of an exemplary implementation of the system for implementing packet processing network functions as a service, in a layered form. In an embodiment, the packet processing primitives provided by the data plane service implementation (DPSI) platform are implemented on programmable hardware, for example, a programming protocol-independent packet processors (P4) programmable packet processor as hardware solutions. In another embodiment, the packet processing primitives are implemented on a processing unit, for example, a central processing unit (CPU), as software solutions. In another embodiment (not shown), the packet processing primitives are implemented on a processing unit, for example, a network processing unit (NPU), as software solutions. In another embodiment, the packet processing primitives are implemented on both programmable hardware as hardware solutions and on a processing unit, for example, a CPU, as software solutions. In an embodiment, when implemented as CPU software solutions, the packet processing primitives are built on either a data plane development kit (DPDK) 403a or an operating system (OS) network stack, for example, a Linux® network stack 403b. The DPDK 403a comprises libraries and drivers configured for fast packet processing. The DPDK 403a receives and sends packets within a minimum number of CPU cycles; allows development of fast packet capture algorithms; and executes third-party fast path stacks optimally. An exemplary implementation of the system with the P4 programmable packet processor is illustrated in FIG. 4. In this exemplary implementation considered from a perspective of packet processing, the architecture 400 of the system comprises a network interface and P4 programmable switch hardware layer 401, a higher physical layer (PHY-H) 402, a DPDK/OS kernel layer 403, a primitive implementation layer 404, an application logic layer 405, an offerable service layer 406, and an application and control plane layer 407.

The network interface and P4 programmable switch hardware layer 401 is a low layer, namely, a physical-low (PHY-L) layer, comprising an ingress network interface controller (NIC) 401a and an egress NIC 401b. The ingress NIC 401a receives external traffic and routes traffic to a service. The egress NIC 401b controls egress traffic that exits a host network.

In an embodiment, the network interface and P4 programmable switch hardware layer 401 further comprises a P4 programmed packet processor chip 401c, for example, the Intel® Tofino™ chip of Intel Corporation. The P4 programmed packet processor chip 401c performs packet manipulation without invoking a CPU 402a and implements the packet processing primitives in programmable hardware. In an embodiment, the P4 programmed packet processor chip 401c comprises an arbiter 401d, a programmable parser 401e, a parser runtime block 401f, a programmable match-action pipeline 401g, a programmable deparser 401h, and a demultiplexer (demux)/queue 401i in accordance with the P4 specification. The arbiter 401d receives packets of data from the ingress NIC 401a and schedules the packets for entry into the programmable match-action pipeline 401g. In an embodiment, the arbiter 401d also receives packets from the CPU 402a and/or through recirculation from the demux/queue 401i. The arbiter 401d directs packet flows arriving from different inputs to an appropriate output. In an embodiment, the arbiter 401d switches between input queues in a round robin sequence, and each time, selects a non-empty queue and moves one packet from the non-empty queue to the next stage in the data path. The arbiter 401d transfers each scheduled packet to the programmable parser 401e. The programmable parser 401e parses each packet and extracts input headers contained in the packets.

The programmable parser 401e transfers the input headers containing destination addresses and other field data to the programmable match-action pipeline 401g. The parser runtime block 401f operates in concert with the programmable parser 401e and provides an error code to the programmable match-action pipeline 401g, based on actions of the programmable parser 401e. The parser runtime block 401f also provides information about packet payload, for example, size of the remaining payload data, to the demux/queue 401i. Completion of processing of a packet by the programmable parser 401e invokes the programmable match-action pipeline 401g. The programmable parser 401e feeds associated metadata, for example, input headers, user-defined metadata, etc., as inputs to the programmable match-action pipeline 401g. The programmable match-action pipeline 401g comprises match-action tables configured to match an input header of each packet comprising predefined rules and performs a corresponding action on the packet. Actions use the packet processing primitives to modify non-persistent resources, that is, the headers or metadata, of each packet. The programmable deparser 401h receives output headers from the programmable match-action pipeline 401g and constructs the outgoing packet by reassembling the output headers as computed by the programmable match-action pipeline 401g. The demux/queue 401i receives the headers for the outgoing packet from the programmable deparser 401h and the packet payload from the programmable parser 401e, and assembles the output headers and the packet payload into a new packet to send the result to the correct output port of the egress NIC 401b.

In an embodiment, the higher physical (PHY-H) layer 402 comprises the CPU 402a configured to execute the software implemented-P4 or non-P4 packet processing primitives for packets coming from the ingress NIC 401a or from the programmable packet processor through either the DPDK 403a or the Linux® network stack 403b. The DPDK/OS kernel layer 403 serves as the network stacks comprising, for example, the DPDK 403a and the Linux® network stack 403b in a conventional software-based packet processing manner. The primitive implementation layer 404 comprises a collection of packet processing primitives implemented using various individual or combined capabilities of the data plane service implementation (DPSI) platform. The packet processing primitives comprise, for example: (a) packet processing primitives that are directly implemented in the P4-programmable packet processor in a hardware manner, and that are relatively simple packet processing primitives suitable for low latency and high performance; and/or (b) packet processing primitives that are implemented in general software and run on the CPU 402a. The packet processing primitives comprising relatively complicated logic are implemented in general software and run on the CPU 402a. The packet processing primitives that are implemented in general software and run on the CPU 402a comprise P4-programmed, general software primitives and non-P4, general software-implemented primitives. The P4-programmed, general software primitives comprise, for example: (a) DPDK-based, P4-programmed, general software primitives; and (b) Linux® kernel-based, P4-programmed, general software primitives. The Linux® kernel is a primary component of the Linux® operating system and provides a core interface between hardware of a device, for example, a network device, and processes of the device. The non-P4, general software-implemented primitives comprise, for example: (a) DPDK-based, non-P4-programmed, general software primitives; and (b) Linux® kernel-based, non-P4-programmed, general software primitives. The primitive implementation layer 404 performs implementation of packet processing primitives over general DPDK 404a; implementation of packet processing primitives over P4-DPDK 404b; implementation of packet processing primitives over P4 behavioral model version 2 (BMv2) 404c and DPDK; implementation of packet processing primitives over P4 BMv2 404c and Linux®; and implementation of packet processing primitives over general Linux® 404e as illustrated in FIG. 4. BMv2 allows developers to implement their own P4-programmable architecture as a software switch. The primitive implementation layer 404 communicates with the CPU 402a via a P4-programmable switch hardware interface 404d. In an embodiment, the primitive implementation layer 404 communicates with the P4-programmed packet processor chip 401c via the P4-programmable switch hardware interface 404d.

Performance and capability wise, the following orders are descending in performance and ascending in complexity/capability: (a) P4-programmable packet processor hardware-implemented primitives; (b) DPDK-based, P4 or non-P4 software-implemented primitives; and (c) Linux® kernel-based, P4 or non-P4 software-implemented primitives. Pure software P4 capability allows seamless transition from a general server implementation to a P4 packet processor enhanced implementation. An initial pure software solution allows for early product introduction, for example, based on cost, P4 chip availability, etc. Seamless transition allows migration of software implementations of P4-based primitives to hardware implementations without significant changes. A common P4-based solution allows compatibility with all P4 chips.

On top of the above types of packet processing primitives, the application logic layer 405 comprises a set of common, pre-built, and/or runtime customized, independently functional application logics 405a configured to satisfy end user needs. The application logic layer 405 is built from the packet processing primitives implemented at the primitive implementation layer 404 disposed below the application logic layer 405. The application logics 405a serve as functional units for creating various offerable services 406a. Built on top of the application logic layer 405 and comparing with its internal implementation facing nature, the offerable service layer 406 is more external customer facing and offers meaningful service solutions to customers. In an embodiment, the offerable services 406a comprise individual application logics 405a. In another embodiment, the offerable services 406a comprise combinations of application logics wrapped around by appropriate application programming interfaces (APIs) to customers. The DPSI platform provides the APIs in a role-based API set 410 as illustrated in FIG. 4.

The application and control plane layer 407 comprises an integrated computing/networking node control and application plane 407a. The integrated computing/networking node control and application plane 407a comprises advanced applications 409 and data plane packet processing functions, for example, routing protocol 409a, policy and charging rules functions (PCRFs) 409b, quality-of-service (QOS) functions 409c, Communications Assistance for Law Enforcement Act (CALEA) functions 409d, firewall functions 409e, and miscellaneous functions 409f such as fault, configuration, accounting, performance, and security (FCAPS), control, interface, and protocol functions, required for a fully functional, integrated computing/networking operation.

All the layers 401, 402, 403, 404, 405, 406, and 407 of the architecture 400 of the system disclosed herein are accessible via role-based APIs. The role-based API set 410 comprises APIs for building packet processing primitives 410a, configuring packet processing primitives 410b, building application logics 410c, creation and orchestration of services 410d, and service control and management 410e as illustrated in FIG. 4. The role-based APIs allow creation, configuration, control, management, monitoring, and reporting to be applied to corresponding layered resources and layered entities of the system. The role-based APIs separate and control the scope of accessibilities of users with different privileges as follows. The data plane service implementation (DPSI) platform provides primitive creation users with first level privileges that allow the primitive creation users to create and manage all levels of entities, for example, 405, 406, and 407, down to the primitive implementation layer 404. The DPSI platform provides application creation users with second level privileges that allow the application creation users to create and manage all levels of entities, for example, 406 and 407, down to the application logic layer 405. The DPSI platform provides service creation users with third level privileges that allow the service creation users to create and manage all levels of entities at the offerable service layer 406. The DPSI platform provides customer service creation users with fourth level privileges that allow the customer service creation users to create and manage owned entities at the offerable service layer 406. The DPSI platform provides customer service administration (admin) users with fifth level privileges that allow the customer service admin users to manage owned entities at the offerable service layer 406. The DPSI platform provides customer service operation users with sixth level privileges that allow the customer service operation users to view owned entities at the offerable service layer 406. The DPSI platform provides customer service monitor users with seventh level privileges that allow the customer service monitor users to monitor and view subsets of owned entities at the offerable service layer 406. The DPSI platform provides general users with the lowest eighth level privileges that allow the general users to only view publicly accessible information, if any. In an embodiment, the DPSI platform allows administration 411 and enterprise information technology (IT) administration 412 via the role-based API set 410.

The data plane service implementation (DPSI) platform optimizes primitive implementations based on complexity of the primitive logic and suitable running environments. The DPSI platform implements simple and high-performance primitive logics in a programmable hardware form, for example, in Intel® Tofino™ P4 chips. The DPSI platform implements packet processing primitives with moderate complexity and/or requiring interactions with the control plane, for example, a P4 control plane 408, that is, normally run on the CPU 402a, as P4 program modules for offloading the P4 hardware burden and preserving options for future hardware implementation. In an embodiment, the P4 control plane 408 operates with an open network operating system (ONOS), which provides and exposes a set of high-level abstractions and models to users, for example, the developers, for extension by applications at runtime. The ONOS enables creation of next-generation network applications that use software-defined networks. The DPSI platform implements packet processing primitives with high complexity and/or requiring heavy interactions with the control plane 408 and/or external networking entities, for example, authentication services, etc., in software forms to be run on the CPU 402a.

Figure 5A:
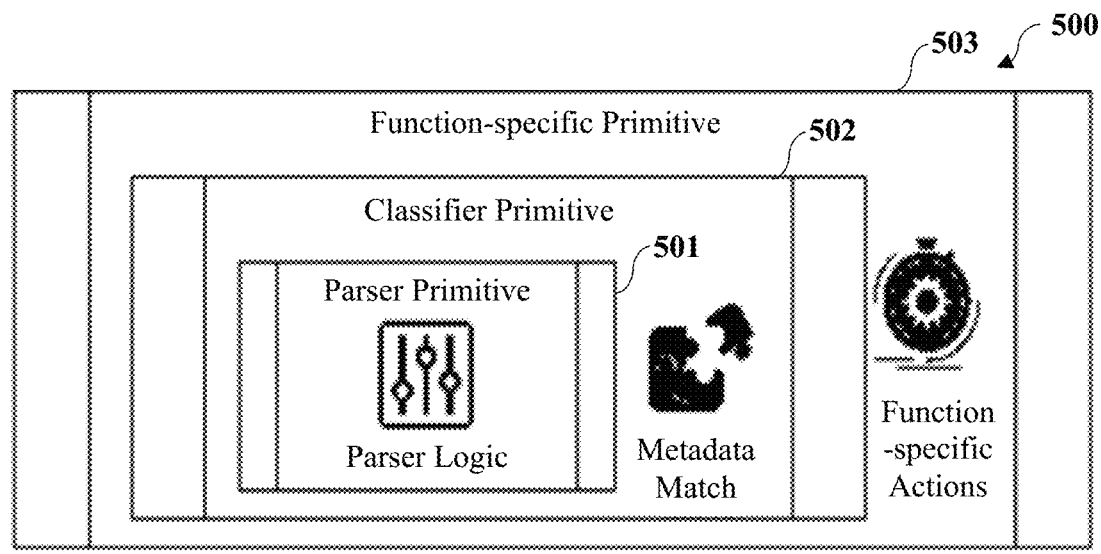
FIG. 5A illustrates a block diagram showing an implementation of logic of a customer use case using a fully integrated packet processing primitive in a nested function form.

FIG. 5A illustrates a block diagram showing an implementation of logic of a customer use case using a fully integrated packet processing primitive 500 in a nested function form. In an embodiment, the data plane service implementation (DPSI) platform provides a flexible implementation framework of packet processing primitives, application logics, and offerable services, where the DPSI platform implements a use case-required application logic and offerable service in a fully integrated packet processing primitive 500 as illustrated in FIG. 5A. Consider an example where a customer requests for an access control list (ACL) function for a customer user case. Based on user input, the DPSI platform integrates a parser primitive 501 and a classifier primitive 502 into an ACL function-specific primitive 503 with associated function-specific actions as illustrated in FIG. 5A, and implements the ACL function logic using the fully integrated packet processing primitive 500. The selections of the packet processing primitives are controlled at service creation time based on service creation specifications defined by the customer.

Figure 5B:
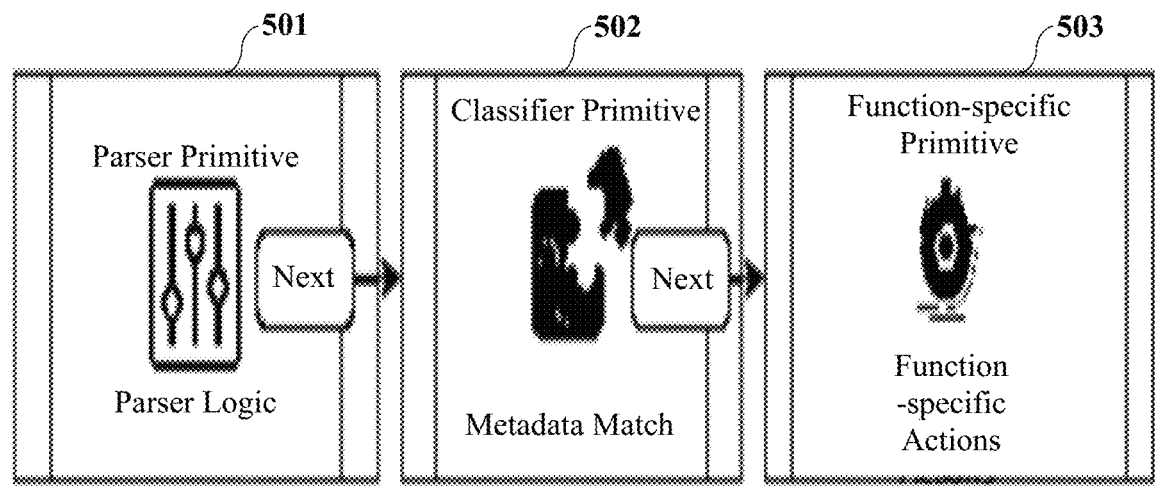
FIG. 5B illustrates a block diagram showing an implementation of logic of a customer use case using multiple separated packet processing primitives connected in an order required by a packet processing network function.

FIG. 5B illustrates a block diagram showing an implementation of logic of a customer use case using multiple separated packet processing primitives 501, 502, and 503 connected in an order required by a packet processing network function. In an embodiment, the data plane service implementation (DPSI) platform provides a flexible implementation framework of packet processing primitives, application logics, and offerable services, where the DPSI platform implements a use case-required application logic and offerable service with multiple fully separated packet processing primitives 501, 502, and 503 as illustrated in FIG. 5B. Consider an example where a customer requests for an access control list (ACL) function for a customer user case. Based on user input, the DPSI platform selects a parser primitive 501, a classifier primitive 502, and an ACL function-specific primitive 503 with associated function-specific actions and connects the packet processing primitives 501, 502, and 503 in the order illustrated in FIG. 5B, at service creation time based on service creation specifications defined by the customer. The DPSI platform implements the ACL function logic using the fully separated packet processing primitives 501, 502, and 503 as illustrated in FIG. 5B.

Figure 6:
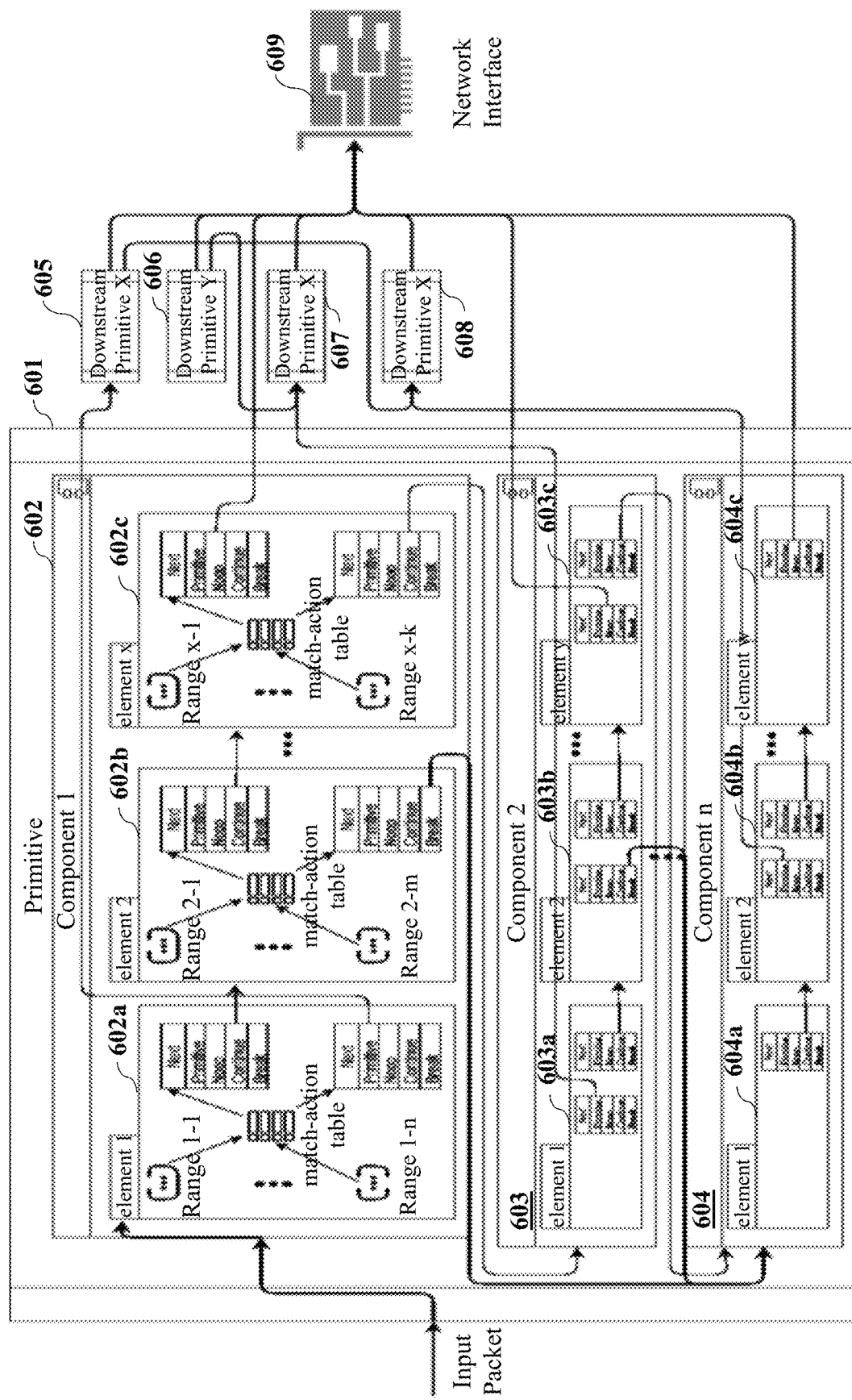
FIG. 6 illustrates a block diagram showing a generic structured packet processing primitive and ways primitives are connected to provide a desired packet processing network function.

FIG. 6 illustrates a block diagram showing a generic structured packet processing primitive 601 and ways primitives 601, 605, 606, 607, and 608 are connected to provide a desired packet processing network function. For achieving the implementation flexibility disclosed in the descriptions of FIGS. 5A-5B, the data plane service implementation (DPSI) platform structures service creation primitives in a uniform manner as generic structured packet processing primitives. Each generic structured packet processing primitive 601 comprises a name, a type, an identifier (ID), and a specification of a primitive instance. The name is an optional field to specify the name of the primitive instance. The type is a field denoting the type of the primitive instance. The ID is a global unique reference ID of the primitive instance. The specification is a field providing a detailed specification of the primitive instance. The detailed specification of the primitive instance comprises an array of components 602, 603, 604, etc., incorporated in a tier 1 primitive logic block as illustrated in FIG. 6. Each component comprises: (a) name: name of the component; and (b) enable: boolean to indicate whether the component is to be concerned in a particular primitive instance. Each component comprises an array of elements incorporated in a tier 2 primitive logic block. For example, the component 602 comprises an array of elements 602a, 602b, 602c, etc.; the component 603 comprises an array of elements 603a, 603b, 603c, etc.; and the component 604 comprises an array of elements 604a, 604b, 604c, etc.; as illustrated in FIG. 6. Each element comprises: (a) name: name of the element; (b) enable: boolean to indicate whether the element is to be concerned in a particular primitive instance; and (c) match_actions: a list of matching criteria and corresponding handles of the element in the particular primitive instance. An exemplary list of matching criteria and corresponding handles of an element in a particular primitive instance is disclosed below:

(a) range: a match range of the relevant element
  (i) [start, end]: a range from start to end
  (ii) [value]: a single value range
(b) action: action to be taken
  (i) noop: no operation. if "action" does not exist, treat as "noop"
  (ii) drop: drop the packet
  (iii) pass-up: pass the packet up to the upper tier; e.g., when the first packet is received by a network access control (NAC) primitive, the extensible authentication protocol (EAP) authentication needs to be invoked, and the EAP authentication is done by a general software implementation. Other examples comprise deep packet inspection (DPI)-based firewall, correlation-based classification, sophisticated packet processing, etc.
  (iv) primitive specific action: follow the action instructions of the current primitive for the matching; e.g., do network address translation (NAT), access control list (ACL), routing/switching, etc.
(c) next: next step of processing
  (i) noop: no more processing, forward to a network interface 609 for transmitting. If "next" does not exist, treat as "noop"
  (ii) continue: continue and forward to the next element in array, or to the next component if last element.
  (iii) break: breakout of the element array and forward to the referenced next component in current primitive
  (iv) primitive: forward to the next downstream primitive 605, 606, 607, or 608
  (v) handle: detailed specification of the next processing handle
  (vi) for primitive type handle: reference ID of the receiving primitive, receiving primitive type, inputs to receiving primitive
  (vii) for break type handle: reference to the receiving component within the primitive is provided. If "handle" does not exist, default reference is the next component in sequence within the primitive.
  (viii) for continue type handle: reference to the receiving element within the component or the receiving component within the primitive if last element in the array. If no reference is provided, continue to the next element or component in sequence.

Figure 7:
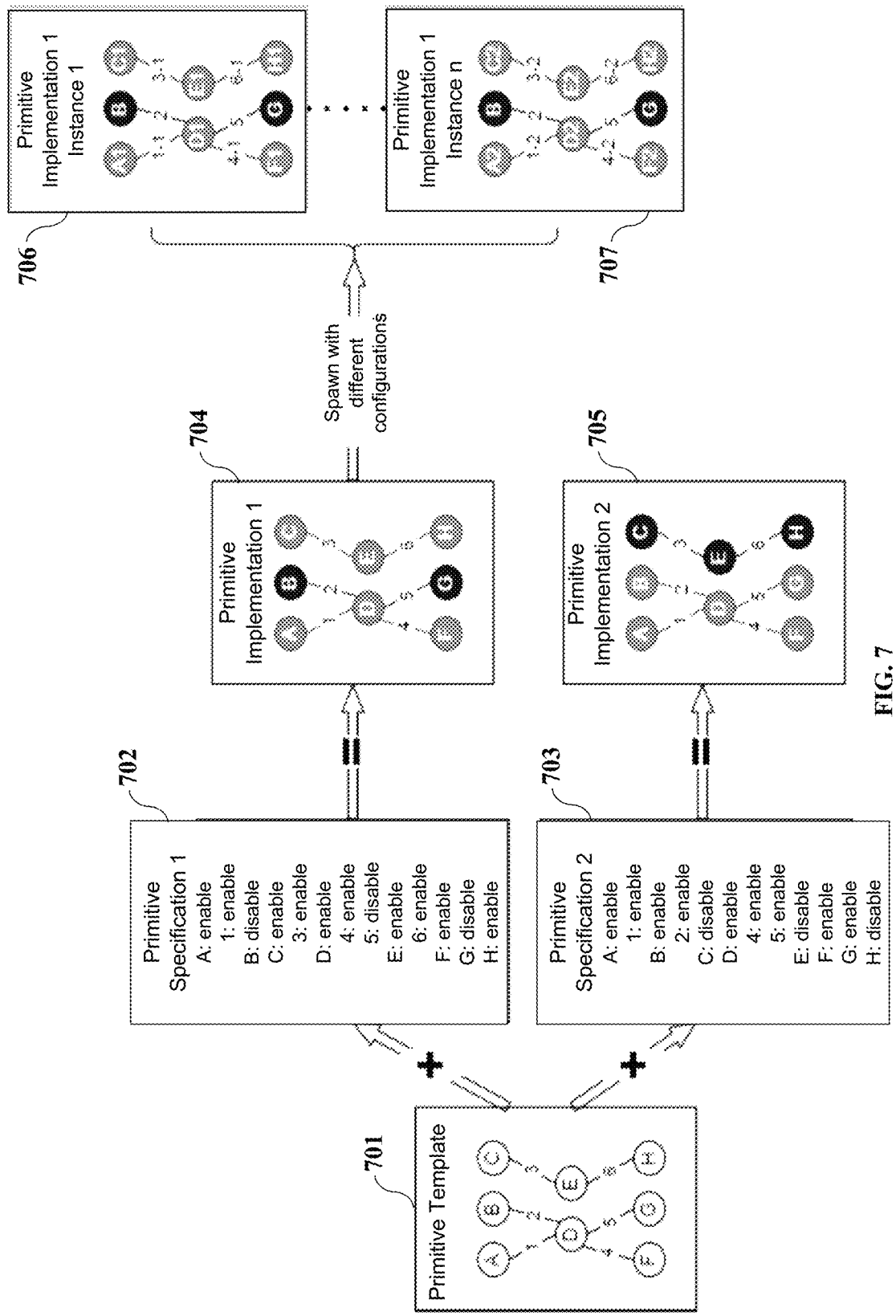
FIG. 7 illustrates a schematic showing creation of an executable primitive instance from a primitive template and a primitive specification.

FIG. 7 illustrates a schematic showing creation of an executable primitive instance, for example, 706, 707, etc., from a primitive template 701 and a primitive specification 702 or 703. The data plane service implementation (DPSI) platform implements each primitive instance 706, 707, etc., as an independent, self-contained, functional part of a whole data plane packet processing network function of different use cases. The DPSI platform creates a packet processing primitive by applying a use-case-specific primitive specification, for example, 702 or 703, to a corresponding primitive template 701 retrieved from the primitive repository. The primitive template 701 is a framework logic that is customizable with different primitive specifications, for example, 702 and 703, to define different implementations, for example, 704 and 705, of the same type of primitives. Examples of primitive templates comprise templates for a packet parser primitive, a traffic classification primitive, an access control list (ACL)/firewall primitive, a network access control (NAC) primitive, a network address translation (NAT) primitive, a traffic shaping/policing primitive, a traffic routing/switching primitive, a traffic manipulation primitive, a traffic queuing and scheduling primitive, a traffic correlation/synchronization primitive, etc. A primitive specification, for example, 702 or 703, is a set of primitive-specific parameters configured to define and scope coverage of functionalities of the primitive implementation, for example, 704 or 705, out of the corresponding primitive template 701. A user, for example, developer, creates the primitive specification by setting various parameters associated with a primitive. The developer may enable or disable different parameters in the primitive specification. The primitive specification allows customization of a primitive template 701 to serve a function. For example, a classifier primitive classifies incoming traffic based on different fields of a packet header such as source and/or destination internet protocol (IP) addresses, source and/or port number, protocol, etc. The DPSI allows the developer to control the parameters in the primitive specification by enabling or disabling different fields of the packet header for classifying the incoming traffic as per the use case. A primitive implementation, for example, 704, is the combination of a primitive template 701 and a primitive specification, for example, 702, that can be used to spawn a primitive instance 706, 707, etc. A primitive instance, for example, 706, 707, etc., is a realization of a primitive implementation 704 with necessary configurations.

Disclosed below is a general definition of a primitive specification. Details for different types of primitives are differently customized in the general format disclosed below.

```
{
  "name" : "optional name of the primitive",
  "type" : "type of the primitive, e.g. classifier and so on",
  "id" : "global unique identification of the primitive",
  "specification" : {
    // per type specific primitive specification as defined in the following sections
    "components" : [
      // array of logical components of the primitive,
      // e.g. the protocol layers in traffic classification primitive
      {
        "name" : "name or tag of the first component",
        "enable" : true / false, // boolean to indicate if this component shall be enabled
        "elements" : [
          // array of elements within this component
          {
            "name" : "name or tag of the first element",
            "enable" : true / false, // boolean to indicate if this element shall be enabled
            "match_actions" : [
              // array of matching criteria and corresponding handling instructions for this element
              {
                "range" : ["range1-start","range1-end"], // matching range of this element
                "action" : "any primitive specific action", // do primitive specific action
                "next" : "continue", // continue the packet processing to the next referenced element within this component
                "handle" : {
                  "$ref" : "#/specification/components[0][elements[1]" // continue to next element
                }
              },
              {
                "range" : ["range2-start","range2-end"], // matching range of this element
                "action" : "any primitive specific action",
                "next" : "continue", // continue the packet processing to the next element in sequence
              },
              {
                "range" : ["range3-start","range3-end"], // matching range of this element
                "action" : "any primitive specific action",
                "next" : "break", // continue the packet processing to the next referenced component within this primitive
                "handle" : {
                  "$ref" : "#/specification/components[0]" // continue to next component
                }
              },
              ,
              {
                "range" : ["range4-start","range4-end"], // matching range of this element
                "action" : "any primitive specific action",
                "next" : "break", // continue the packet processing to the next component in sequence within this primitive
              },
              {
                "range" : ["range5-start","range5-end"], // matching range of this element
                "action" : "any primitive specific action", // do primitive specific action, e.g. NAT
                "next" : "primitive", // continue the packet processing by the specified downstream primitive
                "handle" : { // handling primitive when match found
                  "handling_primitive_type" : "type of the receiving primitive",
                  "handling_primitive_id" : "global instance id of the receiving primitive"
                  "handling_primitive_inputs" : {
                    // meta data set from parser
                    "meta_data" : { // meta data set object output from parser primitive }
                    // per primitive type specific inputs required by the receiving primitive
                  }
                }
              },
              // more match-action items if any
              {
                // last match-action item
                "range" : ["range6-start","range6-end"], // matching range of this element
                "action" : "any primitive specific action", // do primitive specific action, e.g. NAT
                "next" : "noop" // no more operation, forward to NIC for transmission
              },
              {
                // default handle
                "range" : nil, // all remaining values out of above explicitly specified ranges
                "action" : "...",
                "next" : "noop" // no more operation, forward to NIC for transmission
```

```
          }
        ]
      },
      {
        // second element if exist
      },
      // more elements if any
      {
        // last element
      }
    ]
  }, // first component
  { // second component
    // specification of the second component
    // ......
  }, // second component
  // more components if any
  {
    // specification of the last component
  }
    ]
  }
}
```

A user, for example, a developer, creates a use-case-specific primitive specification by customizing details, for example, name, type, identifier, specification, etc., in the general format of the above-disclosed primitive specification for different types of primitives. Disclosed below is an example of a primitive specification created for a packet parser primitive.

```
// Packet parser primitive specification example
{
  "name" : "enterprise-A-parser",
  "type" : "parser",
  "id" : "123e4567-e89b-12d3-a456-426614174000",
  "specification" : {
    "components" : [
      // components[0] - layer 2
      {
        "name" : "layer2",
        "enable" : true,
        "elements" : [
          // first element - layer 2 dest mac address
          {
            "name" : "dest_mac",
            "enable" : true,
            "next" : "continue" // continue to check the next element in sequence
          },
          // second element - layer 2 source mac address
          {
            "name" : "src_mac",
            "enable" : true,
            "next" : "continue" // continue to check the next element in sequence
          },
          // 3rd element
          {
            "name" : "tpid",
            "enable" : true,
            "next" : "continue" // continue to check the next element in sequence
          },
          // 4th element
          {
            "name" : "priority",
            "enable" : true,
            "next" : "continue" // continue to check the next element in sequence
          },
          // 5th element
          {
            "name" : "cfi",
            "enable" : false,
            "next" : "continue" // continue to check the next element in sequence
          },
          // ...
```

```
      // last element
      {
        "name" : "vlan",
        "enable" : true,
        "next" : "continue" // continue to check the next element in sequence
      }
    ]
  }, // components[0]
  // components[1] layer 3 version
  {
    "name" : "layer3-version",
    "enable" : true,
    "elements" : [
      {
        "name" : "version", // IPv4 or IPv6
        "enable" : true,
        "match-actions" : [
          {
            "range" : ["ipv4"],
            "next" : "continue",
            "handle" : {
              "$ref" : "#/specification/components[2]" // point to the layer3-v4 component
            }
          },
          {
            "range" : ["ipv6"],
            "next" : "continue",
            "handle" : {
              "$ref" : "#/specification/components[3]" // point to the layer3-v6 component
            }
          }
        ]
      }
    ]
  }, // components[1]
  // components[2] layer 3 IPv4
  {
    "name" : "layer3-v4",
    "enable" : true,
    "elements" : [
      {
        "name" : "tos", // type of service
        "enable" : true,
        "next" : "continue" // continue to check the next element in sequence
      }, // tos
      {
        "name" : "identification",
        "enable" : false
      }, // identification
      {
        "name" : "flags_df",
        "enable" : false
      },
      {
        "name" : "flags_mf",
        "enable" : false
      },
      {
        "name" : "ttl",
        "enable" : false
      },
      {
        "name" : "protocol",
        "enable" : true,
        "next" : "continue" // continue to check the next element in sequence
      }, // protocol
      {
        "name" : "dest_addr",
        "enable" : true,
        "next" : "continue" // continue to check the next element in sequence
      } // dest_addr
      {
        "name" : "src_addr",
        "enable" : true,
        "next" : "continue" // continue to check the next element in sequence
      } // src_addr
    ] // elements
  } // components[2]
  // components[3] layer 3 IPv6
```

```
{
  "name" : "layer3-v6",
  "enable" : true,
  "elements" : [
      {
        "name" : "traffic_class", // type of service
        "enable" : true,
        "next" : "continue" // continue to check the next element in sequence
      },
      {
        "name" : "flow_label",
        "enable" : true,
        "next" : "continue" // continue to check the next element in sequence
      },
      {
        "name" : "next_hdr",
        "enable" : true,
        "next" : "continue" // continue to check the next element in sequence
      },
      {
        "name" : "hop_limit",
        "enable" : false
      },
      {
        "name" : "dest_addr",
        "enable" : true,
        "next" : "continue" // continue to check the next element in sequence
      } // dest_addr
      {
        "name" : "src_addr",
        "enable" : true,
        "next" : "continue" // continue to check the next element in sequence
      } // src_addr
  ]
}, // components[3]
// components[4] layer4 TCP
{
  "name" : "layer4-tcp",
  "enable" : true,
  "elements" : [
     // ......
  ]
},
// components[5] layer4 UDP
{
  "name" : "layer4-udp",
  "enable" : true,
  "elements" : [
     // ......
  ]
},
// components[6] layer4 SCTP
{
  "name" : "layer4-sctp",
  "enable" : true,
  "elements" : [
     // ......
  ]
},
// any other layer 4 protocol specific component can be defined in a similar manner
// e.g. components[7] through components[n]
// components[n+1]
{
  "name" : "layer5-gtpu",
  "enable" : true,
  "elements" : [
     // ......
  ]
},
// additional components if any
// ......
// last component
{
  "name" : "last-component",
  "enable" : true,
  "elements" : [
     // ......
  ]
}
```

```
        ] // components
    } // specification
}
```

Another example of a primitive specification created for a network address translation (NAT) primitive is disclosed below.

```
{
  "name" : "enterprise-A-nat-1",
  "type" : "nat",
  "id" : "123e4567-e89b-12d3-a456-426614174010",
  "specification" : {
    "components" : [
        { // component[0]
          "rule" : "nat",
          "enable" : true / false, // boolean to indicate if this component shall be enabled
          "elements" : [
            // array of elements within this component
              {
                "nat_table" : "nat table id", // governing NAT table
                "enable" : true / false, // boolean to indicate if this element shall be enabled
                "match_actions" : [
                    // array of matching criteria and corresponding handling instructions for this element
                    {
                      "range" : ["nat_table_1"], // matching value of this element
                      "action" : "follow/bypass", // follow or bypass the NAT instructions
                      "next" : "primitive", // next handling entity (e.g. a downstream primitive) of fall through traffic
                      "handle" : { // handling primitive when match found
                          "handling_primitive_type" : "type of the receiving primitive",
                          "handling_primitive_id" : "global instance id of the receiving primitive"
                          "handling_primitive_inputs" : {
                              "meta_data" : { // meta data set object output from parser primitive }
                              // per primitive type specific inputs required by the receiving primitive
                          }
                      }
                    },
                    {
                      "range" : ["nat_table_3","nat_table_4"], // matching range of this element, ?? do we have such use case ??
                      "action" : "follow/bypass" // follow or bypass the NAT instructions
                      "next" : "primitive", // next handling entity (e.g. a downstream primitive) of fall through traffic
                      "handle" : { // handling primitive when match found
                          "handling_primitive_type" : "type of the receiving primitive",
                          "handling_primitive_id" : "global instance id of the receiving primitive"
                          "handling_primitive_inputs" : {
                              "meta_data" : { // meta data set object output from parser primitive }
                              // per primitive type specific inputs required by the receiving primitive
                          }
                      }
                    },
                    // more match-action items if any
                    {
                      // last match-action item
                    },
                    {
                      // default handle
                      "range" : nil,   // all remaining values out of above explicitly specified ranges
                      "handle" : {
                          // ......
                      }
                    }
                ]
              }
          ]
        } // component[0]
    ]
  }
}
```

Another example of a primitive specification created for a traffic shaping and policing primitive is disclosed below.

```
// example of traffic shaping primitive
{
  "name" : "enterprise-A-1-shaping-1",
  "type" : "shaping",
  "id" : "123e4567-e89b-12d3-a456-426614174001",
  "specification" : {
    "components" : [
      // components[0] - rate control
      {
        "algorithm" : "rate", // rate control
        "enable" : true / false, // indicate if this algorithm is enabled
        "elements" : [ // parameters of the algorithm
          // first element - max allowed average rate
          {
            "enable" : true/false, // optional -- indicate if average rate control is enabled, if false, rate is unlimited
            "rate" : 5000000 // max allowed rate 5Mbps
          }
        ]
      }, // components[0] - rate control
      // components[1] - burst rate control
      {
        "algorithm" : "burst", // burst rate control
        "enable" : true / false, // indicate if this algorithm is enabled
        "elements" : [ // parameters of the algorithm
          // first element - max allowed burst rate
          {
            "enable" : true/false, // optional -- indicate if burst rate is enabled, if false, no limit to the burst rate
            "burst" : 10000000 // max allowed burst rate 10Mbps
          }
        ]
      }, // components[1] - burst rate control
      // any other components
      {
        // ......
      }
    ] // components
  } // specification
}
```

As illustrated in FIG. 7, the data plane service implementation (DPSI) platform creates a primitive implementation 1 704 by combining the primitive template 701 and the primitive specification 1 702. The DPSI platform then uses this combination, that is, the created primitive implementation 1 704 to spawn the primitive instance 1 706 through to the primitive instance n 707 using different configurations of the primitive implementation 1 704. Similarly, the DPSI platform creates a primitive implementation 2 705 by combining the primitive template 701 and the primitive specification 2 703.

Figure 8:
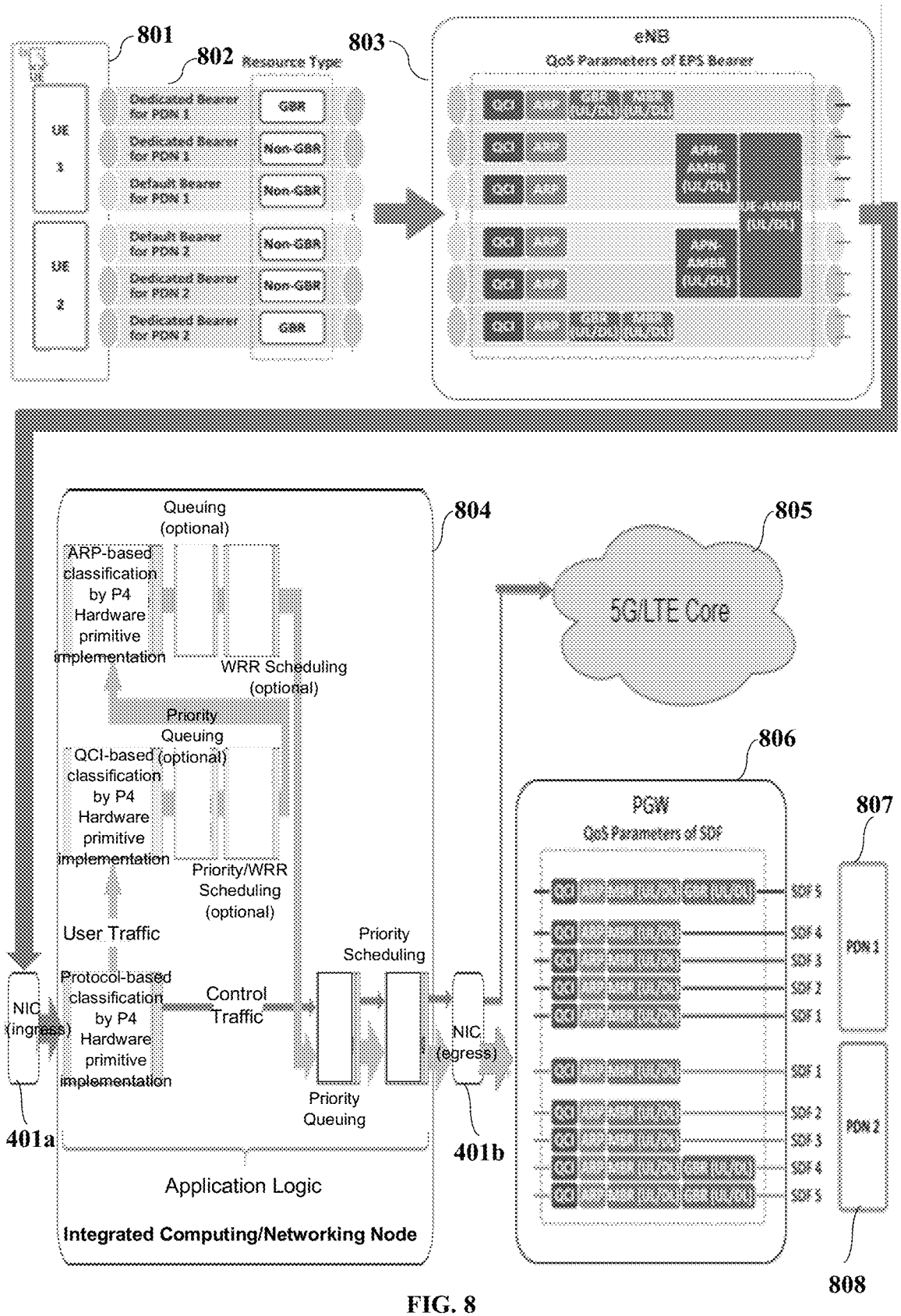
FIG. 8 illustrates an exemplary flow diagram showing handling of a long-term evolution (LTE)/fifth generation (5G) quality of service (QOS) flow by execution of an application logic created through the DPSI platform.

FIG. 8 illustrates an exemplary flow diagram showing handling of a long-term evolution (LTE)/fifth generation (5G) quality of service (QOS) flow by execution of an application logic created through the data plane service implementation (DPSI) platform. The DPSI platform creates an application logic based on a use-case-specific application logic specification using one or more packet processing primitives corresponding to the use-case-specific application logic specification. In an example, for LTE/5G QoS flow handling, the DPSI platform creates an application logic responsible for: (a) classifying and separating control and user traffic, and (b) classifying user plane traffic based on mobile QoS settings comprising, for example, QoS class identifier (QCI), allocation and retention priority (ARP), guaranteed bit rate (GBR)/maximum bit rate (MBR)/aggregate maximum bit rate (AMBR), etc. In the step of classifying and separating control and user traffic, the application logic is responsible for delivering control traffic to a mobile core, for example, a 5G/LTE core 805, and based on the user plane traffic mobile QoS settings, for delivering user traffic to a packet data network (PDN) 807 or 808 via a packet data network gateway (PGW) 806. In the step of classifying user plane traffic based on mobile QoS settings, the application logic is responsible for handling different user plane traffic differently via queuing and scheduling as illustrated in FIG. 8.

The LTE/5G QOS flow from user equipment 801 comprising mobile devices or other network-enabled devices, to an evolved node B (eNB) 803 via dedicated bearers 802, and then to an integrated computing/networking node 804 that applies the application logic to ingress traffic is illustrated in FIG. 8. An ingress network interface controller (NIC) 401a receives the ingress traffic and routes the ingress traffic to the integrated computing/networking node 804. The application logic is applied to the ingress traffic in the integrated computing/networking node 804. As illustrated in FIG. 8, the ingress traffic undergoes protocol-based classification, from where control traffic undergoes priority queuing and priority scheduling to pass output traffic to an egress NIC 401b. Furthermore, user traffic undergoes QCI-based classification and optionally, priority queuing and priority/weighted round robin (WRR) scheduling, prior to undergoing ARP-based classification and optionally, queuing and WRR scheduling. After ARP-based classification and optional queuing and WRR scheduling, the output traffic undergoes priority queuing and priority scheduling and passes to the egress NIC 401b. The egress NIC 401b controls egress traffic that exits the integrated computing/networking node 804. Based on the application logic, the integrated computing/networking node 804 delivers control traffic to the 5G/LTE core 805, and based on the user plane traffic mobile QoS settings, delivers user traffic to the PDN 807 or 808 via the PGW 806 as illustrated in FIG. 8.

Figure 9:
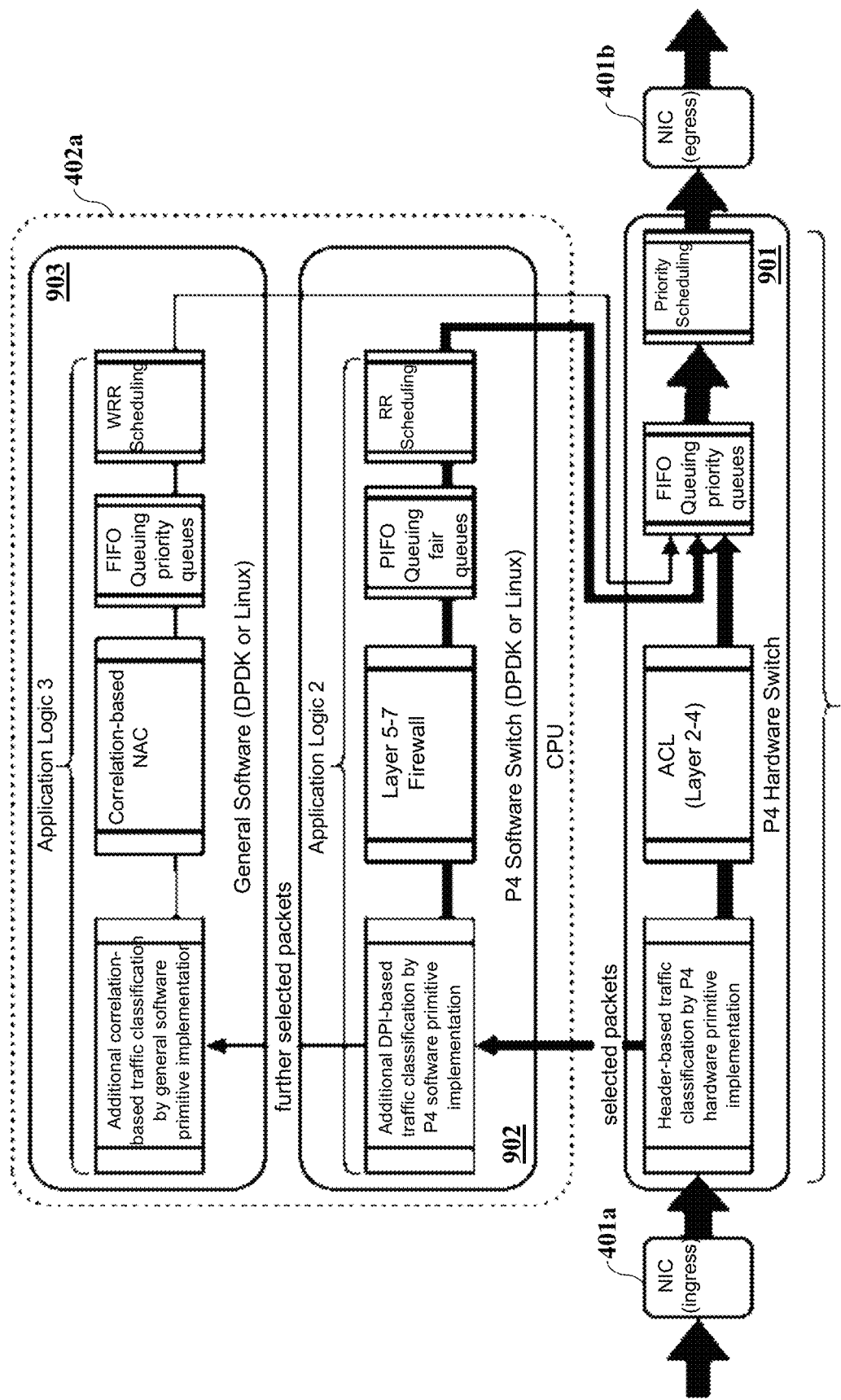
FIG. 9 illustrates a flow diagram showing execution of exemplary access control list (ACL), firewall, and correlation-based network access control (NAC) application logics to be applied to different application traffic.

FIG. 9 illustrates a flow diagram showing execution of exemplary access control list (ACL), firewall, and correlation-based network access control (NAC) application logics to be applied to different application traffic. FIG. 9 shows a customized solution for sophisticated traffic flow-based traffic control, shaping, queuing, and scheduling by employing three application logics 1, 2, and 3 created through the data plane service implementation (DPSI) platform. The three application logics 1, 2, and 3 are disclosed below.

Application Logic 1
   1.1 do layer 2 through 4 access control list (ACL)
   1.2 composed of 4 packet processing primitives
     (a) header-based traffic classifier for traffic classification
     (b) ACL based on layer 2-4 rules
     (c) multiple priority First-in, First-out (FIFO) queues for classified pass-through traffic
     (d) do priority scheduling on priority FIFO queues
   1.3 handles all incoming traffic and forwards some of the qualified traffic to Application logic 2 for further processing Application Logic 2
   2.1 composed of 4 packet processing primitives
     (a) Deep packet inspection (DPI)-based traffic classifier for in-depth traffic classification
     (b) Firewall based on layer 5-7 information out of DPI
     (c) multiple push-in, first-out (PIFO) queues to assist traffic shaping/policing at enqueuing
     (d) Round Robin (RR) scheduling
   2.2 Handles traffic deferred from Application logic 1 and forwards further qualified traffic to Application logic 3.

Application Logic 3
   3.1 composed of 4 packet processing primitives
     (a) correlation-based traffic classification for further traffic classification
     (b) do correlation-based network access control (NAC)
     (c) multiple priority FIFO queues
     (d) Weighted Round Robin (WRR) scheduling
     Output traffic from Application logics 2 and 3 are enqueued into queues in Application logic 1 for sending to a network interface.

In an exemplary implementation, packet processing primitives that constitute the application logics 1, 2, and 3 disclosed above are implemented on programmable hardware, for example, on a programming protocol-independent packet processors (P4) hardware switch 901; as a P4 module, for example, on a P4 software switch 902 to be run on a processing unit, for example, a central processing unit (CPU) 402a; and in general software 903 as a general software module to be run on the CPU 402a, respectively, as illustrated in FIG. 9. As illustrated in FIG. 9, header-based traffic classification is performed by a P4 hardware primitive implementation on the P4 hardware switch 901. That is, a header-based traffic classifier is implemented on the P4 hardware switch 901. Header-based traffic classification is a data plane packet processing function configured to classify headers of each incoming packet. Moreover, an additional DPI-based traffic classification is performed by a P4 software primitive implementation on the P4 software switch 902 running on the CPU 402a. That is, a DPI-based traffic classifier is implemented on the P4 software switch 902 running on the CPU 402a. DPI-based traffic classification is a data plane packet processing function configured to classify each incoming packet based on a detailed examination of content and a large range of metadata of the packet as the packet passes through a checkpoint on a network. Furthermore, an additional correlation-based traffic classification is performed by a general software primitive implementation as general software 903 running on the CPU 402a. That is, a correlation-based traffic classifier is implemented as general software 903 running on the CPU 402a. Correlation-based traffic classification is a data plane packet processing function configured to classify each incoming packet based on, for example, mathematically-defined similarity and dissimilarity measures that correlate different components to each other, where the resulting correlation coefficients reflect the magnitude of the co-linear relationship of the components. The correlation logic is executed in the CPU 402a as a general software module.

As exemplarily illustrated in FIG. 9, on receiving the incoming traffic, also referred to as "ingress traffic", from an ingress network interface controller (NIC) 401a, the header-based traffic classifier on the P4 hardware switch 901 selects packets to be forwarded to the P4 software switch 902 running on the CPU 402a, based on the header-based traffic classification performed on the ingress traffic. Furthermore, according to the application logic 1 disclosed above, the processed packets output from the header-based traffic classifier undergo ACL rules based on layer 2 through 4 metadata. Classified pass-through traffic is then sent to the FIFO queues, from where priority scheduling is performed on priority FIFO queues. The output traffic from the P4 hardware switch 901 is forwarded to the network interface, for example, an egress NIC 401b.

The P4 software switch 902, implemented on a data plane development kit (DPDK) 403a or on an operating system (OS) network stack, for example, a Linux® network stack 403b as illustrated in FIG. 4, receives the selected packets from the P4 hardware switch 901. The DPI-based traffic classifier on the P4 software switch 902 further selects packets to be forwarded to the general software 903 running on the CPU 402a, based on an in-depth traffic classification, also referred to as the DPI-based traffic classification, performed on the previously selected packets. Furthermore, the processed packets output from the DPI-based traffic classifier undergo processing by the remaining packet processing primitives, that is, the firewall based on layer 5-7 metadata, multiple PIFO queues that assist traffic shaping/policing at enqueuing, and round robin (RR) scheduling that constitute the application logic 2 disclosed above. The output traffic from the P4 software switch 902 undergoes FIFO queuing and priority scheduling as specified in the application logic 1 in the P4 hardware switch 901 and is forwarded to the egress NIC 401b. The general software 903 running on the CPU 402a, implemented on a DPDK 403a or on an OS network stack, for example, a Linux® network stack 403b as illustrated in FIG. 4, receives the further selected packets from the P4 software switch 902. The correlation-based traffic classifier in the general software 903 processes the further selected packets by performing the correlation-based traffic classification on the further selected packets. Furthermore, the processed packets output from the correlation-based traffic classifier undergo a correlation-based NAC, priority FIFO queuing, and weighted round robin (WRR) scheduling as specified in the application logic 3 disclosed above. The output traffic from the general software 903 undergoes FIFO queuing and priority scheduling as specified in the application logic 1 in the P4 hardware switch 901, from where the output traffic is forwarded to the egress NIC 401b.

Figure 10:
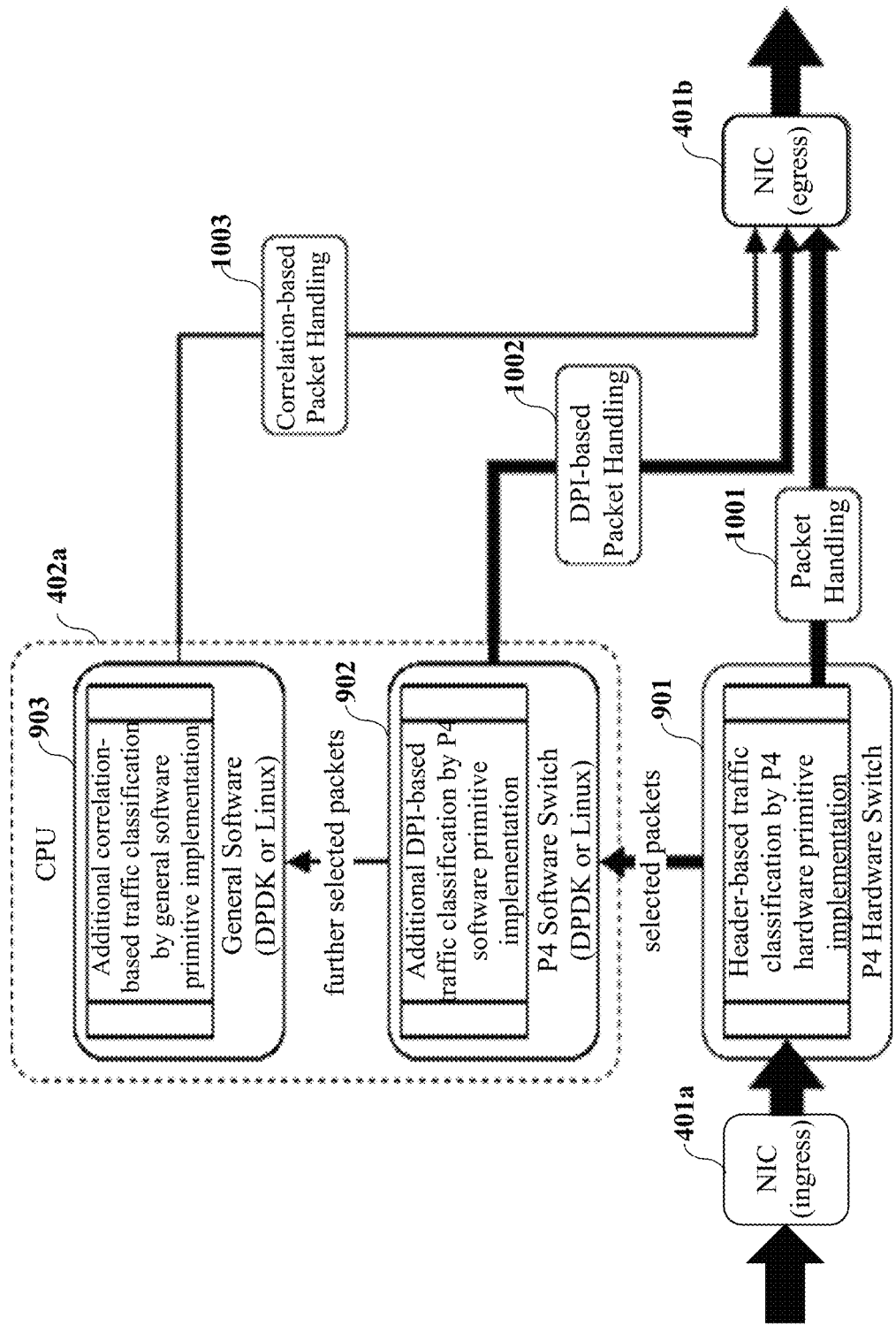
FIG. 10 illustrates an exemplary flow diagram showing an optimized implementation of packet processing primitives in an advanced traffic classification use case in which deep packet inspection (DPI) and traffic flow correlation-based classification logic are applied to selected traffic that need such level of classification per user functional requirements.

FIG. 10 illustrates an exemplary flow diagram showing an optimized implementation of packet processing primitives in an advanced traffic classification use case in which deep packet inspection (DPI) and traffic flow correlation-based classification logic are applied to selected traffic that need such level of classification per user functional requirements. The data plane service implementation (DPSI) platform defines traffic classification goals for the advanced traffic classification use case. The traffic classification goals comprise, for example: (1) classifying incoming traffic by headers; (2) performing additional packet payload, DPI-based traffic classification on selected packets; (3) performing further correlation-based traffic classification on qualified packets received in step (2); and processing packets according to the classification. In an exemplary implementation of the traffic classification use case, the packet processing primitives are implemented on programmable hardware, for example, on a programming protocol-independent packet processors (P4) hardware switch 901; as a P4 module, for example, on a P4 software switch 902 to be run on a central processing unit (CPU) 402a; and in general software 903 to be run on the CPU 402a, as illustrated in FIG. 10. Furthermore, in this exemplarily implementation, the packet processing primitives comprise a header-based traffic classifier configured to perform header-based traffic classification; an additional deep packet inspection (DPI)-based traffic classifier configured to perform DPI-based traffic classification; and an additional correlation-based traffic classifier configured to perform correlation-based classification as disclosed in the description of FIG. 9. The header-based traffic classifier is implemented on the P4 hardware switch 901. The DPI-based traffic classifier is implemented on the P4 software switch 902 running on the CPU 402a. The correlation-based traffic classifier is implemented as general software 903 running on the CPU 402a.

As exemplarily illustrated in FIG. 10, on receiving the incoming traffic, also referred to as "ingress traffic", from the ingress network interface controller (NIC) 401a, the header-based classifier implemented on the P4 hardware switch 901 selects packets to be forwarded to the P4 software switch 902 running on the CPU 402a, based on the header-based traffic classification performed on the incoming packets. The output traffic from the P4 hardware switch 901 undergoes packet handling 1001 and is forwarded to the egress NIC 401b. The P4 software switch 902, implemented on a data plane development kit (DPDK) 403a or on an operating system (OS) network stack, for example, a Linux® network stack 403b as illustrated in FIG. 4, receives the selected packets from the P4 hardware switch 901. The DPI-based traffic classifier implemented on the P4 software switch 902 further selects packets to be forwarded to the general software 903 running on the CPU 402a, based on the additional DPI-based traffic classification performed on the previously selected packets. The output traffic from the P4 software switch 902 undergoes DPI-based packet handling 1002 and is forwarded to the egress NIC 401b. The general software 903 running on the CPU 402a, implemented on a DPDK 403a or on an OS network stack, for example, a Linux® network stack 403b as illustrated in FIG. 4, receives the further selected packets from the P4 software switch 902. The correlation-based traffic classifier in the general software 903 processes the further selected packets by performing the correlation-based traffic classification on the further selected packets. The output traffic from the general software 903 undergoes correlation-based packet handling 1003 and is forwarded to the egress NIC 401b.

Figure 11:
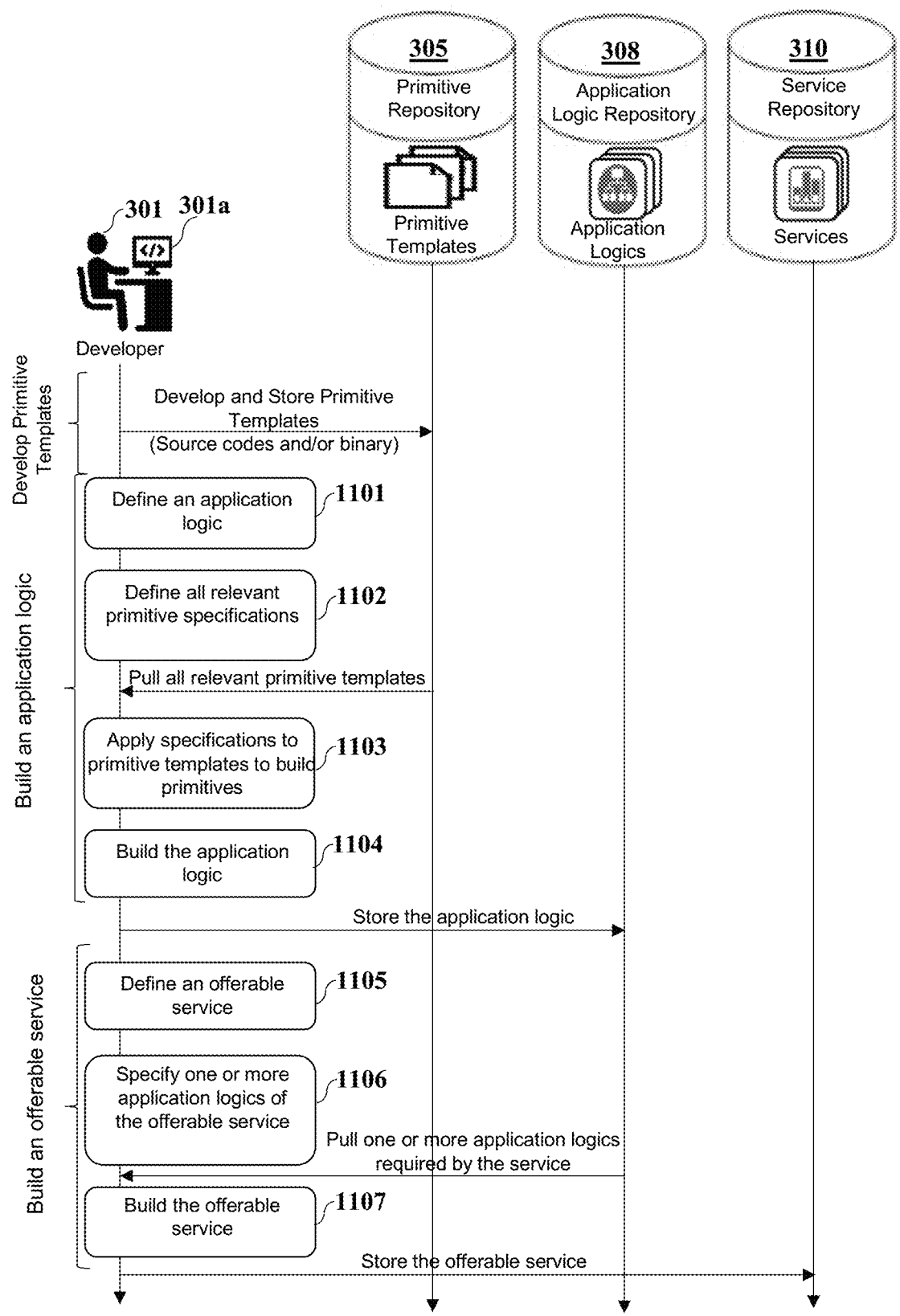
FIG. 11 illustrates a schematic showing primitive, application logic, and service creation flows performed by a developer user of the DPSI platform.

FIG. 11 illustrates a schematic showing primitive, application logic, and service creation flows performed by a developer user 301 of the data plane service implementation (DPSI) platform. A developer user 301, herein referred to as a "developer", typically understands technical details of overall service creation procedures and is, therefore, capable of creating primitive templates, packet processing primitives herein referred to as "primitives", application logics, and network service packages herein referred to as "offerable services", through direct creation procedures without dependency on application programming interfaces (APIs) for efficiency. These direct creation procedures are more suitable for building primitive templates, primitives, and all commonly used pre-built application logics and offerable services. As such, the DPSI platform allows the developer 301 to perform service creation related activities comprising developing primitive templates, building an application logic, and building an offerable service, using a developer device 301a, for example, a desktop computer, a laptop, a tablet computing device, etc. The developer 301 accesses user interfaces rendered by the DPSI platform on the developer device 301a for performing the service creation related activities. The DPSI platform allows the developer 301 to develop and store primitive templates in a source code form and/or a binary form in the primitive repository 305.

To build an application logic, the DPSI platform allows the developer 301 to build primitives, and then build the application logic using one or more of the primitives. The DPSI platform allows the developer 301 to define 1101 an application logic and define 1102 relevant primitive specifications via one or more user interfaces rendered on the developer device 301a. The DPSI platform retrieves or pulls relevant primitive templates corresponding to the defined primitive specifications from the primitive repository 305. The DPSI platform allows the developer 301 to apply 1103 the primitive specifications to the primitive templates to build the primitives. The DPSI platform then allows the developer 301 to build 1104 the application logic based on the defined application logic using the built primitives and stores the built application logic in the application logic repository 308. To build an offerable service, the DPSI platform allows the developer 301 to define 1105 the offerable service and specify 1106 one or more application logics of the offerable service via one or more user interfaces rendered on the developer device 301a. The DPSI platform retrieves or pulls the specified application logic(s) required by the offerable service from the application logic repository 308. The DPSI platform then allows the developer 301 to build 1107 the offerable service comprising the application logic(s) and stores the offerable service in the service repository 310.

Figure 12:
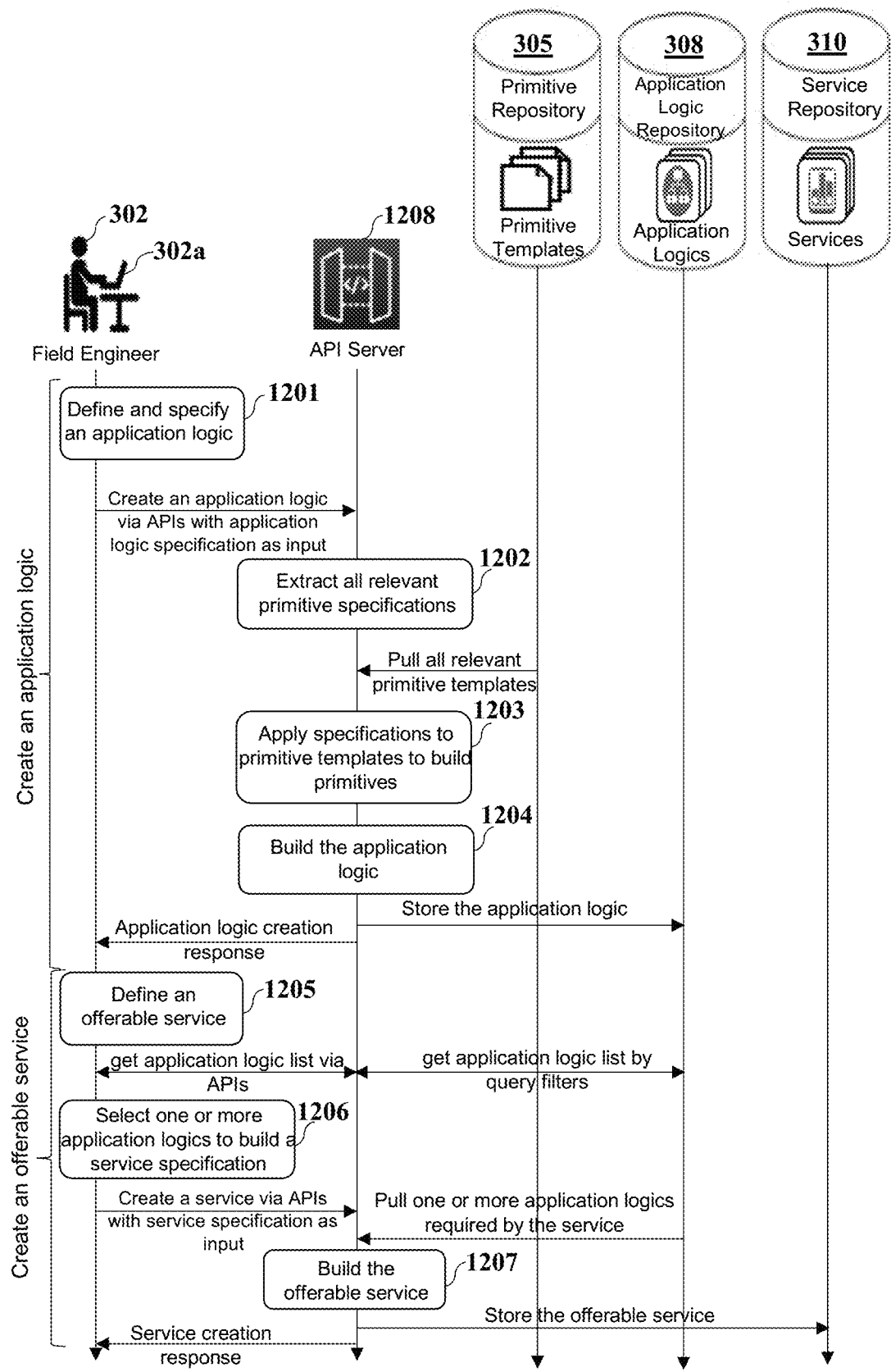
FIG. 12 illustrates a schematic showing application logic and service creation flows performed by a field engineer user of the DPSI platform.

FIG. 12 illustrates a schematic showing application logic and service creation flows performed by a field engineer user 302 of the data plane service implementation (DPSI) platform. A field engineer user 302, herein referred to as a "field engineer", typically has less knowledge of service creation internals than a developer, but has more knowledge of service creation internals than a customer administrator. The field engineer 302 is, therefore, capable of creating primitives, application logics, and offerable services using the service creation application programming interfaces (APIs). The DPSI platform allows the field engineer 302 to pre-build primitives, application logics, and offerable services in accordance with customer requests. The DPSI platform allows the field engineer 302 to perform service creation related activities comprising creation of an application logic and creation of an offerable service using an API client deployed on a field engineer device 302a, for example, a desktop computer, a laptop, a tablet computing device, etc. The API client communicates with an API server 1208 via a network, for example, the internet.

In an embodiment, the API server 1208 comprises at least one processor and is communicatively coupled to the service creation APIs and operably coupled to the data plane service implementation (DPSI) platform. The API server 1208 receives and handles calls to the APIs. The API server 1208 interprets use-case-specific primitive specifications, use-case-specific application logic specifications, and use-case-specific service specifications inputted into the DPSI platform, via the calls to one or more of the APIs. The API server 1208 derives primitive specifications from a use-case-specific application logic specification and a use-case-specific service specification. The API server 1208 triggers the modules of the DPSI platform to create the packet processing primitive, the application logic, and the network service package herein referred to as the "offerable service", based on a use-case-specific primitive specification, the use-case-specific application logic specification, and the use-case-specific service specification, respectively. The API server 1208 responds to the calls to the APIs with a status message, for example, a success or fail message.

To create an application logic, the data plane service implementation (DPSI) platform allows the field engineer 302 to define and specify 1201 an application logic via one or more user interfaces rendered by the DPSI platform on the field engineer device 302a. The DPSI platform allows the field engineer 302 to create the application logic via the APIs in operable communication with the API server 1208, with the application logic specification as an input. The API server 1208 receives an API call with the application logic specification from the API client on the field engineer device 302a via one or more of the APIs. The API server 1208 extracts 1202 relevant primitive specifications from the application logic specification. The API server 1208 then retrieves or pulls relevant primitive templates corresponding to the extracted primitive specifications from the primitive repository 305. The API server 1208 then applies 1203 the extracted primitive specifications to the retrieved primitive templates to build the primitives. In an embodiment, the API server 1208 triggers the primitive builder 306 illustrated in FIG. 3, to build the primitives as disclosed above. Furthermore, the API server 1208 builds 1204 the application logic based on the application logic specification using the built primitives. The API server 1208 stores the built application logic in the application logic repository 308 and sends an application logic creation response to the API client on the field engineer device 302a via the API(s). In an embodiment, the API server 1208 triggers the application logic builder 1402 illustrated in FIGS. 14B-14C, to build and store the application logic as disclosed above.

To create an offerable service, the data plane service implementation (DPSI) platform allows the field engineer 302 to define 1205 the offerable service via one or more user interfaces rendered by the DPSI platform on the field engineer device 302a. In response to an API call from the API client on the field engineer device 302a to the API server 1208, the API client gets an application logic list via one or more of the APIs from the API server 1208. The API server 1208 gets the application logic list from the application logic repository 308 by query filters and sends the application logic list to the API client on the field engineer device 302a via the API(s). The DPSI platform allows the field engineer 302 to select 1206 one or more application logics from the application logic list to build a service specification. The DPSI platform allows the field engineer 302 to create the offerable service via the API(s) in operable communication with the API server 1208, with the service specification as an input. The API server 1208 receives an API call with the service specification from the API client on the field engineer device 302a via the API(s). The API server 1208 retrieves or pulls one or more application logics required by the offerable service from the application logic repository 308. The API server 1208 builds 1207 the offerable service comprising the application logic(s) and stores the built offerable service in the service repository 310. The API server 1208 sends a service creation response to the API client on the field engineer device 302a via the API(s). In an embodiment, the API server 1208 triggers the service builder 316 illustrated in FIG. 3, to build and store the offerable service as disclosed above.

Figure 13:
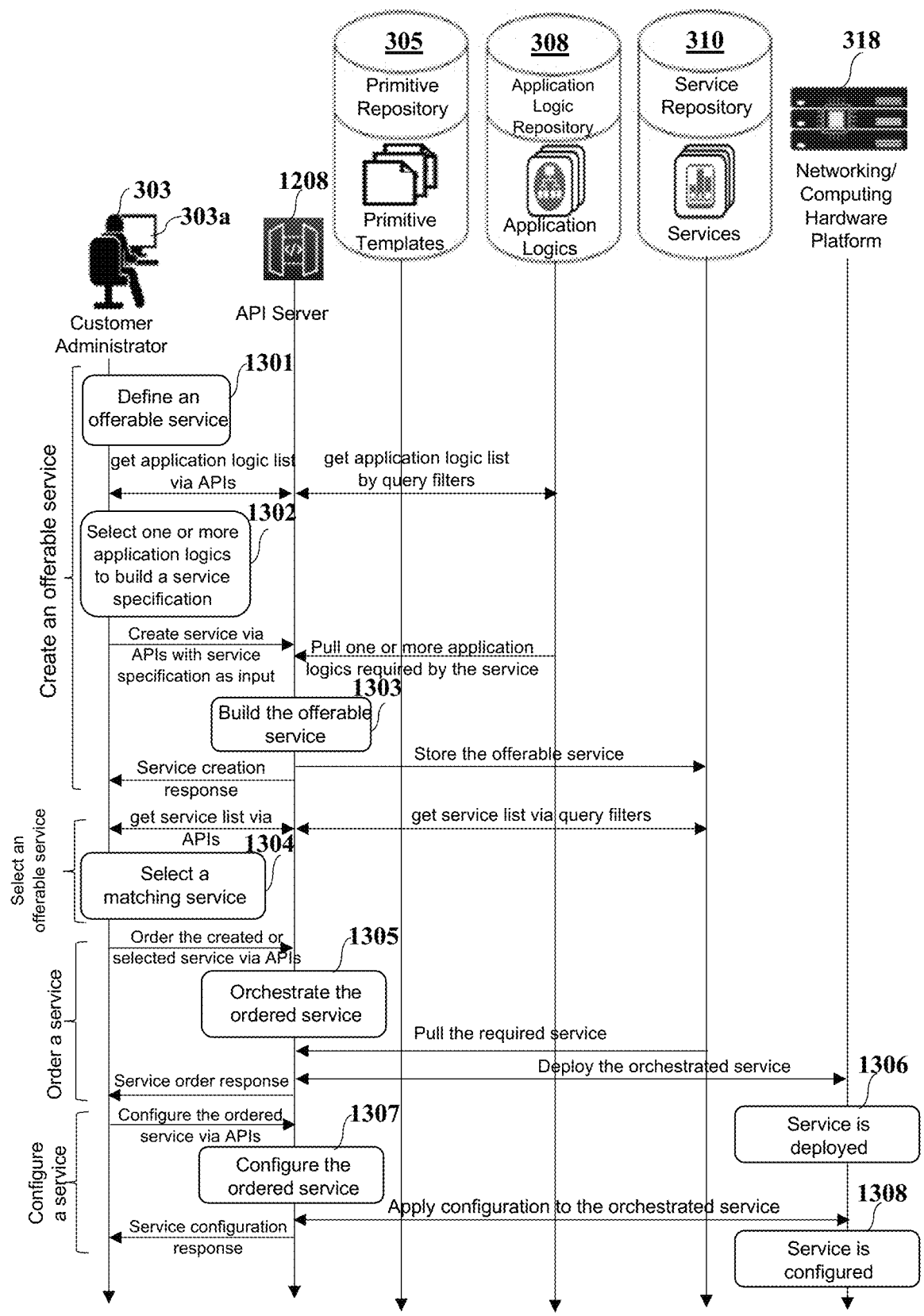
FIG. 13 illustrates a schematic showing a service creation flow performed by a customer administrator user of the DPSI platform.

FIG. 13 illustrates a schematic showing a service creation flow performed by a customer administrator user 303 of the data plane service implementation (DPSI) platform. A customer administrator user 303, herein referred to as a "customer administrator", typically has no knowledge of service creation internals and only understands service requirements from a customer side. The customer administrator 303 is, therefore, only capable of creating services from existing application logics, ordering and deploying the services, and configuring the services using the service creation application programming interfaces (APIs). The DPSI platform allows the customer administrator 303 to perform service creation, ordering, and configuration related activities comprising creating an offerable service, selecting an offerable service, ordering a service, and configuring a service using an API client deployed on a customer device 303a, for example, a desktop computer, a laptop, a tablet computing device, etc. The API client communicates with an API server 1208 via a network, for example, the internet.

To create an offerable service, the data plane service implementation (DPSI) platform allows the customer administrator 303 to define 1301 the offerable service via one or more user interfaces rendered by the DPSI platform on the customer device 303a. In response to an API call from the API client on the customer device 303a to the API server 1208, the API client gets an application logic list via one or more of the APIs from the API server 1208. The API server 1208 gets the application logic list from the application logic repository 308 by query filters and sends the application logic list to the API client on the customer device 303a via the API(s). The DPSI platform allows the customer administrator 303 to select 1302 one or more application logics from the application logic list to build a service specification. The DPSI platform allows the customer administrator 303 to create the offerable service via the API(s) in operable communication with the API server 1208, with the service specification as an input. The API server 1208 receives an API call with the service specification from the API client on the customer device 303a via the API(s). The API server 1208 retrieves or pulls one or more application logics required by the offerable service from the application logic repository 308. The API server 1208 builds 1303 the offerable service comprising the application logic(s) and stores the built offerable service in the service repository 310. The API server 1208 sends a service creation response to the API client on the customer device 303a via the API(s). In an embodiment, the API server 1208 triggers the service builder 316 illustrated in FIG. 3, to build and store the offerable service as disclosed above.

In addition to creating an offerable service, the DPSI platform allows the customer 303 to select an existing offerable service. To select an offerable service, in response to an API call from the API client on the customer device 303a to the API server 1208, the API client gets a service list via one or more of the APIs from the API server 1208. The API server 1208 gets the service list via query filters from the application logic repository 308 and sends the service list to the API client on the customer device 303a via the APIs. The DPSI platform allows the customer administrator 303 to select 1304 a service that matches the requirement from the service list.

Furthermore, the data plane service implementation (DPSI) platform allows the customer administrator 303 to order a created or selected service via one or more of the APIs. In an embodiment, the customer administrator 303 orders a created or selected service by selecting or providing a service identifier (ID) of the service. The API server 1208 communicates with the service orchestrator 317 of the DPSI platform illustrated in FIG. 3, to orchestrate 1305 the ordered service. The API server 1208 retrieves or pulls the required service from the service repository 310 and sends a service order response to the API client on the customer device 303a via the API(s). The service orchestrator 317 deploys the orchestrated service on a service hosting platform, for example, a networking/computing hardware platform 318 as illustrated in FIG. 3.

When the service is deployed 1306 on the networking/computing hardware platform 318, the data plane service implementation (DPSI) platform allows the customer administrator 303 to configure the ordered service via one or more of the APIs. The API server 1208 receives a configuration for the ordered service from the customer device 303a via an API call. The API server 1208 communicates with the service configurator 320 of the DPSI platform illustrated in FIG. 3, to configure 1307 the ordered service. In response to a trigger from the API server 1208, the service configurator 320 applies the configuration to the orchestrated service on the networking/computing hardware platform 318, thereby configuring 1308 the orchestrated service on the networking/computing hardware platform 318. The orchestrated and configured service is then fully functional on the networking/computing hardware platform 318. The API server 1208 sends a service configuration response to the API client on the customer device 303a via the API(s).

Figure 14A:
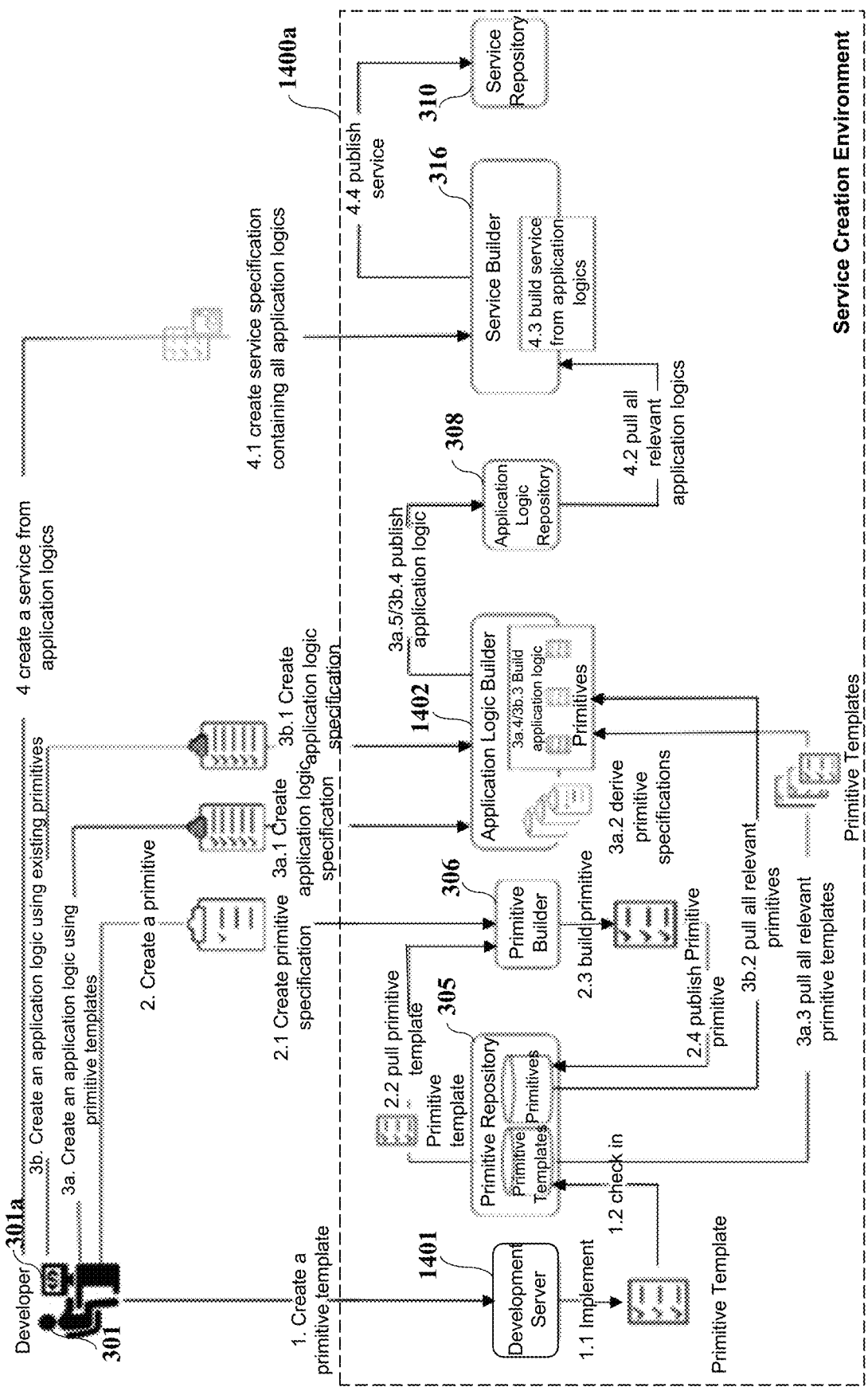
FIGS. 14A-14C illustrate flow diagrams showing architectural components of the DPSI platform and procedures performed by different users of the DPSI platform in different environments.
Figure 14B:
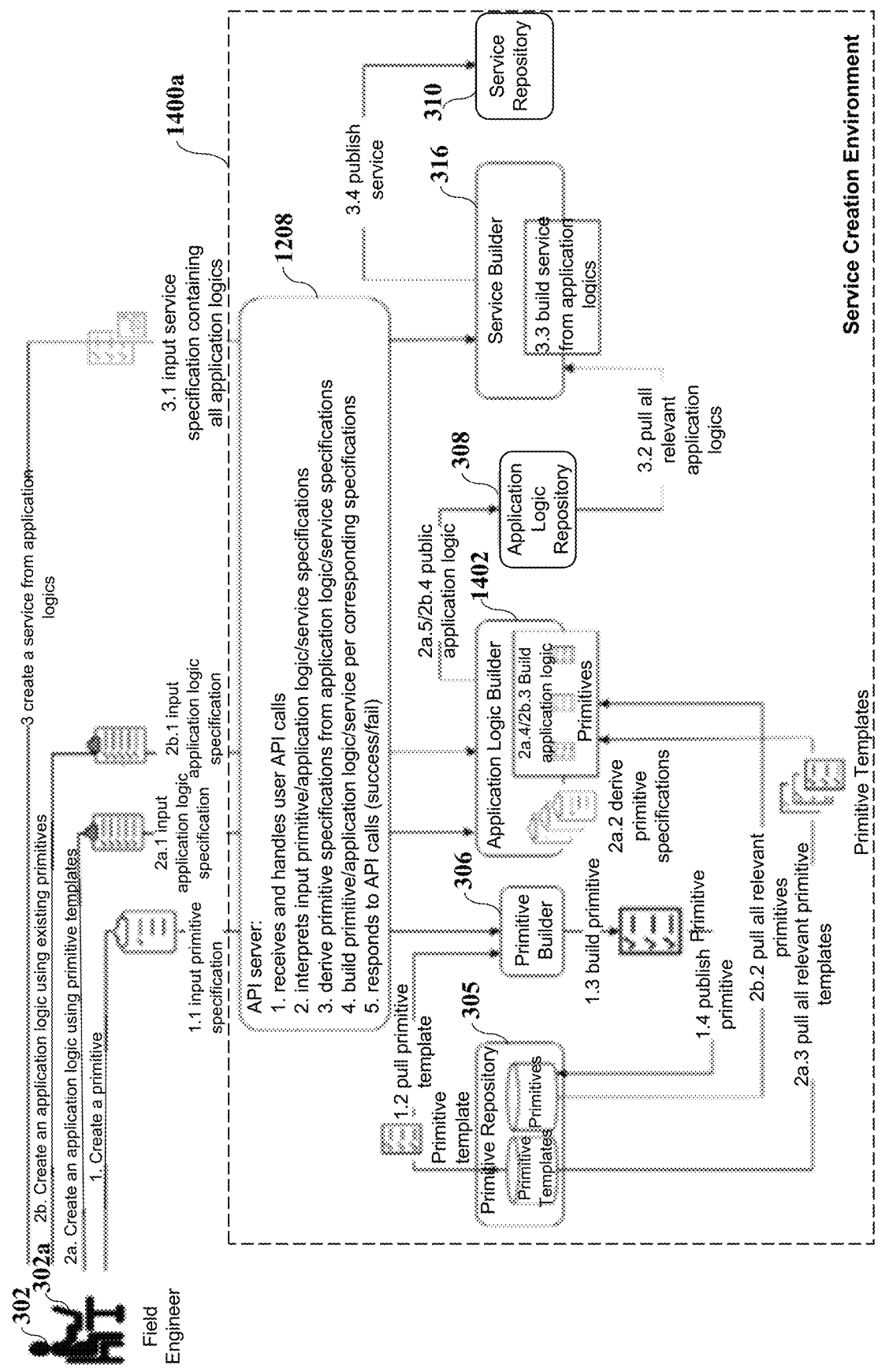
Figure 14C:
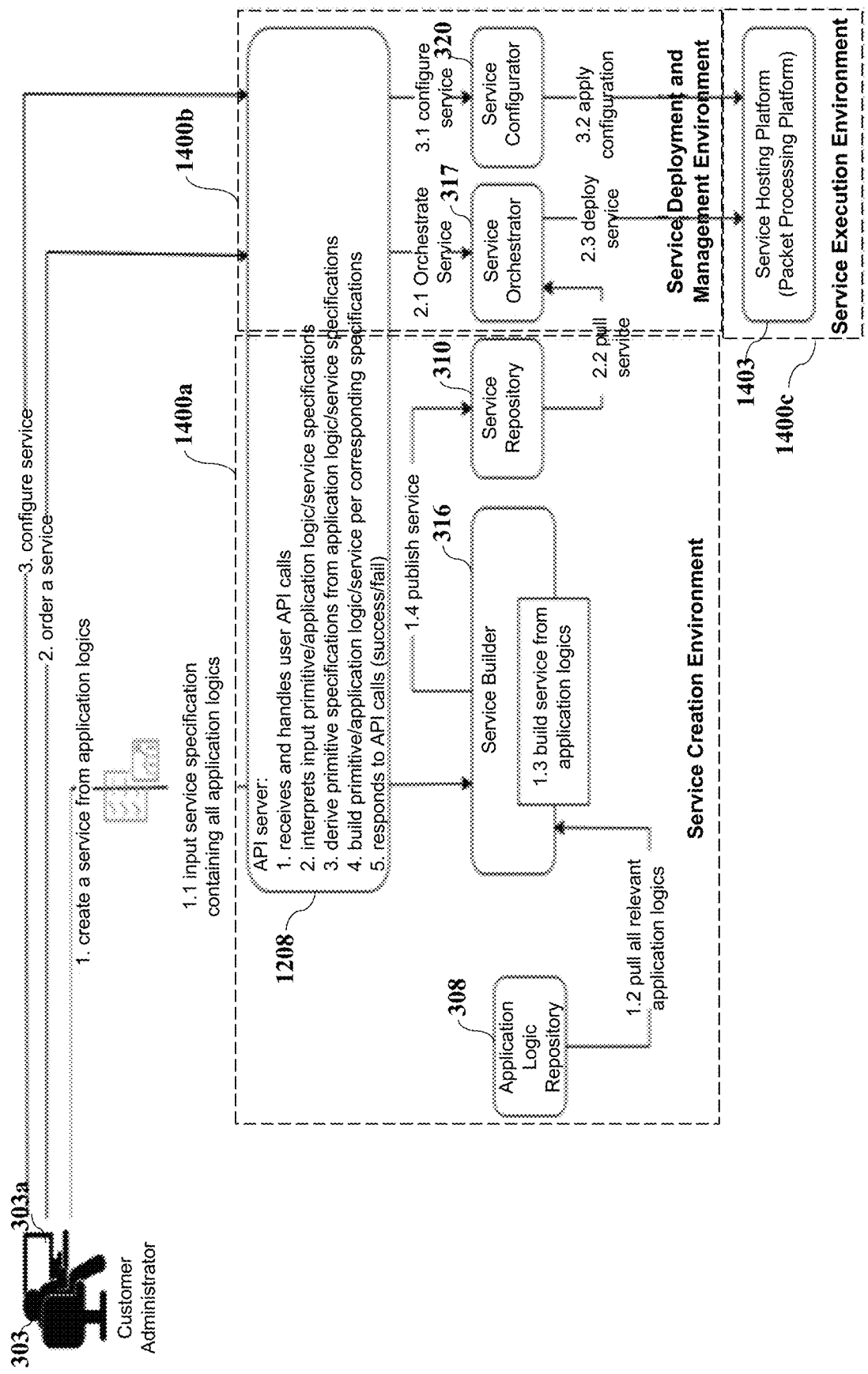

FIGS. 14A-14C illustrate flow diagrams showing architectural components of the data plane service implementation (DPSI) platform and procedures performed by different users of the DPSI platform in different environments. In an embodiment, the system and the method disclosed herein render three environments, namely, a service creation environment 1400a for primitive, application logic, and service creation tasks; a service deployment and management environment 1400b for orchestrating, deploying, and configuring services; and a service hosting/execution environment 1400c for executing the services. The packet processing primitives, herein referred to as "primitives", the application logics, and the services are created in the service creation environment 1400a. The service creation environment 1400a comprises a collection of functional elements that can be run on one or more physical servers. The functional elements comprise one or more development elements, one or more primitive repository elements, one or more primitive builder elements, one or more application logic repository elements, one or more application logic builder elements, one or more service repository elements, one or more service builder elements, and one or more application programming interface (API) elements. FIG. 14A, FIG. 14B, and FIG. 14C illustrate the corresponding environments and procedures from perspectives of a developer 301, a field engineer 302, and a customer administrator 303, respectively.

FIG. 14A illustrates a flow diagram showing architectural components of the data plane service implementation (DPSI) platform and procedures performed by a developer 301 associated with the DPSI platform in the service creation environment 1400a. In an embodiment, the DPSI platform comprises a development server 1401, the primitive repository 305, the primitive builder 306, an application logic builder 1402, the application logic repository 308, the service builder 316, and the service repository 310, which constitute the functional elements of the service creation environment 1400a as illustrated in FIG. 14A. Service creation procedures are manual and/or automated processes that invoke the functional elements of the service creation environment 1400a to fulfill the service creation required functions as disclosed herein. Consider an example where a developer 301 performs service creation related activities comprising developing primitive templates, building a primitive, building an application logic, and building a network service package also referred to as an "offerable service", using a developer device 301a. The developer 301 creates a primitive template via a user interface rendered on the developer device 301a by the DPSI platform. For creating the primitive template, the developer 301 implements the primitive template on the development server 1401 and publishes the primitive template to the primitive repository 305. For creating a primitive in the service creation environment 1400a, the developer 301 first creates a primitive specification via the user interface. The primitive builder 306 then pulls a primitive template that corresponds to the created primitive specification from the primitive repository 305; builds the primitive by applying the primitive specification to the primitive template; and publishes the primitive to the primitive repository 305. The primitive repository 305 stores primitive templates and primitives.

In an embodiment, the data plane service implementation (DPSI) platform allows creation of an application logic using primitive templates. For creating an application logic using primitive templates in the service creation environment 1400a, the developer 301 first creates an application logic specification via a user interface rendered on the developer device 301a by the DPSI platform. The application logic builder 1402 then derives relevant primitive specifications from the application logic specification; pulls relevant primitive templates from the primitive repository 305; builds the application logic in accordance with the application logic specification using primitives built by applying the relevant primitive specifications to the relevant primitive templates; and publishes the application logic to the application logic repository 308. In another embodiment, the DPSI platform allows creation of an application logic using existing primitives. For creating an application logic using existing primitives, the developer 301 first creates an application logic specification via the user interface. The application logic builder 1402 then pulls relevant primitives from the primitive repository 305; builds the application logic in accordance with the application logic specification using the relevant primitives; and publishes the application logic to the application logic repository 308.

For creating an offerable service in the service creation environment 1400a, the developer 301 first creates a service specification containing required application logic specifications via a user interface rendered on the developer device 301a by the DPSI platform. The service builder 316 then pulls relevant application logics from the application logic repository 308; builds the offerable service from the relevant application logics; and publishes the offerable service to the service repository 310.

FIG. 14B illustrates a flow diagram showing architectural components of the data plane service implementation (DPSI) platform and procedures performed by a field engineer 302 associated with the DPSI platform in the service creation environment 1400a. In an embodiment, the DPSI platform comprises the application programming interface (API) server 1208, the primitive repository 305, the primitive builder 306, the application logic builder 1402, the application logic repository 308, the service builder 316, and the service repository 310, which constitute the functional elements of the service creation environment 1400a as illustrated in FIG. 14B. The API server 1208 is configured to receive and handle user API calls; interpret input primitive, application logic, and service specifications; derive primitive specifications from application logic and service specifications; build or trigger building of a primitive, an application logic, and a service as per corresponding specifications; and respond to API calls with a success or fail message.

Consider an example where the field engineer 302 performs service creation related activities comprising creation of a primitive, creation of an application logic, and creation of an offerable service using an API client deployed on a field engineer device 302a. For creating a primitive, the field engineer 302 first inputs a primitive specification via an API call to the API server 1208. The API server 1208 then triggers the primitive builder 306 to pull a primitive template corresponding to the primitive specification from the primitive repository 305. The primitive builder 306 then builds the primitive by applying the primitive specification to the primitive template and publishes the primitive to the primitive repository 305. In an embodiment, the data plane service implementation (DPSI) platform allows the field engineer 302 to create an application logic using primitive templates. For creating an application logic using primitive templates, the field engineer 302 first inputs an application logic specification via an API call to the API server 1208. The API server 1208 then triggers the application logic builder 1402 to derive relevant primitive specifications from the application logic specification. The application logic builder 1402 then pulls primitive templates relevant to the derived primitive specifications from the primitive repository 305; builds the application logic in accordance with the application logic specification using primitives built by applying the derived primitive specifications to the relevant primitive templates; and publishes the application logic to the application logic repository 308.

In another embodiment, the data plane service implementation (DPSI) platform allows the field engineer 302 to create an application logic using existing primitives. For creating an application logic using existing primitives, the field engineer 302 first inputs an application logic specification via an API call to the API server 1208. The API server 1208 then triggers the application logic builder 1402 to pull primitives relevant to the application logic specification from the primitive repository 305. The application logic builder 1402 then builds the application logic in accordance with the application logic specification using the relevant primitives and publishes the application logic to the application logic repository 308. For creating an offerable service, the field engineer 302 first inputs a service specification containing all required application logic specifications via an API call to the API server 1208. The API server 1208 then triggers the service builder 316 to pull application logics relevant to the application logic specifications from the application logic repository 308. The service builder 316 then builds the offerable service from the application logics and publishes the offerable service to the service repository 310.

FIG. 14C illustrates a flow diagram showing architectural components of the data plane service implementation (DPSI) platform and procedures performed by a customer administrator 303 associated with the DPSI platform in the service creation environment 1400a, the service deployment and management environment 1400b, and the service hosting/execution environment 1400c. In an embodiment, the DPSI platform comprises the application programming interface (API) server 1208, the application logic repository 308, the service builder 316, and the service repository 310, that constitute the functional elements of the service creation environment 1400a as illustrated in FIG. 14C. The service deployment and management environment 1400b comprises one or more service orchestration elements and one or more service configuration elements. Service deployment and management procedures are manual and/or automated processes that invoke the service deployment and management environment elements to fulfill the service orchestration, deployment, and configuration-required functions as disclosed herein. In this embodiment, the DPSI platform further comprises a service orchestrator 317 operably coupled to the API server 1208. The service orchestrator 317, in the service deployment and management environment 1400b, orchestrates a network service package based on an order received from a customer device 303a via an API call; retrieves the network service package from the service repository 310; and deploys the retrieved network service package to a service hosting platform 1403 in the service hosting/execution environment 1400c. In this embodiment, the DPSI platform further comprises a service configurator 320 operably coupled to the API server 1208. The service configurator 320, in the service deployment and management environment 1400b, receives a configuration for the network service package from the customer device 303a via an API call; in response to a trigger from the API server 1208, configures the network service package based on the received configuration; and applies the configuration to the network service package deployed on the service hosting platform 1403 in the service hosting/execution environment 1400c. The service orchestrator 317 and the service configurator 320 that are operably coupled to the API server 1208 constitute the functional elements of the service deployment and management environment 1400b as illustrated in FIG. 14C. The service hosting platform 1403 is configured to execute packet processing network functions of the network service package in the service hosting/execution environment 1400c. The services in the network service package are deployed and run in the service hosting/execution environment 1400c. The network service package is herein referred to as an "offerable service". The service hosting/execution environment 1400c comprise an edge packet processing element as the core service execution element and one or more surrounding network elements supporting the operation of the edge packet processing element in monitoring the system operation, collecting the system operation related events, alarms, statistics (stats) and notifications, and interfacing to other external network functions such as wireless core interfaces, data network interfaces, enterprise network interfaces, etc. Service execution procedures are the actual execution of the created services within one or more edge packet processing elements.

Consider an example where a customer administrator 303 performs service creation, ordering, and configuration related activities comprising creating an offerable service, ordering a service, and configuring a service using an API client deployed on a customer device 303a. For creating the offerable service, the customer administrator 303 first inputs a service specification containing required application logic specifications via an API call to the API server 1208. The API server 1208 then triggers the service builder 316 to pull relevant application logics from the application logic repository 308. The service builder 316 then builds the offerable service from the relevant application logics and publishes the offerable service to the service repository 310. The data plane service implementation (DPSI) platform also allows the customer administrator 303 to order an offerable service. The customer administrator 303 orders a created offerable service or an existing offerable service via an API call to the API server 1208. The API server 1208 orchestrates the required offerable service through the service orchestrator 317 in the service deployment and management environment 1400b. The service orchestrator 317 pulls the required offerable service from the service repository 310 and deploys the offerable service to the service hosting platform 1403 in the service hosting/execution environment 1400c. The DPSI platform also allows the customer administrator 303 to configure an offerable service. The customer administrator 303 configures an offerable service via an API call to the API server 1208. The API server 1208 triggers the service configurator 320 to configure the offerable service and apply the configuration to the offerable service deployed on the service hosting platform 1403 in the service hosting/execution environment 1400c.

Figure 15:
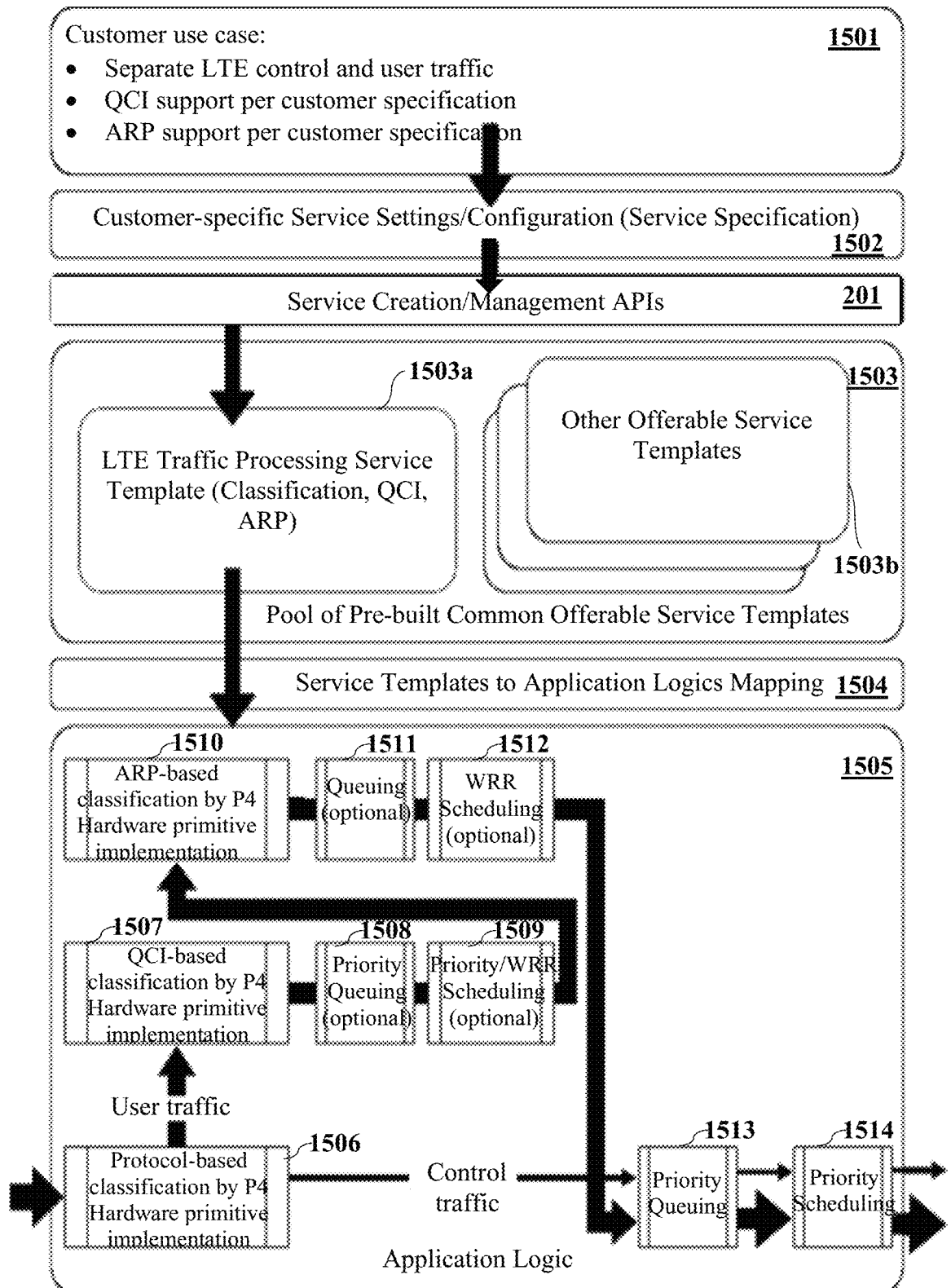
FIG. 15 illustrates a flow diagram of an embodiment of a method for creating an offerable network service package comprising an application logic based on a use-case-specific service specification for an example customer use case.

FIG. 15 illustrates a flow diagram of an embodiment of a method for creating an offerable network service package comprising an application logic 1505 based on a use-case-specific service specification 1502 for an example customer use case 1501. Consider an example of a customer user case 1501 where a customer requires a mobile quality of service (QOS) class identifier (QCI) traffic handling service. The mobile QCI traffic handling service is a well-known service and is, therefore, pre-built and published in the service repository 310 illustrated in FIG. 3. In this example, the customer requires the service to help separate long-term evolution (LTE) control and user plane traffic by delivering control traffic to a mobile core; adhere to user plane traffic mobile QoS settings comprising, for example, for example, QCI, allocation and retention priority (ARP), guaranteed bit rate (GBR)/maximum bit rate (MBR)/aggregate maximum bit rate (AMBR), etc., and deliver user traffic to a packet data network (PDN) via a packet data network gateway (PGW) accordingly. The customer creates a use-case-specific service specification 1502 comprising a QCI handling specification and an ARP handling specification via user interfaces rendered on a customer device by the data plane service implementation (DPSI) platform. The GBR/MBR/AMBR settings are handled in accordance with the Third Generation Partnership Project (3GPP) standard. The DPSI platform allows the customer to select/order the pre-built mobile QCI traffic handling service via the service creation application programming interfaces (APIs). In the use-case-specific service specification 1502, the customer specifies service capabilities and configures the service according to a local network environment via a provided service template. The API server in the DPSI platform interprets the customer's service selection and the service specifications created by the customer and orchestrates and configures the pre-built service accordingly.

As illustrated in FIG. 15, the exemplary customer user case 1501 comprises the following requirements: (1) separate long-term evolution (LTE) control and user traffic; (2) QoS class identifier (QCI) support as per the use-case-specific service specification 1502; and (3) allocation and retention priority (ARP) support as per the use-case-specific service specification 1502. The data plane service implementation (DPSI) platform receives the use-case-specific service specification 1502 comprising the required customer-specific service settings and configurations from the customer device via the service creation and management APIs 201 and proceeds to create an offerable network service package based on the received use-case-specific service specification 1502. The DPSI platform maintains a pool 1503 of pre-built, common offerable service templates in the service repository 310 as illustrated in FIG. 3. The common offerable service templates are built by authorized development users, for example, developers, of the DPSI platform. The pool 1503 of pre-built, common offerable service templates comprises, for example, an LTE traffic processing service template 1503a associated with classification, QCI, ARP, etc., and other offerable service templates 1503b. For service creation from the pre-built, common offerable service templates, the DPSI platform applies customer-specific configurations to the pre-built, common offerable service templates. The DPSI platform performs a mapping 1504 of the service templates to application logics stored in the application logic repository 308 illustrated in FIG. 3, and proceeds to create an offerable network service package from the mapped application logic 1505 for realizing the customer use case 1501.

In this example, the application logic 1505 in the offerable network service package for the above example customer user case 1501 comprises a protocol-based classification 1506, a QCI-based classification 1507, and an ARP-based classification 1510, all performed, for example, by P4 hardware primitive implementations, with optional queuing and scheduling steps as illustrated in FIG. 15. For example, on receiving incoming traffic, the protocol-based classification 1506 is performed on the incoming traffic by a P4 hardware primitive implementation, for example, on a P4 hardware switch. The output user traffic from the protocol-based classification 1506 then undergoes the QCI-based classification 1507, optional priority queuing 1508, and optional priority and/or weighted round robin (WRR) scheduling 1509, prior to undergoing the ARP-based classification 1510. The QCI-based classification 1507 and the ARP-based classification 1510 are both performed by P4 hardware primitive implementations, for example, on a P4 hardware switch. The output user traffic from the ARP-based classification 1510 then undergoes optional queuing 1511 and optional WRR scheduling 1512, prior to priority queuing 1513 and priority scheduling 1514 for passing egress traffic. Furthermore, control traffic output from the protocol-based classification 1506 also undergoes priority queuing 1513 and priority scheduling 1514 for passing egress traffic.

Figure 16:
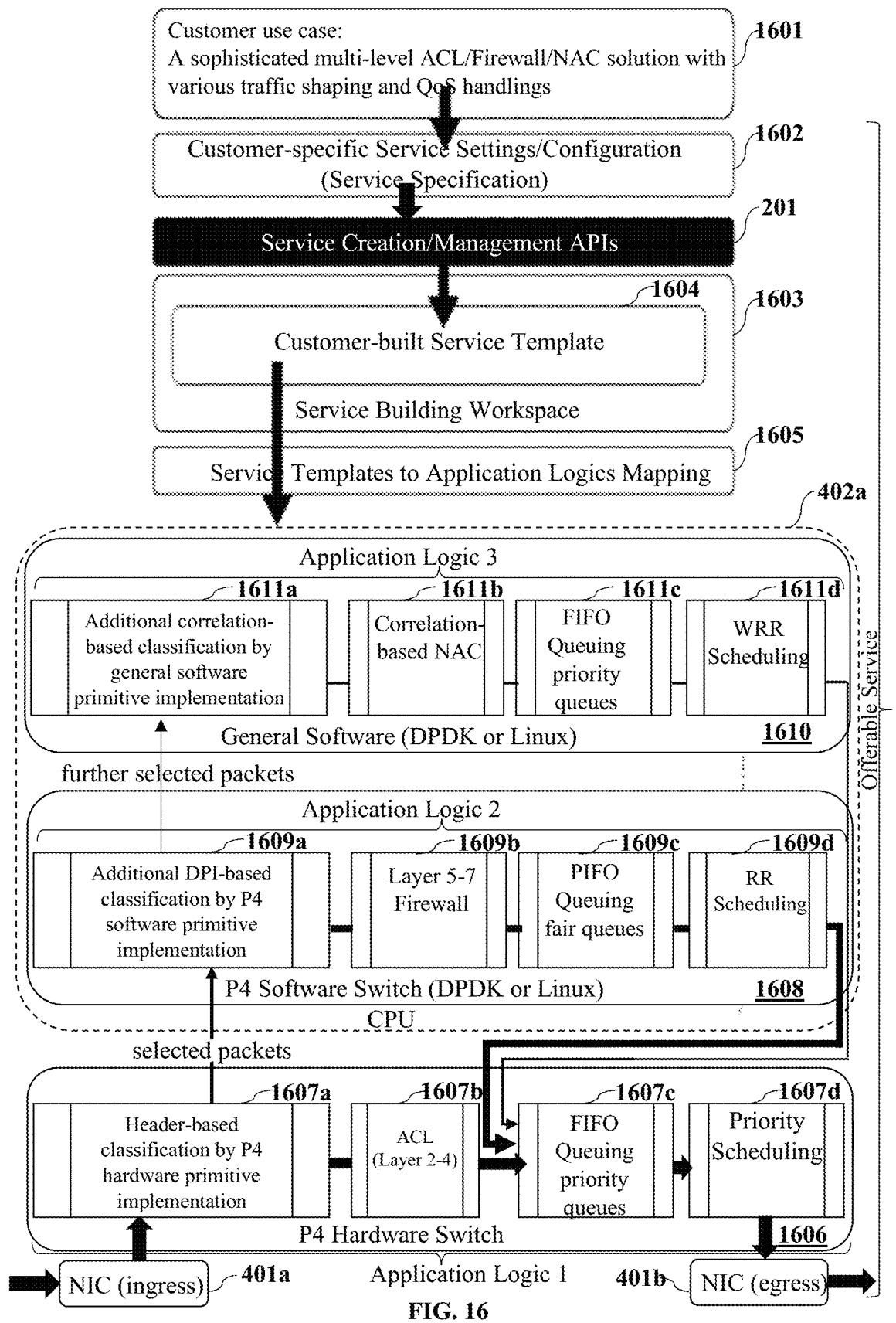
FIG. 16 illustrates a flow diagram of an embodiment of a method for creating an offerable network service package comprising an application logic based on a use-case-specific service specification for another example customer use case.

FIG. 16 illustrates a flow diagram of an embodiment of a method for creating an offerable network service package comprising an application logic based on a use-case-specific service specification 1602 for another example customer use case 1601. Consider an example of a customer user case 1601 where a customer requires a sophisticated, multi-level access control list (ACL), firewall, and correlation-based network access control (NAC) service to control network access security and provide specified quality of service (QoS) handling to the allowed traffic. The requirements of the service are disclosed below:

(1) do layer 2 through layer 4 ACL to incoming traffic
1.1 deny identified harmful traffic according to ACL rules
1.2 do additional layer 5-7 deep packet inspection (DPI)-based firewall to qualified traffic requires this additional handling
1.2.1 deny identified harmful traffic according to DPI-based firewall rules
1.2.2 do additional correlation-based NAC to further qualified traffic requires this additional handling
1.2.2(a) deny identified harmful access according to NAC authentication and authorization rules
1.2.2(b) apply specified QoS rules to allowed traffic
1.2.1 (c) apply specified QoS rules to allowed traffic
1.2.3 apply specified QoS rules to allowed traffic For this customer use case 1601, the data plane service implementation (DPSI) platform allows the customer to build the service via the service creation APIs. To build the service, the customer selects three pre-built application logics; and specifies the application logics via provided application logic templates. The customer also configures the service according to a local network environment via a provided service template. The API server in the DPSI platform interprets the customer's service selection and specification and triggers orchestration and configuration of the application logics and the service accordingly.

As illustrated in FIG. 16, the customer user case 1601 comprises a requirement for a sophisticated multi-level access control list (ACL), firewall, and network access control (NAC) solution with various traffic shaping and quality of service (QOS) handlings. The data plane service implementation (DPSI) platform receives a use-case-specific service specification 1602 comprising the required customer-specific service settings and configurations from a customer device via the service creation and management APIs 201 and proceeds to create an offerable network service package based on the received use-case-specific service specification 1602. In an embodiment, the DPSI platform provides a service building workspace 1603 to allow the customer to develop their own service template, herein referred to as a customer-built service template 1604. The DPSI platform stores the customer-built service template 1604 in the service repository 310 illustrated in FIG. 3. The DPSI platform performs a mapping 1605 of the customer-built service template 1604 to application logics stored in the application logic repository 308 illustrated in FIG. 3. For service creation from pre-built application logics/primitives, mapping of a service to the application logics is required. The DPSI platform proceeds to create an offerable network service package from the mapped application logics, for example, application logic 1, application logic 2, and application logic 3 in accordance with the use-case-specific service specification 1602 for realizing the customer use case 1601 as illustrated in FIG. 16.

As illustrated in FIG. 16, the application logic 1 comprises, for example, a header-based classification 1607a performed by a P4 hardware primitive implementation; an ACL 1607b based on layers 2, 3, and 4 metadata; First-in, First-out (FIFO) queuing priority queues 1607c; and priority scheduling 1607d. A header-based classifier is implemented on a P4 hardware switch 1606 to perform the header-based classification 1607a. The ACL 1607b contains a set of rules that apply to ingress traffic. The P4 hardware switch 1606 receives the ingress traffic from an ingress network interface controller (NIC) 401a. The received ingress traffic undergoes header-based classification 1607a, from where the selected packets are forwarded to a P4 software switch 1608 running on a central processing unit (CPU) 402a for execution of the application logic 2. Furthermore, the processed packets from the header-based classifier undergo the rules of the ACL 1607b based on layers 2, 3, and 4 metadata, and thereafter pass through the FIFO queuing priority queues 1607c. The output packets from the FIFO queuing priority queues 1607c undergo priority scheduling 1607d and exit to an egress NIC 401b.

The P4 software switch 1608, implemented on a data plane development kit (DPDK) 403a or on an operating system (OS) network stack, for example, a Linux® network stack 403b as illustrated in FIG. 4, receives the selected packets from the header-based classifier implemented on the P4 hardware switch 1606, for execution of the application logic 2. As illustrated in FIG. 16, the application logic 2 comprises, for example, an additional deep packet inspection (DPI)-based classification 1609a performed by a P4 software primitive implementation, a layer 5-7 firewall 1609b, Push-in, First-out (PIFO) queuing fair queues 1609c, and round robin (RR) scheduling 1609d. A DPI-based classifier is implemented on the P4 software switch 1608 to perform the DPI-based classification 1609a. The selected packets undergo the DPI-based classification 1609a, which forwards further selected packets to general software 1610 running on the CPU 402a for execution of the application logic 3. Furthermore, the processed packets from the DPI-based classifier are passed to the layer 5-7 firewall 1609b, and thereafter to the PIFO queuing fair queues 1609c. The output packets from the PIFO queuing fair queues 1609c undergo RR scheduling 1609d and pass through the FIFO queuing priority queues 1607c in the P4 hardware switch 1606, and thereafter undergo priority scheduling 1607d prior to exit to the egress NIC 401b.

The general software 1610, implemented on a data plane development kit (DPDK) 403a or on an operating system (OS) network stack, for example, a Linux® network stack 403b as illustrated in FIG. 4, receives the further selected packets from the DPI-based classifier implemented on the P4 software switch 1608, for execution of the application logic 3. As illustrated in FIG. 16, the application logic 3 comprises, for example, an additional correlation-based classification 1611a performed by a general software primitive implementation, correlation-based network access control (NAC) 1611b, First-in, First-out (FIFO) queuing priority queues 1611c, and weighted round robin (WRR) scheduling 1611d. A correlation-based classifier is implemented on the general software 1610 to perform the correlation-based classification 1611a. The further selected packets undergo correlation-based classification 1611a. The processed packets from the correlation-based classifier undergo the correlation-based NAC 1611b and pass through the FIFO queuing priority queues 1611c. The output packets from the FIFO queuing priority queues 1611c undergo the WRR scheduling 1611d and pass through the FIFO queuing priority queues 1607c in the P4 hardware switch 1606, and thereafter undergo priority scheduling 1607d prior to exit to the egress NIC 401b.

FIG. 17 illustrates an exemplary screenshot of a graphical user interface (GUI) 1700 provided by the data plane service implementation (DPSI) platform for implementing packet processing network functions as a service. In an embodiment, the DPSI platform renders a user interface, for example, a GUI 1700 illustrated in FIG. 17, to users for creating offerable network service packages. The GUI 1700 serves as a service creation interface configured as an overlay of one or more application programming interfaces (APIs). In an embodiment, the DPSI platform renders programmable APIs to users as service creation interfaces. The DPSI platform renders the GUI 1700 on user devices for creating offerable network service packages. The GUI 1700 illustrated in FIG. 17, displays a service creation workbench with a menu 1701 comprising packet processing primitives, application logics, service templates, logic connectors, etc., for selection by users for creating the offerable network service packages. A user may select one or more packet processing primitives from the menu 1701 for creation of application logics, for example, application logics 1, 2, and 3 as disclosed in the description of FIG. 16. For example, the user may select packet processing primitives such as a header-based classification 1607a or First-in, First-out (FIFO) queuing priority queues 1607c and position the packet processing primitives at required positions in the application logic 1 by performing a drag and drop action on the GUI 1700. The GUI 1700 also displays options to set 1702 parameters for logic connectors between the packet processing primitives in the application logics and to specify 1703 criteria and parameters for the packet processing primitives. The GUI 1700 illustrated in FIG. 17 displays the application logics 1, 2, and 3 created by a user based on a use-case-specific service specification for creation of an offerable network service package for the example customer use case disclosed in the description of FIG. 16. The GUI 1700 is, for example, any one of an online web interface, a web-based downloadable application interface, a mobile-based downloadable application interface, etc. In an embodiment, the GUI 1700 is a user interface, for example, a webpage, rendered by the computing and networking server(s) of the DPSI platform. In this embodiment, the GUI 1700 displays a menu of packet processing primitives, application logics, services, logic connectors, etc., for selection by users as illustrated in FIG. 17, for creating offerable network service packages.

Figure 18:
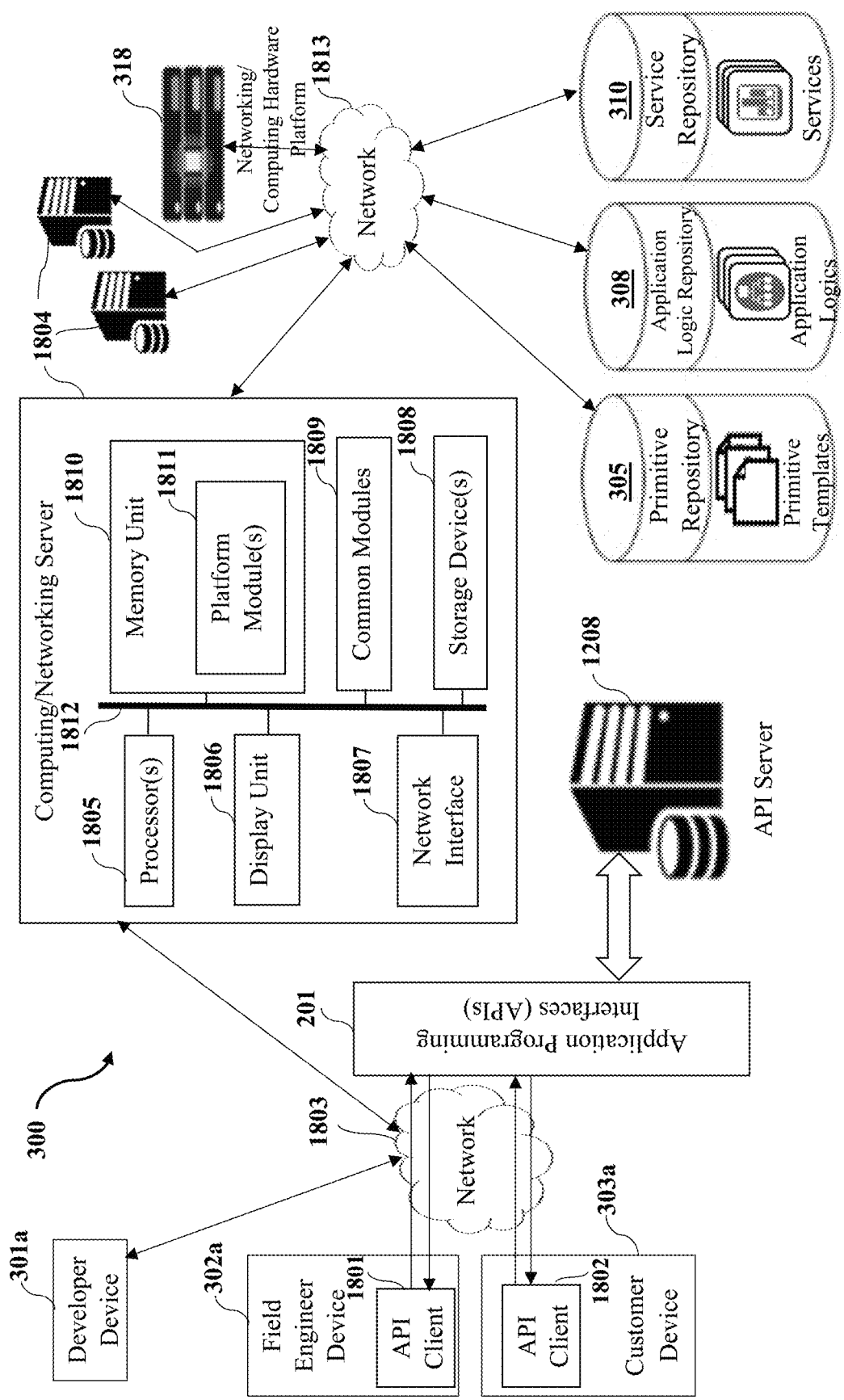
FIG. 18 illustrates an architectural block diagram of an exemplary implementation of the system for implementing packet processing network functions as a service.

FIG. 18 illustrates an architectural block diagram of an exemplary implementation of the system 300 for implementing packet processing network functions as a service. The system 300 disclosed herein comprises multiple computing and networking servers 1804 that constitute the data plane service implementation (DPSI) platform along with the application programming interface (API) server 1208, the primitive repository 305, the application logic repository 308, and the service repository 310. The computing and networking servers 1804 of the DPSI platform are accessible to users through a broad spectrum of technologies and user devices, for example, a developer device 301a, a field engineer device 302a, a customer device 303a, etc. Each computing and networking server 1804 is responsible for a particular portion of the DPSI platform procedures and functions as backend enablers of corresponding frontend APIs 201. The computing and networking servers 1804 of the DPSI platform are accessible to the user devices 301a, 302a, and 303a via a network 1803. The user devices 301a, 302a, and 303a are electronic devices, for example, one or more of personal computers with access to the internet, tablet computing devices, mobile computers, mobile phones, internet-enabled cellular phones, smartphones, portable computing devices, laptops, personal digital assistants, touch-centric devices, workstations, client devices, portable electronic devices, network-enabled computing devices, interactive network-enabled communication devices, devices capable of running web browsers, any other suitable computing equipment, combinations of multiple pieces of computing equipment, etc. In an embodiment, the user devices, for example, the field engineer device 302a and the customer device 303a, access the computing and networking servers 1804 of the DPSI platform via APIs 201, for example, service creation and management APIs, as disclosed in the descriptions of FIGS. 2-4 and FIGS. 15-16. The APIs 201 are implemented to allow creation, customization, and configuration of network service-supporting application logics and network service packages. The user devices 302a and 303a comprise API clients 1801 and 1802, respectively, configured to communicate with the API server 1208 via the APIs 201 as illustrated in FIG. 18. Each user may login to the DPSI platform, for example, using their unique identifier or any other authentication mechanism provided by the system 300. In an embodiment, the computing and networking servers 1804 of the DPSI platform access the primitive repository 305, the application logic repository 308, and the service repository 310 via a network 1813.

In an embodiment, the DPSI platform is implemented in a cloud computing environment. In another embodiment, the DPSI platform is a cloud-based platform implemented as a service for implementing packet processing network functions as a service. For example, the DPSI platform is configured as a software as a service (SaaS) platform or a cloud-based software as a service (CSaaS) platform that implements packet processing network functions as a service. In an embodiment, the data plane service implementation (DPSI) platform is configured as a server or a network of servers in a cloud computing platform, for example, the Amazon Web Services (AWS®) platform of Amazon Technologies, Inc., the Microsoft Azure® platform of Microsoft Corporation, etc. In another embodiment, the DPSI platform is configured as a cluster of computing and networking servers 1804 that is maintained at a fixed location. In another embodiment, the DPSI platform is implemented locally as an on-premise platform comprising on-premise software installed and run on client systems on the premises of an organization to meet privacy and security requirements.

The networks 1803 and 1813 that connect the user devices 301a, 302a, and 303a and the repositories 305, 308, and 310, respectively, to the computing and networking servers 1804 of the data plane service implementation (DPSI) platform are short-range networks or long-range networks. For example, each of the networks 1803 and 1813 is any one of: the internet, satellite internet, an intranet, a wired network, a wireless network, a communication network that implements Bluetooth® of Bluetooth Sig, Inc., a network that implements Wi-Fi® of Wi-Fi Alliance Corporation, an ultra-wideband (UWB) communication network, a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks.

The computing and networking servers 1804 of the data plane service implementation (DPSI) platform interface with the user devices 301a, 302a, and 303a, networking elements on which offerable network service packages are deployed, and in an embodiment, with one or more database systems comprising the repositories 305, 308, and 310 to implement the packet processing network functions as a service, and therefore more than one specifically programmed computing system is used for implementing the packet processing network functions as a service. One of the networking elements is, for example, a networking/computing hardware platform 318 as illustrated in FIG. 18. In an embodiment, the computing and networking servers 1804, the user devices 301a, 302a, and 303a, the repositories 305, 308, and 310, and the networking elements on which the offerable network service packages are deployed, constitute interconnected components of the system 300 that are deployed at different locations, but all coordinate with each other through the networks 1803 and 1813, to provide an improvement in implementing packet processing network functions.

Each of the computing and networking servers 1804 of the data plane service implementation (DPSI) platform is a computer system programmable using high-level computer programming languages. In an exemplary embodiment illustrated in FIG. 1, each of the computing and networking servers 1804 of the DPSI platform comprises at least one processor 1805 and a memory unit 1810. The memory unit 1810 is operably and communicatively coupled to the processor(s) 1805 and configured to store the computer program instructions defined by one or more modules 1811 of the DPSI platform. The modules of the DPSI platform comprise a primitive creation module, an application logic creation module, and a service creation module configured to define computer program instructions executable by the processor (s) 1805. The primitive creation module, the application logic creation module, and the service creation module are also referred to as the primitive builder 306, the application logic builder 1402, and the service builder 316, respectively, and are implemented in the service creation environment 1400a as illustrated in FIGS. 14A-14C. The modules of the DPSI platform further comprise the service orchestrator 317 and the service configurator 320 configured to define computer program instructions executable by the processor(s) 1805. The service orchestrator 317 and the service configurator 320 are implemented in the service deployment and management environment 1400b as illustrated in FIG. 14C.

In an embodiment, multiple databases comprising the primitive repository 305, the application logic repository 308, and the service repository 310 are remotely accessible to the computing and networking servers 1804 of the data plane service implementation (DPSI) platform via the network 1813 as illustrated in FIG. 18. In another embodiment (not shown), the repositories 305, 308, and 310 are stored locally in the memory unit(s) 1810 of one or more of the computing and networking servers 1804 of the DPSI platform. The primitive repository 305 stores primitive templates and multiple packet processing primitives comprising, for example, pre-built packet processing primitives, provided by the DPSI platform as building blocks for customer use cases. The application logic repository 308 stores application logics, for example, pre-built application logics, custom-built application logics developed by field engineers, etc. The service repository 310 stores services comprising, for example, pre-built services, custom-built services, and customer-built services that constitute the offerable network service packages.

Each of the repositories 305, 308, and 310 is a storage area or a storage medium configured to be used for storing data and files. Each of the repositories 305, 308, and 310 can be, for example, any of a structured query language (SQL) data store or a not only SQL (NoSQL) data store such as the Microsoft® SQL Server®, the Oracle® servers, the MySQL® database of MySQL AB Limited Company, the mongoDB® of MongoDB, Inc., the Neo4j graph database of Neo Technology Corporation, the Cassandra database of the Apache Software Foundation, the HBase® database of the Apache Software Foundation, etc. In an embodiment, each of the repositories 305, 308, and 310 can also be a location on a file system. In another embodiment, each of the repositories 305, 308, and 310 is configured as a cloud-based database implemented in a cloud computing environment.

The memory unit 1810 is a storage unit used for recording, storing, and reproducing data, program instructions, and applications. In an embodiment, the memory unit 1810 comprises a random-access memory (RAM) or another type of dynamic storage device that serves as a read and write internal memory and provides short-term or temporary storage for information and instructions executable by the processor(s) 1805. The memory unit 1810 also stores temporary variables and other intermediate information used during execution of the instructions by the processor(s) 1805. In another embodiment, the memory unit 1810 further comprises a read-only memory (ROM) or another type of static storage device that stores firmware, static information, and instructions for execution by the processor(s) 1805. In an embodiment, the platform modules 1811, namely, the primitive builder 306, the application logic builder 1402, the service builder 316, the service orchestrator 317, and the service configurator 320, are stored in the memory unit(s) 1810 of any one or more of the computing and networking servers 1804 of the data plane service implementation (DPSI) platform. For purposes of illustration, the platform module(s) 1811 is exemplarily shown to be a part of an in-memory system of the computing and networking server 1804; however, the scope of the system 300 disclosed herein is not limited to the platform module(s) 1811 being part of an in-memory system, but extends to the platform module(s) 1811 being distributed across a cluster of multiple computer systems, for example, computers, servers, virtual machines, containers, nodes, etc., coupled to the network 1813, where the computer systems operate as a team and coherently communicate and coordinate with each other to share resources, distribute workload, and execute different portions of the logic to implement packet processing network functions as a service. Each computer system in the cluster executes a part of the logic, and coordinates with other computer systems in the cluster to provide the complete functionality of the system 300 and the method disclosed herein.

The processor(s) 1805 in any one or more of the computing and networking servers 1804 is configured to execute the platform module(s) 1811 for implementing packet processing network functions as a service. The platform module(s) 1811, when loaded into the memory unit 1810 and executed by the processor(s) 1805, transforms the corresponding computing and networking server 1804 into a specially-programmed, special purpose computing device configured to implement the functionality disclosed herein. The processor(s) 1805 refers to one or more microprocessors, central processing unit (CPU) devices, finite state machines, computers, microcontrollers, digital signal processors, logic, logic devices, application-specific integrated circuits (ASICs), field-programmable gate arrays (FPGAs), chips, etc., or any combination thereof, capable of executing computer programs or a series of commands, instructions, or state transitions. In an embodiment, the processor(s) 1805 is implemented as a processor set comprising, for example, a programmed microprocessor and a math or graphics co-processor. The computing and networking server(s) 1804 is not limited to employing the processor(s) 1805. In an embodiment, the computing and networking server(s) 1804 employs a controller or a microcontroller.

Also illustrated in FIG. 18 is a data bus 1812, a display unit 1806, a network interface 1807, one or more storage devices 1808, and common modules 1809 of the computing and networking server(s) 1804. The data bus 1812 permits communications and exchange of data between the components, for example, 1805, 1806, 1807, 1808, 1809, and 1810 of the computing and networking server(s) 1804. The data bus 1812 transfers data to and from the memory unit 1810 and into or out of the processor(s) 1805. The display unit 1806, via a user interface, for example, a graphical user interface (GUI), displays user interface elements such as input fields, menus, etc., for allowing a user, for example, a developer, a field engineer, etc., of the data plane service implementation (DPSI) platform to input data into the DPSI platform. The network interface 1807 is configured to connect the computing and networking server(s) 1804 of the data plane service implementation (DPSI) platform to the networks 1803 and 1813. In an embodiment, the network interface 1807 is provided as an interface card also referred to as a line card. The network interface 1807 is, for example, one or more of infrared interfaces, interfaces implementing Wi-Fi® of Wi-Fi Alliance Corporation, universal serial bus (USB) interfaces, Ethernet interfaces, frame relay interfaces, cable interfaces, digital subscriber line interfaces, token ring interfaces, peripheral component interconnect (PCI) interfaces, local area network (LAN) interfaces, wide area network (WAN) interfaces, interfaces using serial protocols, interfaces using parallel protocols, asynchronous transfer mode interfaces, fiber distributed data interfaces (FDDI), interfaces based on transmission control protocol (TCP)/internet protocol (IP), interfaces based on wireless communications technology such as satellite technology, radio frequency technology, near field communication, etc.

The storage device(s) 1808 comprise non-transitory, computer-readable storage media, for example, fixed media drives such as hard drives for storing an operating system, application programs, data files, etc.; removable media drives for receiving removable media; etc. As used herein, "non-transitory, computer-readable storage medium" refers to all computer-readable media that contain and store computer programs and data. Examples of the computer-readable media comprise hard drives, solid state drives, optical discs or magnetic disks, memory chips, a read-only memory (ROM), a register memory, a processor cache, a random-access memory (RAM), etc. The common modules 1809 of the DPSI platform comprise, for example, input/output (I/O) controllers, input devices, output devices, etc. The output devices output the results of operations performed by the platform module(s) 1811. Computer applications and programs are used for operating the platform module(s) 1811. The programs are loaded onto fixed media drives and into the memory unit 1810 via the removable media drives. In an embodiment, the computer applications and the programs are loaded into the memory unit 1810 directly via the network 1813.

The platform module(s) 1811 is deployed and implemented in the computing and networking server(s) 1804 of the data plane service implementation (DPSI) platform using programmed and purposeful hardware as exemplarily illustrated in FIG. 18. In an embodiment, the platform modules 1811 are computer-embeddable systems that implement packet processing network functions as a service. As disclosed above, the platform modules 1811 comprise the primitive creation module, the application logic creation module, the service creation module, the service orchestrator 317, and the service configurator 320. The primitive creation module, also referred to as the primitive builder 306, defines computer program instructions for creating a packet processing primitive by applying a use-case-specific primitive specification to a corresponding one of multiple primitive templates retrieved from the primitive repository 305, and for storing the created packet processing primitive in the primitive repository 305 as disclosed in the descriptions of FIGS. 1A-1B, FIGS. 11-12, and FIGS. 14A-14B. For the creation of the packet processing primitive, the primitive creation module creates multiple primitive templates and stores the created primitive templates in the primitive repository 305; renders a first user interface for creating the use-case-specific primitive specification; retrieves one of the created primitive templates corresponding to the use-case-specific primitive specification, from the primitive repository 305; and creates the packet processing primitive by applying the use-case-specific primitive specification to the retrieved primitive template. In an embodiment, the primitive creation module provides user interfaces that allow users, for example, development engineers, to develop and store primitive templates as software functional modules and/or as configurations of hardware functional modules in the primitive repository 305. The primitive creation module allows an authorized development user, for example, a developer using the developer device 301a, to develop the use-case-specific primitive specification via the first user interface. Through the primitive creation module, the developers create and store packet processing primitives into the primitive repository 305, customize packet processing primitives, and select one or more of the packet processing primitives from the primitive repository 305 as building blocks for a customer use case based on user input.

The application logic creation module, also referred to as the application logic builder 1402, defines computer program instructions for creating an application logic based on a use-case-specific application logic specification using one or more of multiple packet processing primitives corresponding to the use-case-specific application logic specification, and for storing the created application logic in the application logic repository 308 as disclosed in the descriptions of FIGS. 1A-1B, FIGS. 11-12, and FIGS. 14A-14B. For the creation of the application logic, the application logic creation module renders a second user interface for creating the use-case-specific application logic specification; retrieves one or more of the packet processing primitives corresponding to the use-case-specific application logic specification, from the primitive repository 305; and creates the application logic based on the use-case-specific application logic specification using the retrieved packet processing primitive(s). In an embodiment, the application logic creation module allows users, for example, a developer using a developer device 301a and/or a field engineer using a field engineer device 302a, to develop the use-case-specific application logic specification via the second user interface. In another embodiment, the field engineer inputs the use-case-specific application logic specification into the application logic creation module via an API call to the API server 1208.

In an embodiment, the application logic creation module provides user interfaces that allow users, for example, authorized development users such as developers and authorized administrators such as field engineers to create application logics using pre-built application logics stored in the application logic repository 308. The application logic creation module creates application logics as internal implementations of a whole data plane packet processing network function required by one or more user-specific data plane packet processing services, using the created packet processing primitive(s) for realizing the customer use case. In an embodiment, the application logic creation module allows users, for example, development engineers, to create the application logics by direct software development and store the created application logics in the application logic repository 308. In an embodiment, the application logic creation module allows field engineers to create application logics via one or more of the APIs 201, for example, application logic creation APIs, and store the created application logics in the application logic repository 308.

The service creation module, also referred to as the service builder 316, defines computer program instructions for creating a network service package comprising one or more application logics corresponding to a use-case-specific service specification, and storing the created network service package in the service repository 310 as disclosed in the descriptions of FIGS. 1A-1B, FIGS. 11-13, and FIGS. 14A-14C. For the creation of the network service package, the service creation module renders a third user interface for creating the use-case-specific service specification containing application logic specifications; retrieves one or more application logics corresponding to the use-case-specific service specification, from the application logic repository 308; and creates the network service package comprising the retrieved application logic(s). In an embodiment, the service creation module allows a user, for example, a developer using a developer device 301a, a field engineer using a field engineer device 302a, and/or a customer using a customer device 303a, to develop the use-case-specific service specification via the third user interface. In another embodiment, the field engineer and/or the customer inputs the use-case-specific service specification into the service creation module via an API call to the API server 1208. In an embodiment, the service creation module maps a pre-built service, and/or a custom-built service, and/or a customer-built service stored in the service repository 310 to the created application logic(s). In an embodiment, the custom-built service and the customer-built service are typically developed using one or more of the APIs 201. In an embodiment, the service creation module provides user interfaces that allow users, for example, software engineers, to create offerable services by direct software development. In another embodiment, the service creation module allows users, for example, field engineers or customer administrators, to create offerable services via one or more of the APIs 201, for example, service creation APIs, based on use-case-specific service specifications.

The API server 1208 of the data plane service implementation (DPSI) platform comprises at least one processor communicatively coupled to the APIs 201 and operably coupled to the computing and networking server(s) 1804 of the DPSI platform. The API server 1208 receives and handles calls to the APIs 201. The API server 1208 interprets each of the use-case-specific primitive specification, the use-case-specific application logic specification, and the use-case-specific service specification inputted into the primitive creation module, the application logic creation module, and the service creation module, respectively, via the calls to one or more of the APIs 201. The API server 1208 derives primitive specifications from the use-case-specific application logic specification and the use-case-specific service specification. The API server 1208 triggers the primitive creation module, the application logic creation module, and the service creation module to create the packet processing primitive, the application logic, and the network service package, respectively, based on the use-case-specific primitive specification, the use-case-specific application logic specification, and the use-case-specific service specification. The API server 1208 responds to the calls to the APIs 201 with a status message, for example, a success or fail message.

The service orchestrator 317 of the data plane service implementation (DPSI) platform is operably coupled to the API server 1208 as illustrated in FIG. 14C. The service orchestrator 317 orchestrates the network service package based on an order received from a customer device 303a via an API call; retrieves the network service package from the service repository 310; and deploys the retrieved network service package to a service hosting platform, for example, the networking/computing hardware platform 318. The service configurator 320 of the DPSI platform is operably coupled to the API server 1208. The service configurator 320 receives a configuration for the network service package from a customer device 303a via an API call; in response to a trigger from the API server 1208, configures the network service package based on the received configuration; and applies the configuration to the network service package deployed on the service hosting platform. The service hosting platform, for example, the networking/computing hardware platform 318, is configured to execute packet processing network functions of the network service package.

The processor(s) 1805 in the computing and networking server(s) 1804 of the data plane service implementation (DPSI) platform retrieves the computer program instructions defined by the primitive creation module, the application logic creation module, the service creation module, the service orchestrator 317, and the service configurator 320 from the memory unit 1810 for executing the respective functions disclosed above. Each platform module(s) 1811 in the computing and networking server(s) 1804 is disclosed above as software executed by the processor(s) 1805. In an embodiment, the platform modules 1811 are implemented completely in hardware. In another embodiment, the platform modules 1811 are implemented by logic circuits to carry out their respective functions disclosed above. In another embodiment, the DPSI platform is also implemented as a combination of hardware and software including one or more processors, for example, 1805, that are used to implement the platform modules 1811.

In an embodiment, the platform module(s) 1811 is run locally on a single computing and networking server 1804 of the data plane service implementation (DPSI) platform; however the scope of the system 300 and the method disclosed herein is not limited to the platform module(s) 1811 being run locally on a single computing and networking server 1804 via an operating system and the processor(s) 1805, but extends to running the platform module(s) 1811 remotely over the network 1813 by employing a web browser, one or more remote servers 1804, computers, mobile phones, and/or other electronic devices. In an embodiment, one or more modules, databases, processing elements, memory elements, storage elements, etc., of the system 300 disclosed herein are distributed across a cluster of computer systems (not shown), for example, computers, servers, virtual machines, containers, nodes, etc., coupled to the network 1813, where the computer systems coherently communicate and coordinate with each other to share resources, distribute workload, and execute different portions of the logic to implement packet processing network functions as a service.

Disclosed herein is also a non-transitory, computer-readable storage medium configured to store computer program instructions executable by the processor(s) 1805 for implementing packet processing network functions as a service. The computer program instructions implement the processes of various embodiments disclosed above and perform additional steps that may be required and contemplated for implementing packet processing network functions as a service. When the computer program instructions are executed by the processor(s) 1805, the computer program instructions cause the processor(s) 1805 to perform the steps of the method for implementing packet processing network functions as a service as disclosed in the descriptions of FIGS. 1A-17. In an embodiment, a single piece of computer program code comprising computer program instructions performs one or more steps of the method disclosed in the descriptions of FIGS. 1A-17. The processor(s) 1805 retrieves these computer program instructions and executes them.

A module, or an engine, or a unit, as used herein, refers to any combination of hardware, software, and/or firmware. As an example, a module, or an engine, or a unit includes hardware such as a microcontroller, associated with a non-transitory, computer-readable storage medium to store computer program codes adapted to be executed by the microcontroller. Therefore, references to a module, or an engine, or a unit, in an embodiment, refer to the hardware that is specifically configured to recognize and/or execute the computer program codes to be held on a non-transitory, computer-readable storage medium. In an embodiment, the computer program codes comprising computer readable and executable instructions are implemented in any programming language, for example, programming protocol-independent packet processors (P4), C, C++, C#, Java®, JavaScript®, Fortran, Ruby, Perl®, Python®, hypertext preprocessor (PHP), Microsoft® .NET, Objective-C®, etc., for performing one or more steps of the method disclosed in the descriptions of FIGS. 1A-17. In another embodiment, other object-oriented, functional, scripting, and/or logical programming languages are also used. In an embodiment, the computer program codes or software programs are stored on or in one or more mediums as object code. In another embodiment, the term "module" or "engine" or "unit" refers to the combination of the microcontroller and the non-transitory, computer-readable storage medium. Often module or engine or unit boundaries that are illustrated as separate commonly vary and potentially overlap. For example, a module or an engine or a unit may share hardware, software, firmware, or a combination thereof, while potentially retaining some independent hardware, software, or firmware. In various embodiments, a module or an engine or a unit includes any suitable logic.

The system 300 and the method disclosed herein provide an improvement in implementing packet processing network functions with customer-facing API-centric customizability. In the system 300 and the method disclosed herein, the design and the flow of interactions between the primitive builder 306, the application logic builder 1402, the service builder 316, the service orchestrator 317, and the service configurator 320 of the data plane service implementation (DPSI) platform illustrated in FIG. 3 and FIGS. 14A-14C, are deliberate, designed, and directed. Every use-case-specific primitive specification, use-case-specific application logic specification, and use-case-specific service specification received by the DPSI platform via one or more user interfaces are configured by the DPSI platform to steer the input towards a finite set of outcomes. Furthermore, every selection of a packet processing primitive, and/or an application logic, and/or a service received by the DPSI platform via the GUI 1700 illustrated in FIG. 17, is configured by the DPSI platform to steer the input towards a finite set of outcomes. The computing and networking server(s) 1804 of the DPSI platform implements one or more specific computer programs to direct each input towards a set of end results. The interactions designed by the DPSI platform allow users to create packet processing primitives by applying use-case-specific primitive specifications to corresponding primitive templates retrieved from the primitive repository 305; create application logics based on use-case-specific application logic specifications using one or more of the packet processing primitives corresponding to the use-case-specific application logic specifications; and from these application logics, through the use of other, separate and autonomous computer programs, create offerable network service packages comprising one or more of the application logics corresponding to use-case-specific service specifications. The creation or selection of the packet processing primitives and the application logics constituted therefrom are used as triggers to create offerable network service packages. Performing the above disclosed method steps requires multiple separate computer programs and subprograms, the execution of which cannot be performed by a person using a generic computer with a generic program.

The focus of the system 300 and the method disclosed herein is on an improvement to the implementation of packet processing functions with customer-facing API-centric customizability itself, and not on economic or other tasks for which a generic computer is used in its ordinary capacity. Accordingly, the system 300 and the method disclosed herein are not directed to an abstract idea. Rather, the system 300 and the method disclosed herein are directed to a specific improvement to the way the packet processing primitives, application logics, the services, and the APIs 201 in the system 300 operate, embodied in, for example, creating packet processing primitives by applying use-case-specific primitive specifications to corresponding primitive templates retrieved from the primitive repository 305; creating application logics based on use-case-specific application logic specifications using one or more of the packet processing primitives corresponding to the use-case-specific application logic specifications; creating offerable network service packages comprising one or more of the application logics corresponding to use-case-specific service specifications, etc.

The system 300 and the method disclosed herein implement packet processing network functions as services at a more granular level, allowing customers to create, customize, and configure their specific data plane packet processing network solutions from end to end through APIs 201 manually or programmatically. The system 300 and the method disclosed herein allow customers to purchase offerable network service packages comprising one or more application logics created from one or more pre-built packet processing primitives, which increases profitability, improves customer engagement, and invokes new lines of business. The data plane service implementation (DPSI) platform provides a computing platform for packet processing solutions and transforms network services into services that may be reused, recycled, repaired, and redistributed. The flexible implementation of the architecture 400 illustrated in FIG. 4, is capable of satisfying the large and also ever-increasing diversity in customer demands, for example, in traffic classification, quality of service (QOS) support, security, availability, and reliability, from both a coverage dimension and a life span dimension. The system 300 and the method disclosed herein leverage software intermediaries, for example, the APIs 201, for providing functional modules as a service and allowing customers to build, customize, and configure their respective solutions. The DPSI platform allows development of customized solutions based on variable dimensions and different specific requirements from specific customers in a highly performing integrated manner that satisfies all potential and ever-changing needs of the customers. The system 300 and the method disclosed herein ensure high performance, while implementing the packet processing functions in programmable hardware and/or software and/or combined hardware and software forms and integrating these packet processing functions as desired.

It is apparent in different embodiments that the various methods, algorithms, and computer-readable programs disclosed herein are implemented on non-transitory, computer-readable storage media appropriately programmed for computing devices. The non-transitory, computer-readable storage media participate in providing data, for example, instructions that are read by a computer, a processor, or a similar device. In different embodiments, the "non-transitory, computer-readable storage media" also refer to a single medium or multiple media, for example, a centralized database, a distributed database, and/or associated caches and servers that store one or more sets of instructions that are read by a computer, a processor, or a similar device. The "non-transitory, computer-readable storage media" also refer to any medium capable of storing or encoding a set of instructions for execution by a computer, a processor, or a similar device and that causes a computer, a processor, or a similar device to perform any one or more of the steps of the method disclosed herein. In an embodiment, the computer programs that implement the methods and algorithms disclosed herein are stored and transmitted using a variety of media, for example, the computer-readable media in various manners. In an embodiment, hard-wired circuitry or custom hardware is used in place of, or in combination with, software instructions for implementing the processes of various embodiments. Therefore, the embodiments are not limited to any specific combination of hardware and software. Various aspects of the embodiments disclosed herein are implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. Various aspects of the embodiments disclosed herein are implemented as programmed elements, or non-programmed elements, or any suitable combination thereof.

Where databases are described such as the primitive repository 305, the application logic repository 308, and the service repository 310 illustrated in FIG. 3, FIGS. 11-13, FIGS. 14A-14C, and FIG. 18, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. In another embodiment, despite any depiction of the databases as tables, other formats including relational databases, object-based models, and/or distributed databases are used to store and manipulate the data types disclosed herein. In an embodiment, object methods or behaviors of a database are used to implement various processes such as those disclosed herein. In another embodiment, the databases are, in a known manner, stored locally or remotely from a device that accesses data in such a database. In embodiments where there are multiple databases, the databases are integrated to communicate with each other for enabling simultaneous updates of data linked across the databases, when there are any updates to the data in one of the databases.

The embodiments disclosed herein are configured to operate in a network environment comprising one or more computers that are in communication with one or more devices via a network. In an embodiment, the computers communicate with the devices directly or indirectly, via a wired medium or a wireless medium such as the Internet, satellite internet, a local area network (LAN), a wide area network (WAN) or the Ethernet, or via any appropriate communications mediums or combination of communications mediums. Each of the devices comprises processors that are adapted to communicate with the computers. In an embodiment, each of the computers is equipped with a network communication device, for example, a network interface card, a modem, or other network connection device suitable for connecting to a network. Each of the computers and the devices executes an operating system. While the operating system may differ depending on the type of computer, the operating system provides the appropriate communications protocols to establish communication links with the network. Any number and type of machines may be in communication with the computers.

The embodiments disclosed herein are not limited to a particular computer system platform, processor, operating system, or network. One or more of the embodiments disclosed herein are distributed among one or more computer systems, for example, servers configured to provide one or more services to one or more client computers, or to perform a complete task in a distributed system. For example, one or more of embodiments disclosed herein are performed on a client-server system that comprises components distributed among one or more server systems that perform multiple functions according to various embodiments. These components comprise, for example, executable, intermediate, or interpreted code, which communicate over a network using a communication protocol. The embodiments disclosed herein are not limited to be executable on any particular system or group of systems, and are not limited to any particular distributed architecture, network, or communication protocol.

The foregoing examples and illustrative implementations of various embodiments have been provided merely for explanation and are in no way to be construed as limiting the embodiments disclosed herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims. It will be understood by those skilled in the art, having the benefit of the teachings of this specification, that the embodiments disclosed herein are capable of modifications and other embodiments may be effected and changes may be made thereto, without departing from the scope and spirit of the embodiments disclosed herein.

We claim:

1. A method employing a data plane service implementation platform defining computer program instructions executable by at least one processor for implementing packet processing network functions as a service, the method comprising:
 implementing a plurality of application programming interfaces (APIs) to allow creation, customization, and configuration of network service-supporting application logics and network service packages;
 creating a packet processing primitive by applying a use-case-specific primitive specification to a corresponding one of a plurality of primitive templates retrieved from a primitive repository, and storing the created packet processing primitive in the primitive repository;
 creating an application logic based on a use-case-specific application logic specification using one or more of a plurality of packet processing primitives corresponding to the use-case-specific application logic specification, and storing the created application logic in an application logic repository; and
 creating a network service package comprising one or more application logics corresponding to a use-case-specific service specification, and storing the created network service package in a service repository.

2. The method of claim 1, wherein, the creation of the packet processing primitive comprises:
 creating the plurality of primitive templates and storing the created primitive templates in the primitive repository;
 rendering a user interface for creating the use-case-specific primitive specification;
 retrieving one of the created primitive templates corresponding to the use-case-specific primitive specification, from the primitive repository; and
 creating the packet processing primitive by applying the use-case-specific primitive specification to the retrieved one of the created primitive templates.

3. The method of claim 1, wherein, the creation of the application logic comprises:
 rendering a user interface for creating the application logic based on use-case-specific application logic specification;
 retrieving the one or more of the plurality of packet processing primitives corresponding to the use-case-specific application logic specification, from the primitive repository, wherein the packet processing primitives are one of (a) pre-built packet processing primitives; and (b) packet processing primitives created by applying primitive specifications derived from the use-case-specific application logic specification to the primitive templates retrieved from the primitive repository; and
 creating the application logic based on the use-case-specific application logic specification using the retrieved one or more of the plurality of packet processing primitives.

4. The method of claim 1, wherein, the creation of the network service package comprises:
 rendering a user interface for creating the use-case-specific service specification containing application logic specifications;
 retrieving the one or more application logics corresponding to the use-case-specific service specification, from the application logic repository; and
 creating the network service package comprising the retrieved one or more application logics.

5. The method of claim 1, wherein the packet processing primitive is configured in a structured format comprising a name, a type, an identifier, and a specification of an instance of the packet processing primitive, wherein each instance of the packet processing primitive is implemented as an independent, self-contained, functional part of a whole data plane packet processing network function, and wherein the application logic is created as an internal implementation of a whole data plane packet processing network function required by one or more user-specific data plane packet processing services.

6. The method of claim 1, wherein the use-case-specific primitive specification is developed by a user via a user interface, and wherein the use-case-specific application logic specification and the use-case-specific service specification are one of: (a) developed by a user via respective user interfaces; and (b) inputted into the application logic creation module and the service creation module, respectively, via an API call.

7. The method of claim 1, further comprising:
 communicatively coupling an API server to the plurality of APIs and operably coupled to the data plane service implementation platform, wherein the API server comprises at least one processor configured to:
 receive and handle calls to the plurality of APIs;
 interpret each of the use-case-specific primitive specification, the use-case-specific application logic specification, and the use-case-specific service specification inputted into the primitive creation module, the application logic creation module, and the service creation module, respectively, via the calls to one or more of the plurality of APIs;
 derive primitive specifications from the use-case-specific application logic specification and the use-case-specific service specification;
 trigger the primitive creation module, the application logic creation module, and the service creation module to create the packet processing primitive, the application logic, and the network service package, respectively, based on the use-case-specific primitive specification, the use-case-specific application logic specification, and the use-case-specific service specification, respectively; and
 respond to the calls to the plurality of APIs with a status message.

8. The method of claim 7, wherein the data plane service implementation platform comprises a service orchestrator operably coupled to the API server, wherein the service orchestrator defines computer program instructions, which when executed by the at least one processor, cause the at least one processor to:
 orchestrate the network service package based on an order received from a customer device via an API call;
 retrieve the network service package from the service repository; and deploy the retrieved network service package to a service hosting platform.

9. The method of claim 7, wherein the data plane service implementation platform further comprises a service configurator operably coupled to the API server, and wherein the service configurator defines computer program instructions, which when executed by the at least one processor, cause the at least one processor to:
 receive a configuration for the network service package from a customer device via an API call;

in response to a trigger from the API server, configure the network service package based on the received configuration; and apply the configuration to the network service package deployed on a service hosting platform.

10. The method of claim 1, wherein the data plane service implementation platform further comprises a service hosting platform configured to define computer program instructions, which when executed by the at least one processor, cause the at least one processor to execute packet processing network functions of the network service package.

11. The method of claim 1, further comprising:

rendering the packet processing primitives, the network service-supporting application logics, and pre-built services in tiered forms, wherein the tiered forms comprise:

a modularized source code form configured to invoke code compiling, linking, and packaging for creation of the network service packages;

a modularized binary form configured to render pre-built application logic binaries with linking and service required wrapping, for the creation of the network service packages; and a customization service form configured to render the pre-built services for customization via configuration by customers directly.

12. The method of claim 1, wherein the plurality of APIs are role-based APIs configured to separate and control access of users with different privileges for facilitating creation, configuration, control, management, monitoring, and reporting actions to be applied to layered resources and layered entities of the data plane service implementation platform, and wherein the layered entities comprise a network interface and programmable switch physical layer, a processing unit physical layer, a network stack layer, a packet processing primitive implementation layer, an application logic layer, a service creation layer, and a control and application plane.

13. The method of claim 1, wherein the primitive templates are created as one of: (a) software functional modules; (b) configurations of hardware functional modules; and (c) a combination of software functional modules and configurations of hardware functional modules, and are stored in the primitive repository, and wherein the data plane service implementation platform implements the packet processing primitives on one or more of: a dedicated packet processor as hardware functions; and one or more processing units as software functions.

14. The method of claim 1, further comprising:

optimizing implementation of the packet processing primitives in programmable hardware, as one or more programming protocol-independent packet processors (P4) modules, and in general software to be run on one or more processing units, based on complexity of logic of the packet processing primitives and running environment.

15. The method of claim 1, further comprising:

flexibly implementing logic of a customer use case using one of a fully integrated packet processing primitive and a plurality of separated packet processing primitives based on the use-case-specific service specification.

16. The method of claim 1, wherein the data plane service implementation platform further comprises a service creation user interface as an overlay of one or more of the plurality of APIs, wherein the service creation user interface is configured to be rendered on user devices for creating the network service packages, and wherein the packet processing primitives, application logics, the network service packages, and logic connectors are rendered as interface elements on the service creation user interface for selection and configuration by users.

* * * * *